US009020728B2

(12) United States Patent
Goudy et al.

(10) Patent No.: US 9,020,728 B2
(45) Date of Patent: Apr. 28, 2015

(54) VEHICLE TURN MONITORING SYSTEM AND METHOD

(71) Applicant: Nissan North America, Inc., Franklin, TN (US)

(72) Inventors: Roy W. Goudy, Farmington Hills, MI (US); Neal Probert, Farmington Hills, MI (US); Andrew Christensen, Livonia, MI (US); Jeremy Chambers, Casco, MI (US)

(73) Assignee: Nissan North America, Inc., Franklin, TN (US)

( * ) Notice: Subject to any disclaimer, the term of this patent is extended or adjusted under 35 U.S.C. 154(b) by 151 days.

(21) Appl. No.: 13/743,952

(22) Filed: Jan. 17, 2013

(65) Prior Publication Data

US 2014/0200782 A1 Jul. 17, 2014

(51) Int. Cl.
*G06F 19/00* (2011.01)
*G08G 1/16* (2006.01)

(52) U.S. Cl.
CPC ................ *G08G 1/161* (2013.01); *G08G 1/166* (2013.01); *G08G 1/167* (2013.01)

(58) Field of Classification Search
None
See application file for complete search history.

(56) References Cited

U.S. PATENT DOCUMENTS 4,352,088 A 9/1982 Tsunoda
4,644,327 A 2/1987 Patterson
4,706,072 A 11/1987 Ikeyama
5,788,336 A 8/1998 Trovato et al.
5,845,250 A 12/1998 Vogten
5,939,976 A 8/1999 Sasaki et al.
5,940,010 A 8/1999 Sasaki et al.
5,979,586 A 11/1999 Farmer et al.
6,008,741 A 12/1999 Shinagawa et al.
6,366,207 B1 4/2002 Murphy
6,615,137 B2 9/2003 Lutter et al.
6,700,504 B1 3/2004 Aslandogan et al.
6,720,898 B1 4/2004 Ostrem
6,791,471 B2 9/2004 Wehner et al.

(Continued)

FOREIGN PATENT DOCUMENTS

EP 1962255 A1 8/2008
JP S59-102634 A 6/1984

(Continued)

OTHER PUBLICATIONS

Kurt, Arda et al., "Hybrid-state driver/vehicle modelling, estimation and prediction", 13th International IEEE Annual Conference on Intelligent Transportation Systems, Madeira Island, Portugal, Paper TA3.4, Sep. 19-22, 2010, pp. 806-811.

(Continued)

*Primary Examiner* — Helal A Algahaim
*Assistant Examiner* — Kelly E Darby
(74) *Attorney, Agent, or Firm* — Global IP Counselors, LLP

(57) ABSTRACT

A vehicle turn monitoring method comprises determining an intent for a host vehicle to execute a left turn before the host vehicle begins to execute the left turn, monitoring a location relationship between the host vehicle and a remote vehicle before the host vehicle begins to execute the left turn, and evaluating a travelling condition of the host vehicle before the host vehicle begins to execute the left turn. The method further includes determining, by operation of a processor, whether to perform a threat mitigation operation before the host vehicle begins to execute the left turn based on the location relationship and the travelling condition.

20 Claims, 41 Drawing Sheets

(56) References Cited

U.S. PATENT DOCUMENTS

| | | | | |
|---|---|---|---|---|
| 6,810,328 | B2 | 10/2004 | Yokota et al. | |
| 7,274,288 | B2 | 9/2007 | Nagata | |
| 8,000,897 | B2 | 8/2011 | Breed et al. | |
| 8,175,796 | B1 | 5/2012 | Blackburn et al. | |
| 8,340,894 | B2 | 12/2012 | Yester | |
| 8,466,807 | B2 | 6/2013 | Mudalige | |
| 8,548,729 | B2 | 10/2013 | Mizuguchi | |
| 8,577,550 | B2 * | 11/2013 | Lu et al. | 701/41 |
| 8,587,418 | B2 | 11/2013 | Mochizuki et al. | |
| 8,639,426 | B2 | 1/2014 | Dedes et al. | |
| 8,717,192 | B2 | 5/2014 | Durekovic et al. | |
| 2009/0033540 | A1 | 2/2009 | Breed et al. | |
| 2009/0140887 | A1 | 6/2009 | Breed et al. | |
| 2009/0198412 | A1 | 8/2009 | Shiraki | |
| 2010/0169009 | A1 | 7/2010 | Breed et al. | |
| 2012/0016581 | A1 * | 1/2012 | Mochizuki et al. | 701/301 |
| 2012/0218093 | A1 | 8/2012 | Yoshizawa et al. | |
| 2013/0116915 | A1 | 5/2013 | Ferreira et al. | |
| 2013/0179047 | A1 | 7/2013 | Miller et al. | |
| 2013/0278440 | A1 | 10/2013 | Robin et al. | |

FOREIGN PATENT DOCUMENTS

| | | | |
|---|---|---|---|
| JP | S61-253238 | A | 11/1986 |
| JP | 2000-127796 | A | 5/2000 |
| JP | 2001-118199 | A | 4/2001 |
| JP | 2003-51099 | A | 2/2003 |
| WO | 03091966 | A1 | 11/2003 |

OTHER PUBLICATIONS

Kurt, Arda (dissertation), "Hybrid-state system modelling for control, estimation and prediction in vehicular autonomy", presented in Partial Fulfillment of the Requirements for the Degree Doctor of Philosophy in the Graduate School of The Ohio State University, Mar. 2012, UMI/Proquest Pub. No. 3497707, 136 pages (total).

John Jacob Winters, An Investigation of Auditory Icons and Brake Response Times in a Commercial Truck-Cab Environment (Virginia Polytechnic Institute and State Univ. 1998).

Driver Focus-Telematics Working Group, Statement of Principles, Criteria and Verification Procedures on Driver Interactions with Advanced In-vehicle Information and Communication Systems (Version 2.0, 2002).

John L. Campbell et al., Comprehension Testing of Active Safety Symbols (SAE International 2004).

Pontus Larsson et al., Emotional and Behavioral Response to Auditory Icons and Earcons in Driver-vehicle Interfaces (Sweden, Paper No. 09-0104).

M.L. Cummings et al., Effects of Single versus Multiple Warnings on Driver Performance (Human Factors and Ergonomics Society 2011).

Michael A. Nees & Bruce N. Walker, Auditory Displays for In-vehicle Technologies (Human Factors and Ergonomics Society 2011).

Kathleen A. Harder, John Bloomfield, and Benjamin J. Chibak, The Effectiveness of Auditory Side- and Forward-Collision Avoidance Warnings in Winter Driving Conditions (Minnesota Department of Transportation, Report No. MN/RC 2003-14,2003).

* cited by examiner

SCENARIO 1

SCENARIO 2

SCENARIO 3

SCENARIO 4

SCENARIO 5

SCENARIO 6

SCENARIO 7

SCENARIO 8

SCENARIO 9

SCENARIO 10

SCENARIO 11

SCENARIO 12

SCENARIO 13

SCENARIO 14

SCENARIO 15

SCENARIO 16

SCENARIO 17

SCENARIO 18

SCENARIO 19

SCENARIO 20

SCENARIO 21

SCENARIO 22

SCENARIO 23

SCENARIO 24

SCENARIO 25

SCENARIO 26

SCENARIO 27

VEHICLE TURN MONITORING SYSTEM AND METHOD

CROSS-REFERENCE TO RELATED APPLICATIONS

Related subject matter is disclosed in U.S. patent application Ser. No. 13/689,452, entitled "Vehicle Intersection Monitoring System and Method," in U.S. patent application Ser. No. 13/689,484 entitled "Vehicle Intersection Monitoring System and Method," in U.S. patent application Ser. No. 13/689,523 entitled "Vehicle Intersection Warning System and Method," and in U.S. patent application Ser. No. 13/689,564 entitled "Vehicle Intersection Monitoring System and Method," all of these applications being filed on Nov. 29, 2012 and being incorporated by reference herein.

BACKGROUND

1. Field of the Invention

The present invention generally relates to a vehicle turn monitoring system and method. More particularly, the present invention relates to a system and method which evaluates scenarios in which a host vehicle and a remote vehicle may come in contact at an intersection or while the host vehicle is executing a turn.

2. Background Information

In recent years, vehicles have become more equipped with features for improving safety. For example, vehicles can be equipped with a collision warning system that identifies the location of the vehicle and the locations of other nearby vehicles to determine whether the vehicle may come into contact with any of the other vehicles. The possibility of contact between vehicles can be particularly high at road intersections in which the travel paths of the vehicle and other nearby vehicles may intersect. If the possibility of contact exists, the system can issue a warning to the driver so that the driver can take the appropriate action Accordingly, a need exists for an improved vehicle collision warning system.

SUMMARY

In accordance with one aspect of the present invention, a vehicle turn monitoring method is provided. The vehicle turn monitoring method comprises determining an intent for a host vehicle to execute a left turn before the host vehicle begins to execute the left turn, monitoring a location relationship between the host vehicle and a remote vehicle before the host vehicle begins to execute the left turn, and evaluating a travelling condition of the host vehicle before the host vehicle begins to execute the left turn. The method further includes determining, by operation of a processor, whether to perform a threat mitigation operation before the host vehicle begins to execute the left turn based on the location relationship and the travelling condition.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the disclosed embodiments are provided for illustration only and not for the purpose of limiting the invention as defined by the appended claims and their equivalents.

Figure 1:
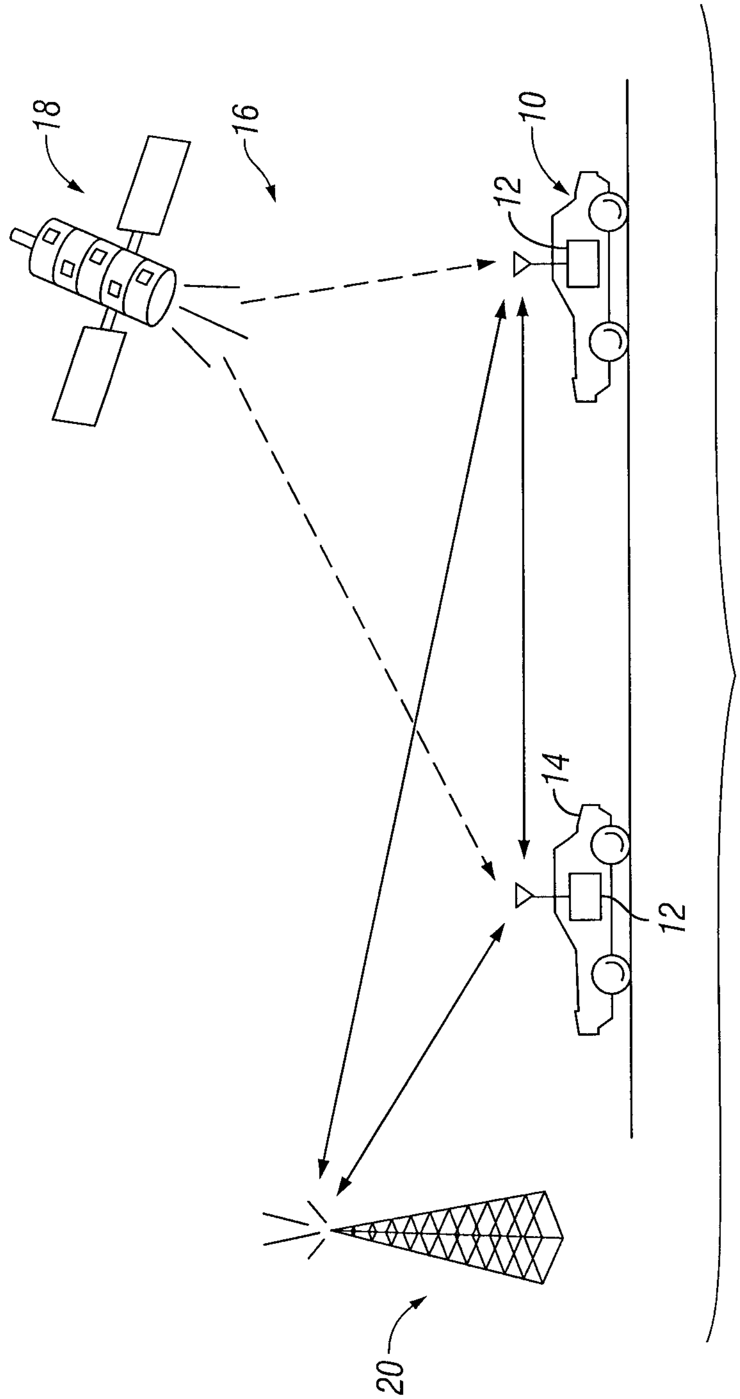
FIG. 1 is a block diagram illustrating an example of a host vehicle equipped with an intersection monitoring system according to embodiments disclosed herein in relation to a remote vehicle and components of a global positioning system (GPS)

FIG. 1 is a block diagram illustrating a host vehicle (HV) 10 that is equipped with a vehicle intersection monitoring system 12 according to a disclosed embodiment. The vehicle intersection monitoring system 12 communicates with at least one remote vehicle (RV) 14 that can also include a vehicle intersection monitoring system 12. Alternatively, the remote vehicle 14 can include another type of two-way communication system, such as an adaptive cruise control system, that is capable of communicating information about at least the location and speed of the remote vehicle 14 as understood in the art.

The vehicle intersection monitoring system 12 of the host vehicle 10 and the remote vehicle 14 communicates with a two-way wireless communications network 16. The two-way wireless communications network 16 can include one or more global positioning satellites 18 (only one shown) and one or more roadside units 20 (only one shown) that send and receive signals to and from the vehicle intersection monitoring system 12 of the host vehicle 10 and the remote vehicle 14.

Figure 2:
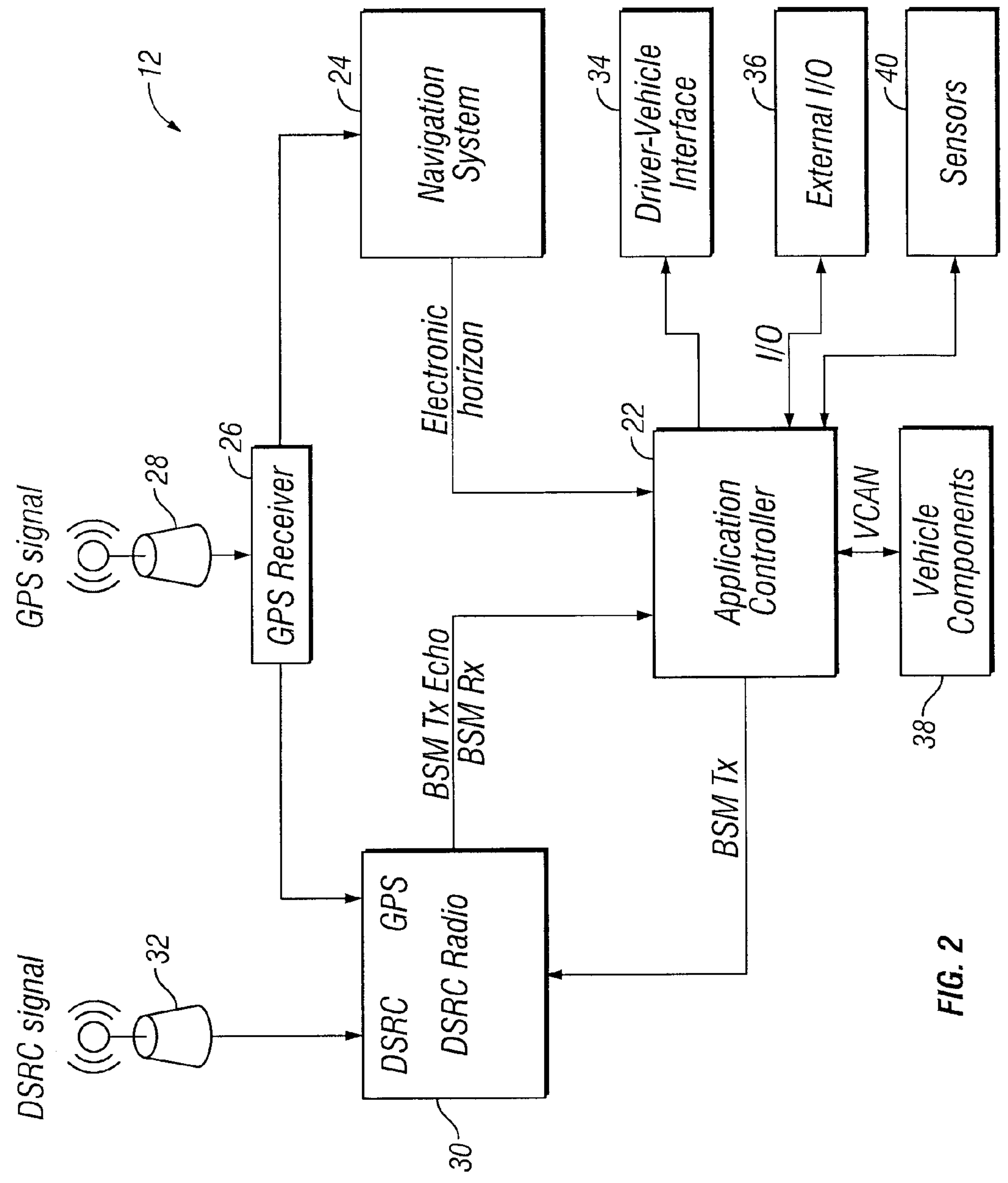
FIG. 2 is a block diagram of exemplary components of an intersection monitoring system according to disclosed embodiments.
Figure 3:
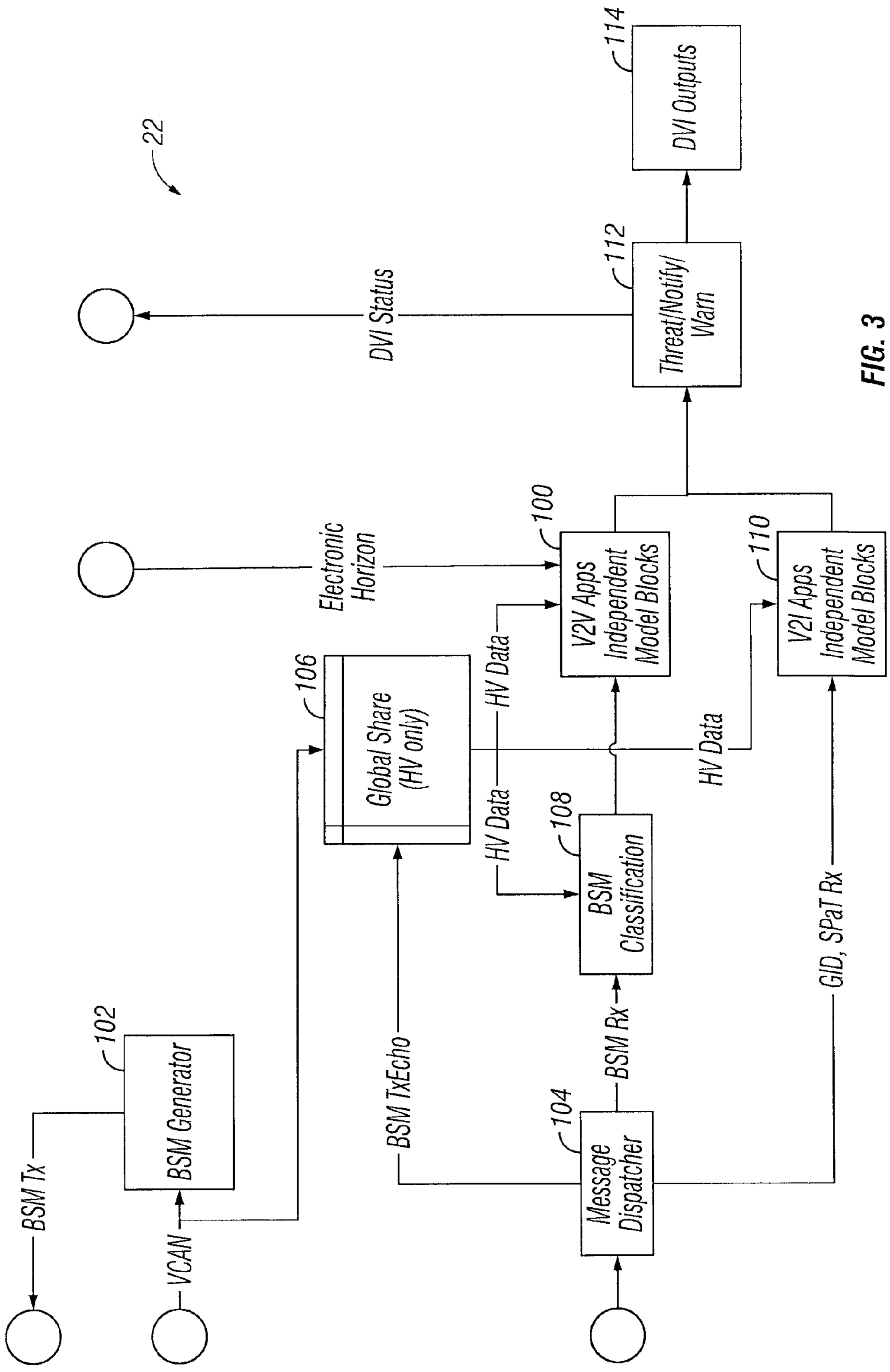
FIG. 3 is a block diagram of exemplary components included in the application controller of the intersection monitoring system as shown in FIG. 2.

As shown in more detail in FIGS. 2 and 3, the vehicle intersection monitoring system 12 includes an application controller 22 that can be referred to simply as a controller 22. The controller 22 preferably includes a microcomputer with a control program that controls the components of the vehicle intersection monitoring system 12 as discussed below. The controller 22 includes other conventional components such as an input interface circuit, an output interface circuit, and storage devices such as a ROM (Read Only Memory) device and a RAM (Random Access Memory) device. The microcomputer of the controller 22 is at least programmed to control the vehicle intersection monitoring system 12 in accordance with the flow charts of FIGS. 31, 32 and 34A through 39 as discussed below. It will be apparent to those skilled in the art from this disclosure that the precise structure and algorithms for the controller 22 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. Furthermore, the controller 22 can communicate with the other components of the vehicle intersection monitoring system 12 discussed herein via, for example a controller area network (CAN) bus or in any other suitable manner as understood in the art.

As further shown in FIG. 2, the vehicle intersection monitoring system 12 includes a navigation system 24. In this example, the navigation system 24 includes a global positioning system (GPS) that receives signals from the two-way wireless communications network 16 via a GPS receiver 26 that is coupled to a GPS antenna 28. The GPS receiver 26 can be, for example, any Wide Area Augmentation System (WAAS) enabled National Marine Electronics Association (NMEA) output receiver as known in the art. However, the navigation system 24 can include any other suitable navigation system as understood in the art. The controller 22 can receive electronic horizon information including, for example, augmented digital map data, from the navigation system 24. As shown in FIG. 3, a vehicle-to-vehicle (V2V) application 100, for example, running on the controller 22 can receive and process the electronic horizon information and host vehicle data, such as information included in the CAN messages as shown in Table 1, as discussed in more detail below. The electronic horizon information will thus enable the controller 22 to detect intersections, in particular, upcoming intersections at which the host vehicle 10 will arrive, from the map data. For example, the electronic horizon information informs the application ECU of an approaching intersection ahead within 300 meters of the center of the intersection. The controller 22 can thus provide details on the intersection. Thus, the controller 22 performs an operation of identifying a road intersection relating to the host vehicle heading and the remote vehicle heading as discussed in more detail below. The identifying can include determining a location of the road intersection based on navigation map data as mentioned above. Moreover, as discussed herein, the determining of the presence of the road intersection includes determining whether the host vehicle 10 and the remote vehicle 14 are travelling on converging paths based on the host vehicle information, the remote vehicle information, or both.

The intersection monitoring system 12 further includes a communication device 30. In this example, the communication device 30 includes a dedicated short range communications (DSRC) device, which can also be referred to in the art as a wireless safety unit (WSU). However, the communication device 30 can be any suitable type of two-way communication device that is capable of communicating with the two-way wireless communications network 16. In this example, the communications device 30 is coupled to a DSRC antenna 32 to receive 5.9 GHz DSRC signals from the two-way wireless communications network 16. These DSRC signals can include basic safety messages (BSM) that include information which, under certain circumstances, warns drivers of potential crashes in time for the driver of the host vehicle 10 to take appropriate action to avoid the crash. In the disclosed embodiments, a BSM includes information in accordance with SAE Standard J2735 as can be appreciated by one skilled in the art. Also, the GPS antenna 28 and the DSRC antenna 32 can be configured as a dual frequency DSRC and GPS antenna as understood in the art.

As further illustrated, the communications device 30 receives GPS signals from the GPS antenna 20. The communication device 30 also receives BSM transmissions (BSM Tx) from the controller 22 to be transmitted via the DSCR antenna 32 for receipt by other vehicles, such as a remote vehicle 14, as discussed in more detail below. For example, at a certain timing (e.g., every 100 msec), a BSM generator 102 (see FIG. 3) running on the controller 22 can collect the data to assemble a packet to transmit a BSM Tx to the communication device 30 for transmission. The BSM generator 102 can collect this data in the form of CAN messages that are communicated over the CAN bus of the host vehicle 10 or in any other suitable manner. For instance, the CAN messages can be communicated from the components of the vehicle 10 over the CAN bus at a certain timing, such as every 20 msec. The BSM generator 102 can thus assembly the data packet and send the data packet to the communication device 30 via, for example, user data protocol (UDP) or in any other suitable manner. Table 1 below describes examples of CAN messages.

TABLE 1

Examples of CAN Message

| Signal Name | CAN Name | Resolution | Offset |
|---|---|---|---|
| Acceleration (G) | LONG_ACC | 0.001 | −2.048 |
| Acceleration (G) | TRANS_ACC | 0.001 | −2.048 |
| Yaw Rate (deg/s) | YAW_RATE | 0.1 | −204.8 |
| Vehicle Speed (km/h) | VSO | 0.01 | 0 |
| Low Beam | HL_LOW_REQ | — | — |
| High Beam | HL_HIGH_REQ | — | — |
| Turn Signal | TURN_IND | — | — |
| Brake Status | CABRESW | — | — |
| Front Wiper | FR_WIP_REQ | — | — |
| Throttle Pos (%) | APSI_A | 0.39216 | 0 |
| Steering Wheel Angle (deg) | STRANGLE | 0.1 | 0 |
| Transmission | CURGP | — | — |
| TCS Status | TCSACT | — | — |
| VDC Status | VDCACT | — | — |
| VDC On/Off | OFF_SW | — | — |
| ABS Status | ABSACT | — | — |

Accordingly, each BSM either transmitted by the host vehicle 10 or transmitted by a remote vehicle 14 can include the following information pertaining to the vehicle issuing the BSM: a temporary vehicle ID, vehicle latitude, vehicle longitude, vehicle elevation, position accuracy, vehicle speed, vehicle heading, vehicle steering wheel angle, vehicle acceleration (e.g., lateral, longitudinal, vertical and yaw rate), vehicle brake status and vehicle size, to name a few. Naturally, each BSM can include additional or fewer data as necessary or desired.

Table 2 below provides examples of certain vehicle data specifications relating to features of the host vehicle 10 and remote vehicle 14 on which data included in the BSMs is based.

TABLE 2

Exemplary Vehicle Data Specifications

| Data Element | Element Specifications |
|---|---|
| Transmission State | Ability to differentiate between neutral, park, forward and reverse |
| Vehicle Speed | 0.02 m/s resolution |
| Steering Wheel Angle | 1.5 degree resolution |
| Vehicle Lateral Acceleration | 0.01 m/s^2 resolution |
| Vehicle Longitudinal Acceleration | 0.01 m/s^2 resolution |
| Vehicle Yaw Rate | 0.01 deg/sec resolution |
| Brake Application Status | Ability to determine if brakes are applied |
| Vehicle Length | 0.01 m resolution |
| Vehicle Width | 0.1 m resolution |

Table 3 below provides examples of desired resolution of measurement data that is, for example, included in the BSMs.

TABLE 3

Exemplary Positioning Data Specifications

| Data Element | Element Specifications |
|---|---|
| Position Latitude | 0.1 μdegree resolution |
| Position Longitude | 0.1 μdegree resolution |
| Vehicle Heading | 0.0125 deg resolution |

As further illustrated, the communication device 30 provides an echo of the above BSM Tx (BSM Tx Echo) to the controller 22 via, for example, a UDP port, with GPS information included in the BSM Tx Echo message. In this example, a message dispatcher 104 running on the controller 22 sends the BSM Tx Echo message to a global share application 106 running on the controller 22.

In addition, the communication device 30 receives BSMs (BSM Rx) that were transmitted by remote vehicles 14 within a certain range of the host vehicle 10. The communication device 30 provides received BSMs to the controller 22 via, for example, a UDP port. The message dispatcher 104 in this example sends the BSM Rx to a BSM classification application 108 running on the controller 22. The BSM classification application 108 also receives host vehicle data, such as information included in the CAN messages as shown in Table 1. The BSM classification application 108 can extract information from BSMs that were received from remote vehicles 14 within a certain range of the host vehicle 10, such as within 300 meters of the host vehicle 10 or at any other suitable distance from the host vehicle 10.

Accordingly, by exchanging the BSMs, the host vehicle 10 and the remote vehicle 14 exchange host vehicle information and remote vehicle information between each other, with the host vehicle information including information pertaining to a host vehicle location, a host vehicle heading and a host vehicle intended next maneuver and the remote vehicle information including information pertaining to a remote vehicle location, a remote vehicle heading and a remote vehicle intended next maneuver. As discussed herein, the intended next maneuver of the remote vehicle 14 can be determined based on a condition of a turn signal on the remote vehicle 14. Similarly, the intended next maneuver of the host vehicle 10 can be determined based on a condition of a turn signal on the host vehicle 10. Alternatively, the intended next maneuver of the remote vehicle 14 can be determined based on a set navigation route for the remote vehicle 14 that can be set by, for example, the navigation system 24 on the remote vehicle 14. Also, the intended next maneuver of the host vehicle 10 can be determined based on a set navigation route for the host vehicle 10 that can be set by, for example, the navigation system 24 on the host vehicle 10. As discussed in more detail below, the intended next maneuver of the remote vehicle 14 can be determined as a straight movement of the remote vehicle 14 at the intersection, a left turn of the remote vehicle 14 at the intersection or a right turn of the remote vehicle 14 at the intersection. Similarly, the intended next maneuver of the host vehicle 10 can be determined as a straight movement of the host vehicle 10 at the intersection, a left turn of the host vehicle 10 at the intersection or a right turn of the host vehicle 10 at the intersection.

The BSM classification application 108 can also, for example, cache BSM messages received from one or more remote vehicles 14 in a cache table, which can also be referred to as a lookup table. The cache table in this example can include up to 16 entries. However, the cache table can be any suitable size. The cache table can include information representing the host vehicle intended next maneuver; the remote vehicle intended next maneuver; the host vehicle location, the remote vehicle location and any other suitable information included in the BSMs which can then be retrieved for use as discussed herein. Also, the controller 22 can receive and process BSMs from many remote vehicles 14 at the same time. For example, the controller 22 can receive and process BSMs from 100 remote vehicles 14, or any other suitable number of remote vehicles 14, at the same time. Upon receiving a BSM from a remote vehicle 14, the controller 22 can determine whether there is a possibility that remote vehicle 14 may contact thus host vehicle 10 and thus represents a potential threat vehicle (TV) to the host vehicle 10. If the remote vehicle 14 does not represent a threat, the controller 22 can, for example, discard the data included in the BSM. The controller 22 can also discard a BSM from the cached after a period of time, for example, 0.5 seconds or any suitable length of time.

As further shown in FIG. 3, the message dispatcher 104 can send geometric intersection description (GID) information and signal phase and timing (SPaT) information that is included, for example, in the GPS information received by the communication device 30 to a vehicle-to-interface (V2I) application 110 running on the controller 22. The V2I application 110 also receives host vehicle data, such as information included in the CAN messages as shown in Table 1.

As further shown in FIG. 2, the vehicle intersection monitoring system 12 includes a driver-vehicle interface (DVI) 34 and an external input/output (I/O) 36. As discussed in more detail below, if there are any remote vehicles 14 that the controller 22 identifies as potential threat vehicles requiring DVI action, the controller 22 can send threat information, such as a UDP broadcast packet, to the DVI 34 via the CAN bus for example. For example, as shown in FIG. 3, a threat/notify/warn application 112 running on the controller 22 receives information from the V2V application 100 and the V2I application 110. The V2V application 100 generates this information based on the BSM information received from the BSM classification application 108, the electronic horizon information, and the host vehicle data as discussed above. The V2I application 110 generates information based on the host vehicle data, GID information, and SPaT information as discussed above.

The threat information generated by the threat/notify/warn application 112 can list all of the identified remote vehicles 14 that are threat vehicles and include BSM information from the remote vehicles 14 that are threat vehicles and the types of alerts and warnings attributed to those remote vehicles 14. As shown in FIG. 3, threat/notify/warn application 112 can issue DVI status information, and can further issue DVI outputs via, for example, a DVI output application 114 running on the controller 22. The DVI 34 can provide an alert and warning information to the driver based on the threat information as discussed in more detail below. The alert can be a visual alert, and audible alert, a tactile alert, or any combination of these types of alerts. The warnings should convey high urgency causing the driver to immediately pause before making the decision to proceed through an intersection. In addition, the warnings should be noticeable to the driver regardless of their head position and distraction level. Thus, the warnings should be distinguishable from ambient noise and so on.

For example, an auditory signal can be emitted as a warning from a speaker mounted in front of the driver on the instrument panel. The warning can be about 1 second in length and can include a car horn icon immediately followed by a "warning" spearcon which is created by speeding up a spoken phrase in particular ways. The sound level of the auditory warning is set at a level that is noticeable against ambient road noise and radio. The visual warning is presented using the DVI display described above on, for example, the instrument panel near the drivers forward eye gaze position and includes multiple visual icons corresponding to the different warning scenarios. The auditory warning conveys high urgency and can be the primary warning causing the driver to immediately pause. In addition to the auditory warning, the visual display is also intended to get the driver's attention and communicates the nature of the warning to the driver once the potential threat has passed. Also, for people with hearing impairment, the DVI display is can serve as the primary source of warning due its location and the large size of the display.

The controller 22 can also send messages to actuate other advance driver assistance system (ADAS) applications. The controller 22 can also exchange data with an external device via the I/O 36.

In addition, as discussed in more detail below, the controller 22 can issue commands via the CAN bus, for example, to other vehicle components 38 when the controller 22 determines that one or more of the remote vehicles 14 is a potential threat vehicle. For instance, the controller 22 may issue brake commands over the CAN bus to maintain the host vehicle 10 in a stopped state even when the driver releases the brake in the presence of an approaching remote vehicle 14 as discussed in more detail below. The controller 22 may also issue steering commands to change a steering direction of the host vehicle 10 in the presence of an approaching remote vehicle 14 as discussed in more detail below. Thus, the controller 22 performs a threat mitigation operation by altering a trajectory of the host vehicle 10. The altering of the trajectory of the host vehicle 10 can be performed by operating a steering wheel to change a steering direction of the host vehicle 10, operating a brake, accelerator or both to change the speed of the host vehicle, or in any other suitable manner. The other vehicle components 38 can also include one or more safety devices such as a safety belt, an airbag system, and a horn. Thus, the controller 22 can perform a threat mitigation operation by pretensioning a safety belt, deploying an airbag, operating a horn in the host vehicle, or any of these functions. Furthermore, the host vehicle 10 can include one or more on-board sensors 40 such as a RADAR device, a LIDAR device, a SONAR device, a camera and so on that can detect the presence of objects, such as a remote vehicle (RV) 14, proximate to the host vehicle 10. The sensor or sensors 40 can communicate with the controller 22 via, for example, the CAN bus or in any other suitable manner.

Examples of operations performed by the intersection monitoring system 12 to determine whether a warning should be provided in view of different scenarios in which the host vehicle 10 and remote vehicle 14 are approaching or at an intersection. FIGS. 4 through 30 are exemplary diagrams illustrating different intersection scenarios that are handled by the intersection monitoring system 12 according to disclosed embodiments. That is, based on the travelling conditions of the host vehicle 10 and remote vehicle 14 (straight, left turn or right turn), there are 27 total intersection scenarios. Out of those 27 scenarios, there are a total of 14 scenarios can result in the host vehicle 10 and remote vehicle 14 coming in contact with each other. The intersection monitoring system 12 can thus issue a warning to the host vehicle 10 during any of these 14 scenarios depending on the operating condition of the host vehicle 10 and the remote vehicle 14 as discussed in more detail below. In this example, the intersection monitoring system 12 determines whether the host vehicle 10 and remote vehicle 14 are travelling straight, turning left or turning right based on the condition of the turn signals of the host vehicle 10 and the remote vehicle 14. The turn signal conditions of the host vehicle 10 and the remote vehicle 14 can be contained in the information included in the BSMs transmitted by the host vehicle 10 and remote vehicle 14 as discussed above.

In this example, the controller 22 can refer to a truth table as shown in Table 4 to determine which of the 27 scenarios exists. The controller 22 can thus determine from the truth table whether the remote vehicle (RV) 14 is a threat vehicle (TV) that may come in contact with the host vehicle 10.

TABLE 4

Threat Use Case Truth Table

| | | AB | | | |
|---|---|---|---|---|---|
| | | 00 | 01 | 11 | 10 |
| C | 0000 | 0 | 1 | 0 | X |
| D | 0001 | 1 | 1 | 1 | X |
| E | 0011 | 1 | 1 | 0 | X |
| F | 0010 | X | X | X | X |
| | 0110 | X | X | X | X |
| | 0100 | 1 | 0 | 1 | X |
| | 0101 | 1 | 1 | 0 | X |
| | 0111 | 1 | 1 | 0 | X |
| | 1111 | 1 | 0 | 0 | X |
| | 1110 | X | X | X | X |
| | 1100 | 0 | 1 | 0 | X |
| | 1101 | 0 | 0 | 0 | X |
| | 1001 | X | X | X | X |
| | 1011 | X | X | X | X |
| | 1010 | X | X | X | X |
| | 1000 | X | X | X | X |

According to the truth table, the travel condition of the host vehicle 10 is represented by the two digit binary code AB. That is, code AB=00 indicates that the host vehicle 10 intends to travel straight through the intersection, code AB=01 indicates that the host vehicle 10 intends to turn left at the intersection, and code AB=11 indicates that the host vehicle 10 intends to turn right at the intersection. The code AB=10 is not used. Furthermore, the travel condition of the remote vehicle 14 is represented by the four digit binary code CDEF.

Examples of the relationships between the host vehicle 10 and the remote vehicle 14 based on their respective intentions at the intersection are shown in FIGS. 4 through 30 and represented in Tables 5 through 7 below. In Table 5, the host vehicle 10 intends to travel straight through the intersection, and the different intentions of the remote vehicle 14 are represented by the different codes CDEF as explained in Table 5. Thus, each of the six digit binary codes ABCDEF is a combination of the two digit code AB and the four digit code CDEF as indicated. The controller 22 therefore determines whether a threat of contact between the host vehicle 10 and remote vehicle 14 exists for each scenario, as represented by a binary 0 for no threat and a binary 1 for a possible threat.

TABLE 5

Host Vehicle Travelling Straight

| Host Vehicle | Code AB | Remote Vehicle | Code CDEF | Full Code ABCDEF | Threat |
|---|---|---|---|---|---|
| Straight | 00 | Straight/Opposite | 0000 | 000000 | 0 |
| Straight | 00 | Straight/Left | 0001 | 000001 | 1 |
| Straight | 00 | Straight/Right | 0011 | 000011 | 1 |
| Straight | 00 | Left turn/Opposite | 0100 | 000100 | 1 |
| Straight | 00 | Left turn/Left | 0101 | 000101 | 1 |
| Straight | 00 | Left turn/Right | 0111 | 000111 | 1 |
| Straight | 00 | Right turn/Opposite | 1100 | 001100 | 0 |
| Straight | 00 | Right turn/Left | 1101 | 001101 | 0 |
| Straight | 00 | Right turn/Right | 1111 | 001111 | 1 |

Figure 4:
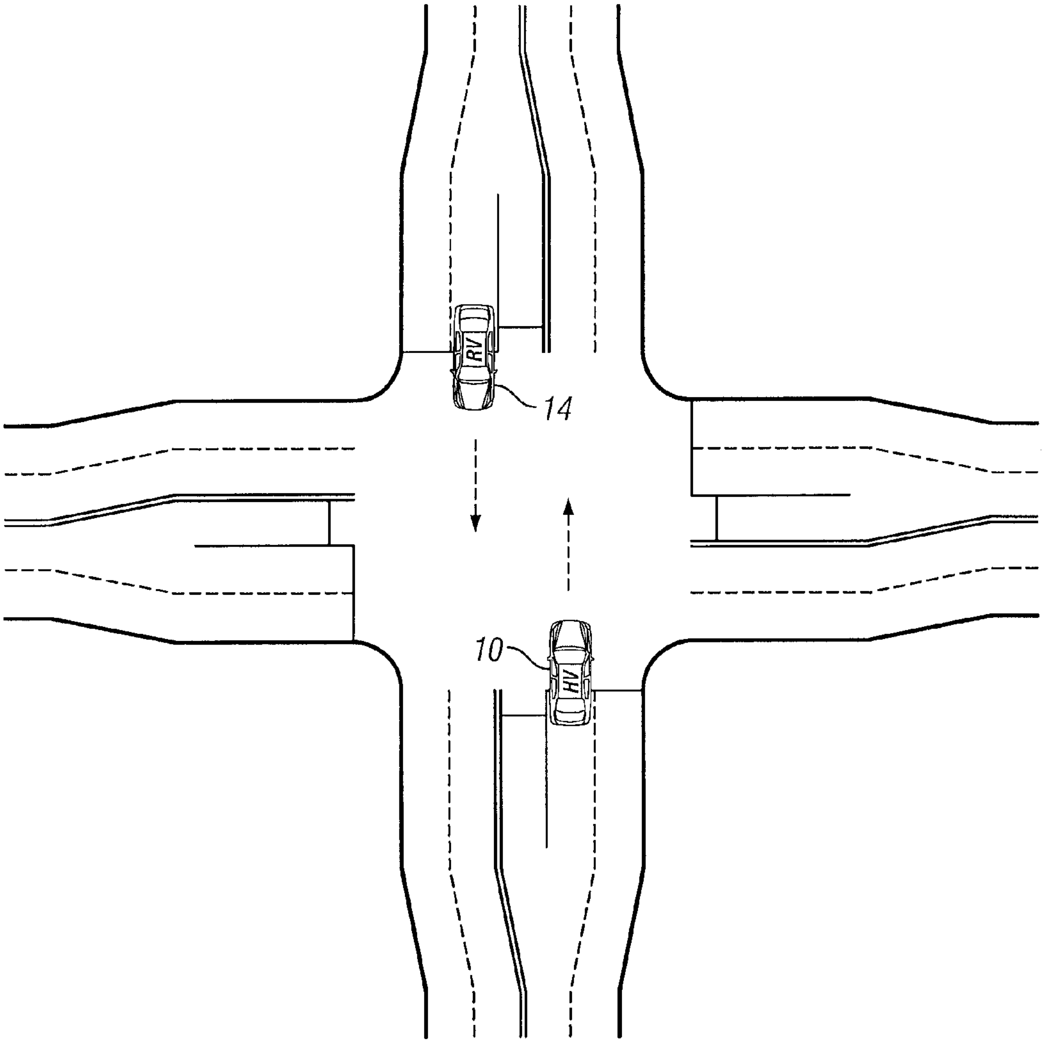
FIGS. 4 through 30 are exemplary diagrams illustrating different intersection scenarios that are handled by the intersection monitoring system according to disclosed embodiments.

These nine different scenarios are shown graphically in FIGS. 4 through 12. For purposes of these examples, the remote vehicle (RV) 14 is referred to as a threat vehicle (TV) whenever a threat of contact between the host vehicle 10 and remote vehicle 14 exists (i.e. when the threat condition is indicated as 1). That is, FIG. 4 illustrates Scenario 1 where the host vehicle 10 and remote vehicle 14 are each intending to travel straight through the intersection parallel to each other in opposite directions. Therefore, no threat of contact exists between the host vehicle 10 and the remote vehicle 14, and the threat condition is indicated as 0 in Table 5.

Figure 5:
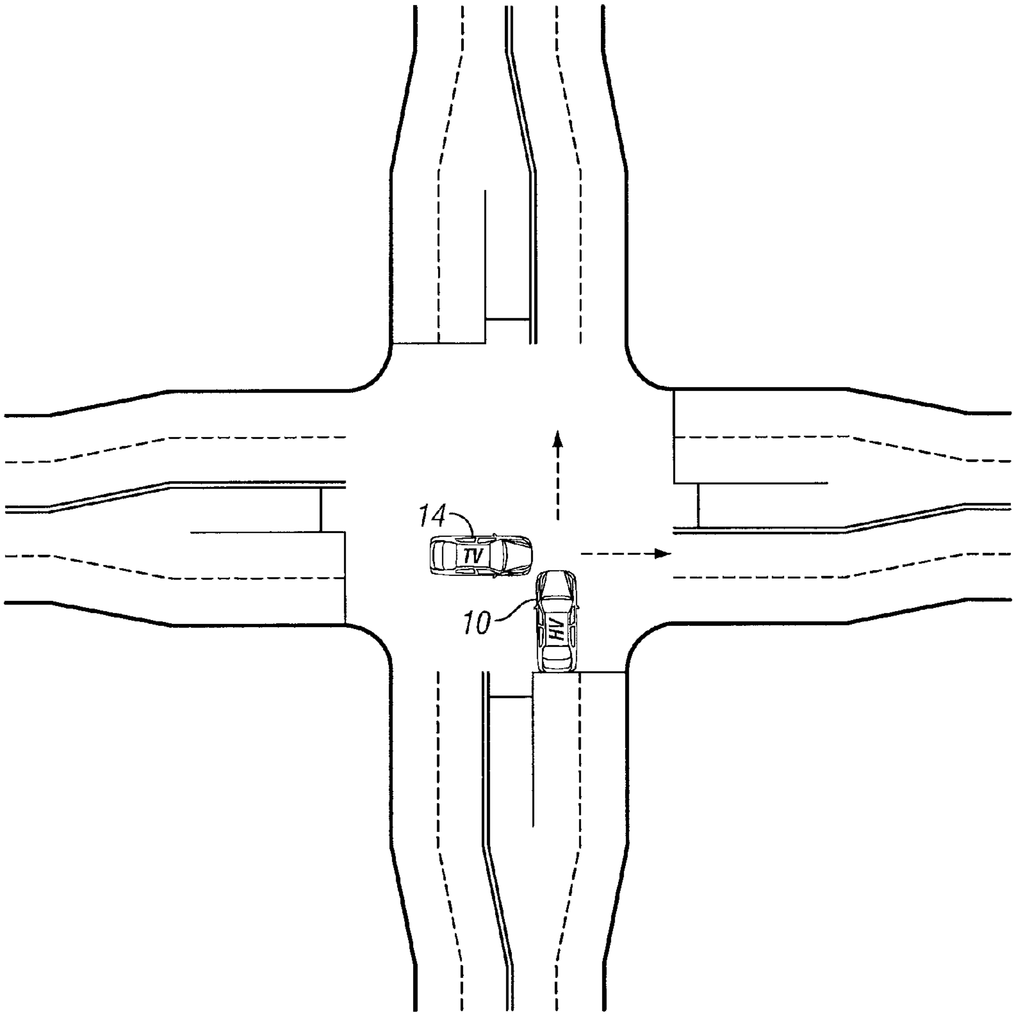
Figure 6:
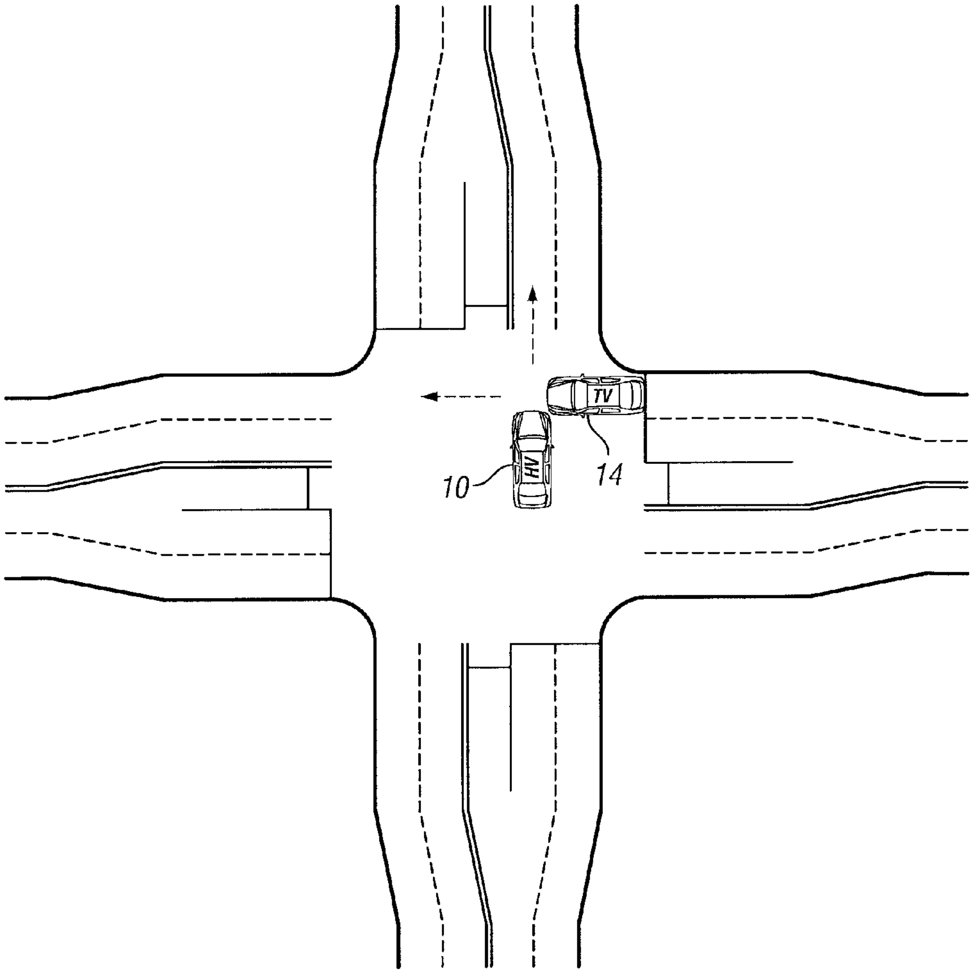

However, FIG. 5 illustrates Scenario 2 where the host vehicle 10 is intending to travel straight through the intersection and the remote vehicle 14 is intending to travel straight through the intersection in a direction from the left of the host vehicle 10 which will intersect the travel path of the host vehicle 10. Therefore, a threat of contact exists between the host vehicle 10 and the remote vehicle 14, and the threat condition is indicated as 1 in Table 5. Similarly, FIG. 6 illustrates Scenario 3 where the host vehicle 10 is intending to travel straight through the intersection and the remote vehicle 14 is intending to travel straight through the intersection in a direction from the right of the host vehicle 10 which will intersect the travel path of the host vehicle 10. Therefore, a threat of contact exists between the host vehicle 10 and the remote vehicle 14, and the threat condition is indicated as 1 in Table 5.

Figure 7:
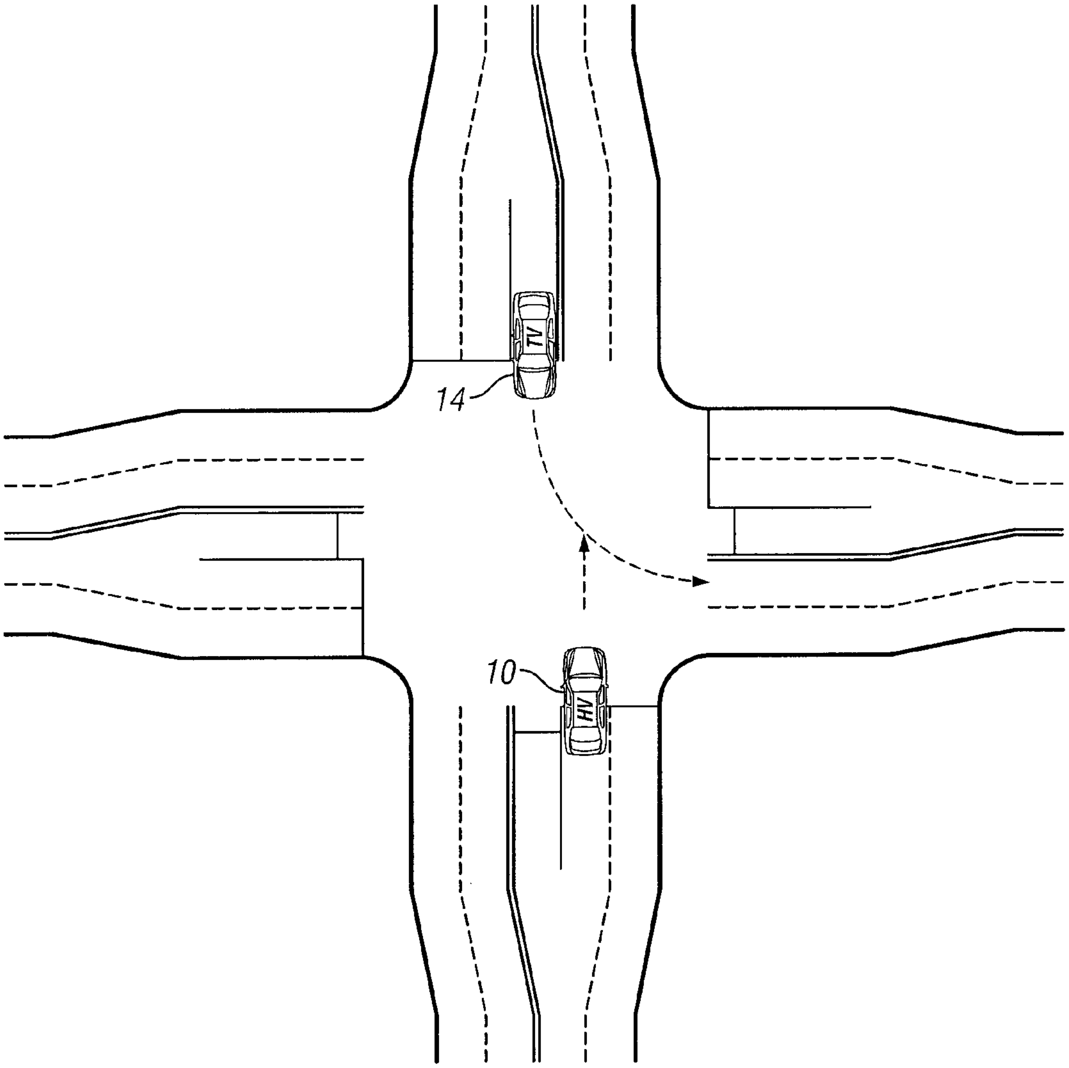
Figure 8:
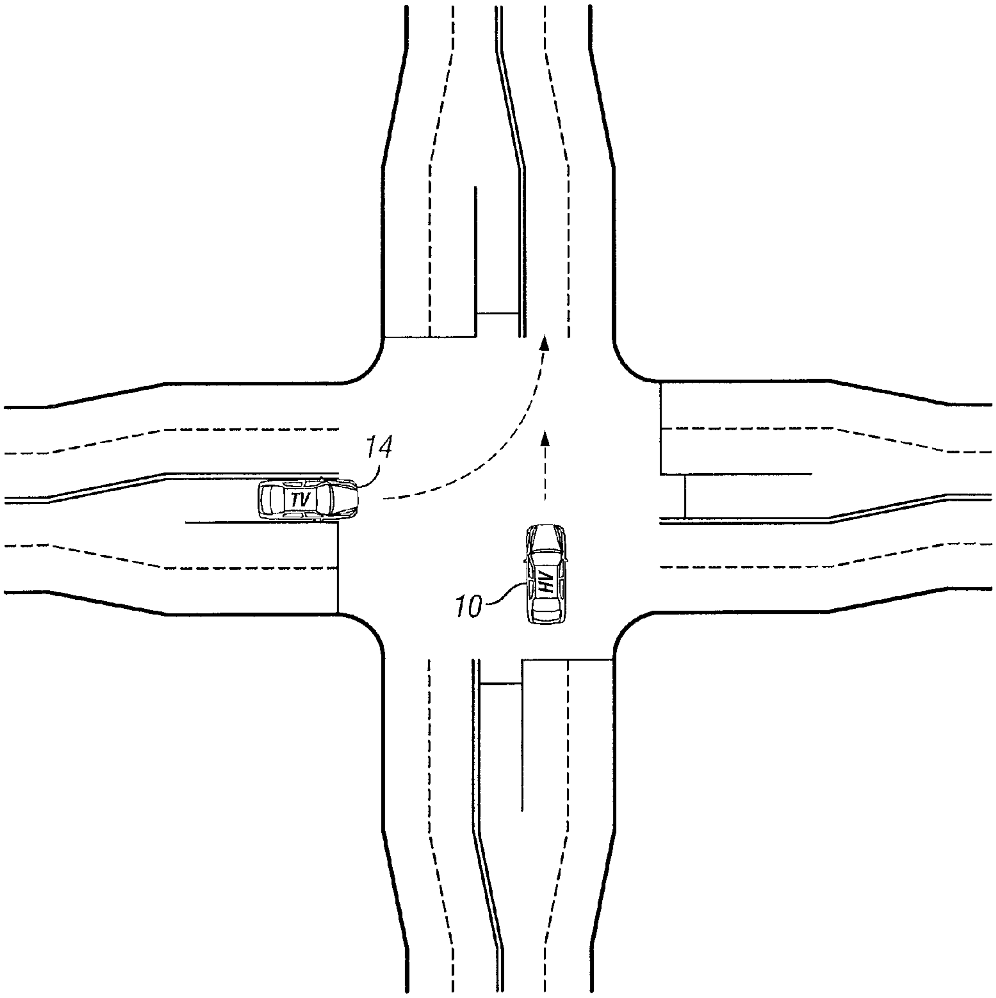
Figure 9:
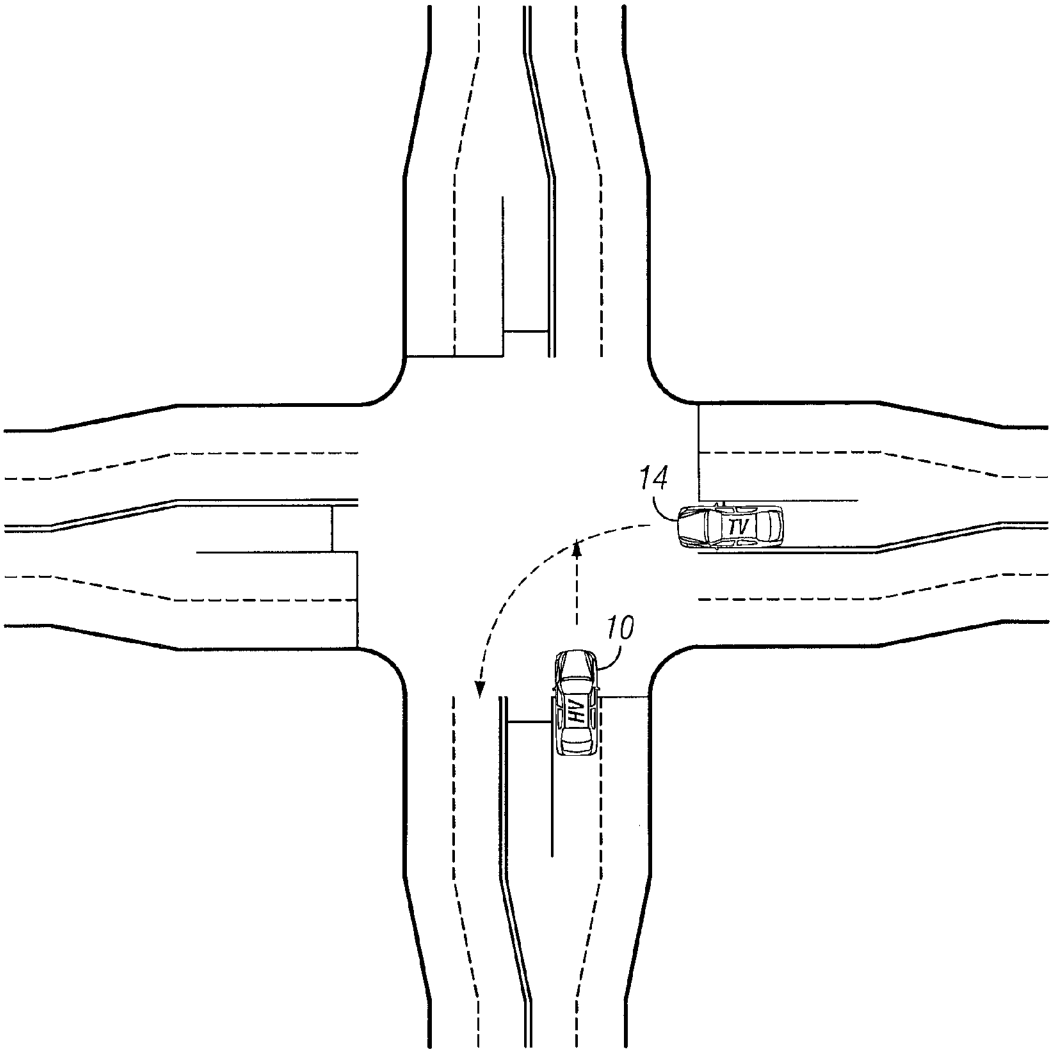

FIG. 7 illustrates Scenario 4 where the host vehicle 10 is intending to travel straight through the intersection and the remote vehicle 14 is travelling in a direction opposite to the host vehicle 10 and intending to turn left through the intersection in a direction which will intersect the travel path of the host vehicle 10. Therefore, a threat of contact exists between the host vehicle 10 and the remote vehicle 14, and the threat condition is indicated as 1 in Table 5. FIG. 8 illustrates Scenario 5 where the host vehicle 10 is intending to travel straight through the intersection and the remote vehicle 14 is travelling in a direction from the left of the host vehicle 10 and intending to turn left through the intersection in a direction which will intersect the travel path of the host vehicle 10. Therefore, a threat of contact exists between the host vehicle 10 and the remote vehicle 14, and the threat condition is indicated as 1 in Table 5. FIG. 9 illustrates Scenario 6 where the host vehicle 10 is intending to travel straight through the intersection and the remote vehicle 14 is travelling in a direction from the right of the host vehicle 10 and intending to turn left through the intersection in a direction which will intersect the travel path of the host vehicle 10. Therefore, a threat of contact exists between the host vehicle 10 and the remote vehicle 14, and the threat condition is indicated as 1 in Table 5.

Figure 10:
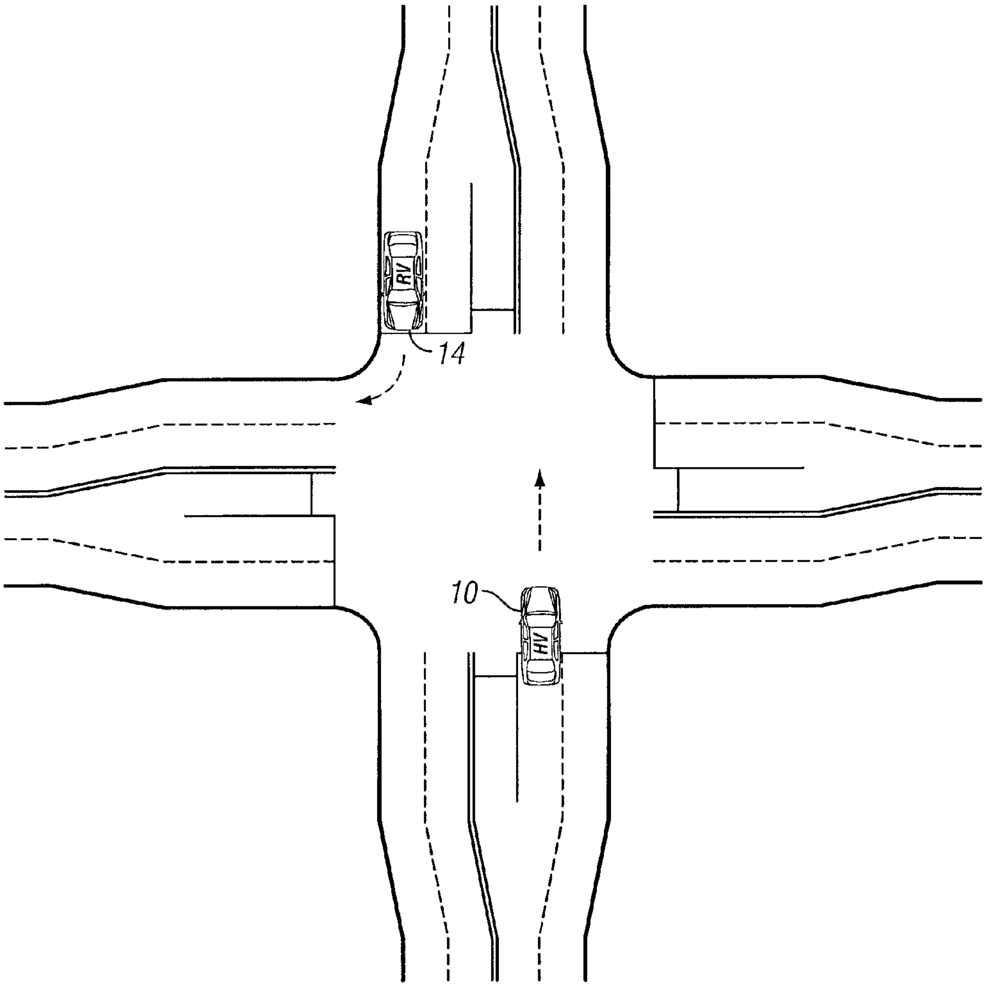
Figure 11:
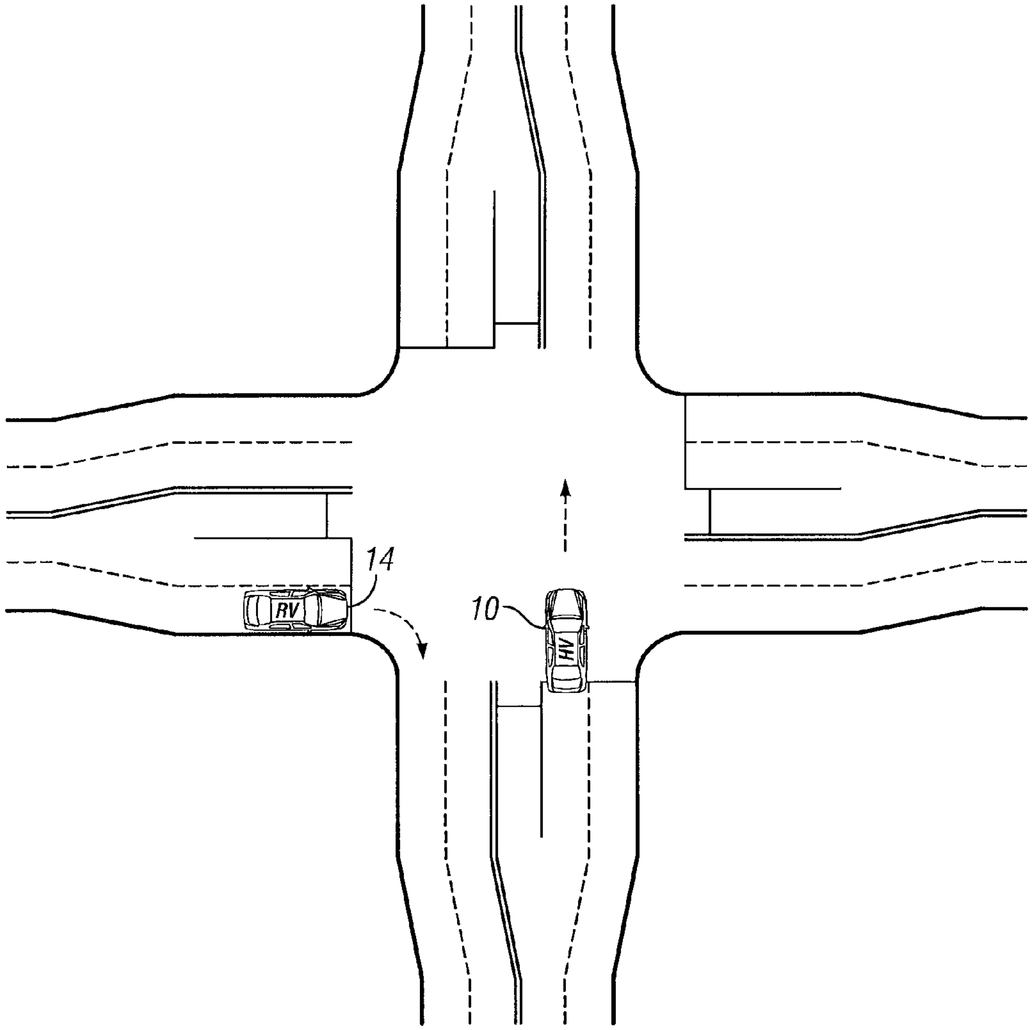
Figure 12:
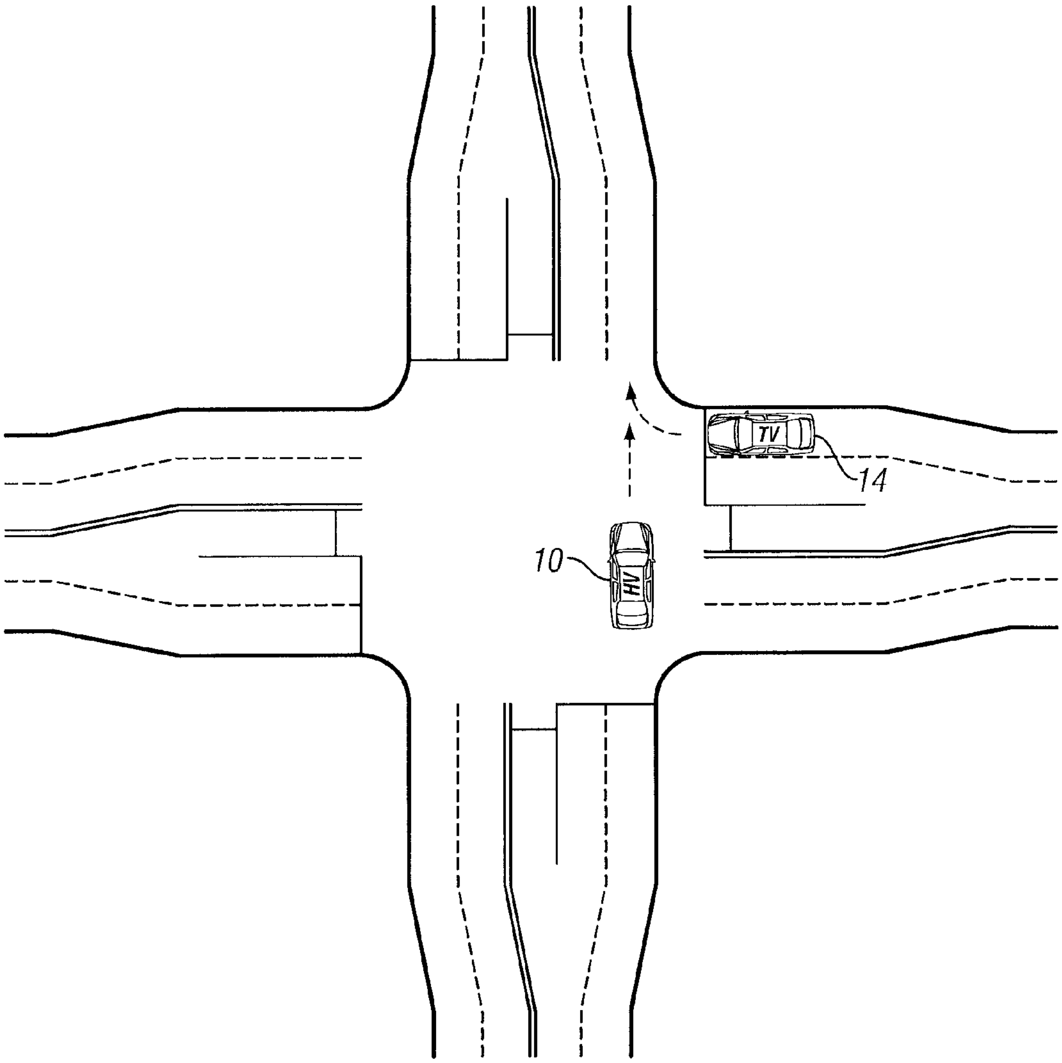

FIG. 10 illustrates Scenario 7 where the host vehicle 10 is intending to travel straight through the intersection and the remote vehicle 14 is travelling in a direction opposite to the host vehicle 10 and intending to turn right through the intersection in a direction which will not intersect the travel path of the host vehicle 10. Therefore, no threat of contact exists between the host vehicle 10 and the remote vehicle 14, and the threat condition is indicated as 0 in Table 5. FIG. 11 illustrates Scenario 8 where the host vehicle 10 is intending to travel straight through the intersection and the remote vehicle 14 is travelling in a direction from the left of the host vehicle 10 and intending to turn right through the intersection in a direction which will not intersect the travel path of the host vehicle 10. Therefore, no threat of contact exists between the host vehicle 10 and the remote vehicle 14, and the threat condition is indicated as 0 in Table 5. FIG. 12 illustrates Scenario 9 where the host vehicle 10 is intending to travel straight through the intersection and the remote vehicle 14 is travelling in a direction from the right of the host vehicle 10 and intending to turn right through the intersection in a direction which will intersect the travel path of the host vehicle 10. Therefore, a threat of contact exists between the host vehicle 10 and the remote vehicle 14, and the threat condition is indicated as 1 in Table 5.

In Table 6, the host vehicle 10 intends to turn left through the intersection, and the different intentions of the remote vehicle 14 are represented by the different codes CDEF as explained in Table 6. The controller 22 therefore determines whether a threat of contact between the host vehicle 10 and remote vehicle 14 exists for each scenario, as represented by a binary 0 for no threat and a binary 1 for a possible threat.

TABLE 6

Host Vehicle Turning Left

| Subject Vehicle | Code AB | Remote Vehicle | Code CDEF | Full Code ABCDEF | Threat |
|---|---|---|---|---|---|
| Left turn | 01 | Straight/Opposite | 0000 | 010000 | 1 |
| Left turn | 01 | Straight/Left | 0001 | 010001 | 1 |
| Left turn | 01 | Straight/Right | 0011 | 010011 | 1 |
| Left turn | 01 | Left turn/Opposite | 0100 | 010100 | 0 |
| Left turn | 01 | Left turn/Left | 0101 | 010101 | 1 |
| Left turn | 01 | Left turn/Right | 0111 | 010111 | 1 |
| Left turn | 01 | Right turn/Opposite | 1100 | 011100 | 1 |
| Left turn | 01 | Right turn/Left | 1101 | 011101 | 0 |
| Left turn | 01 | Right turn/Right | 1111 | 011111 | 0 |

Figure 13:
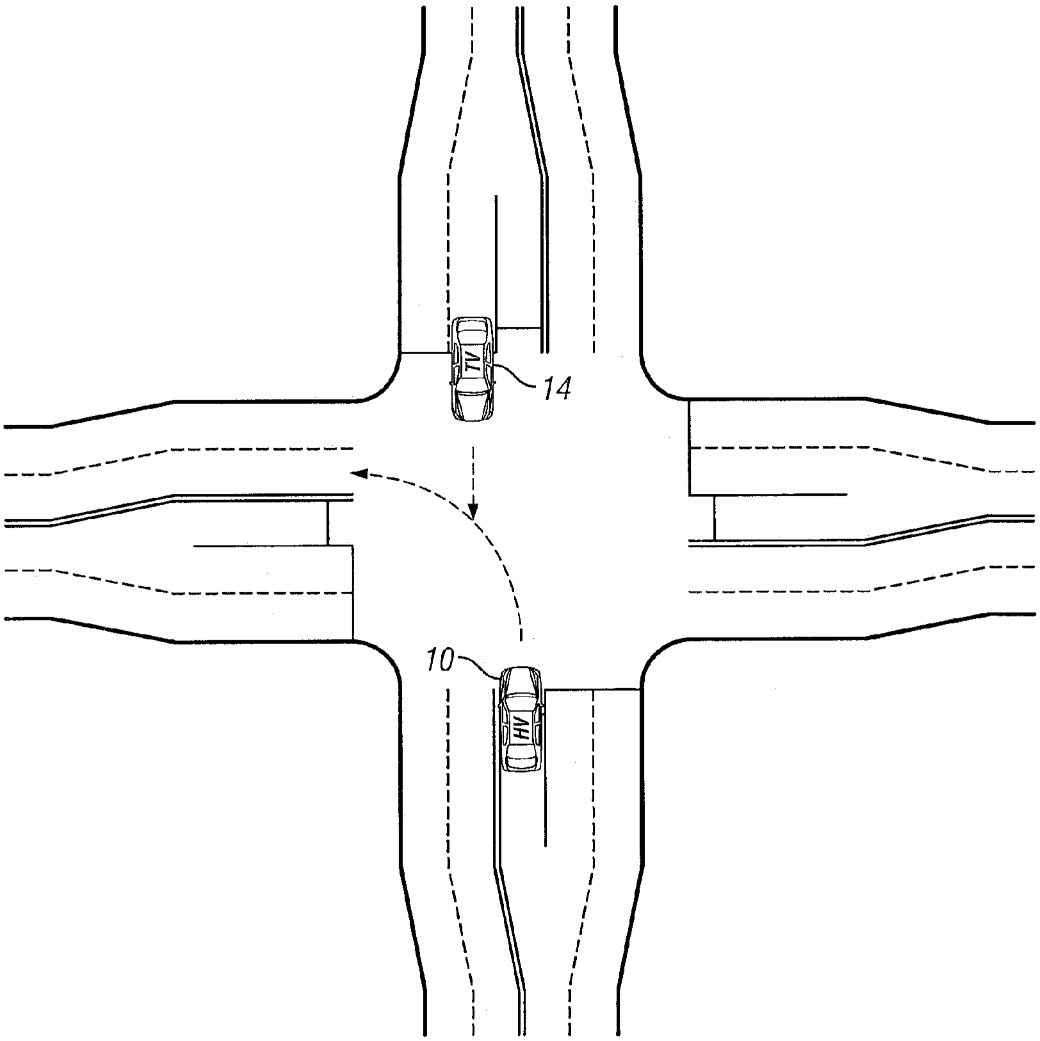

These nine different scenarios are shown graphically in FIGS. 13 through 21. FIG. 13 illustrates Scenario 10 where the host vehicle 10 and remote vehicle 14 are travelling in opposite directions to each other, with the remote vehicle 14 intending to travel straight through the intersection and the host vehicle 10 intending to turn left in the intersection across the path of remote vehicle 14. Therefore, a threat of contact exists between the host vehicle 10 and the remote vehicle 14, and the threat condition is indicated as 1 in Table 6.

Figure 14:
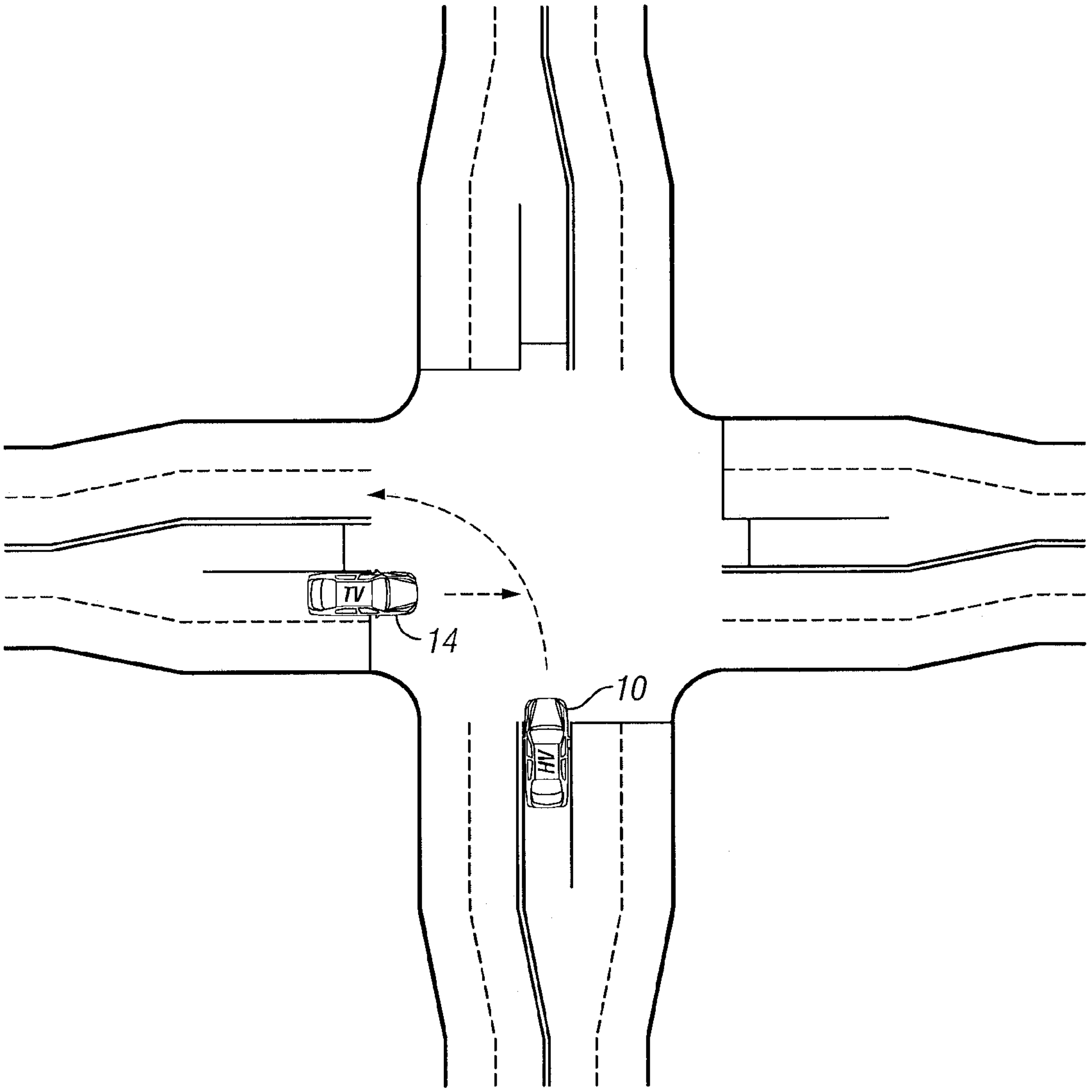
Figure 15:
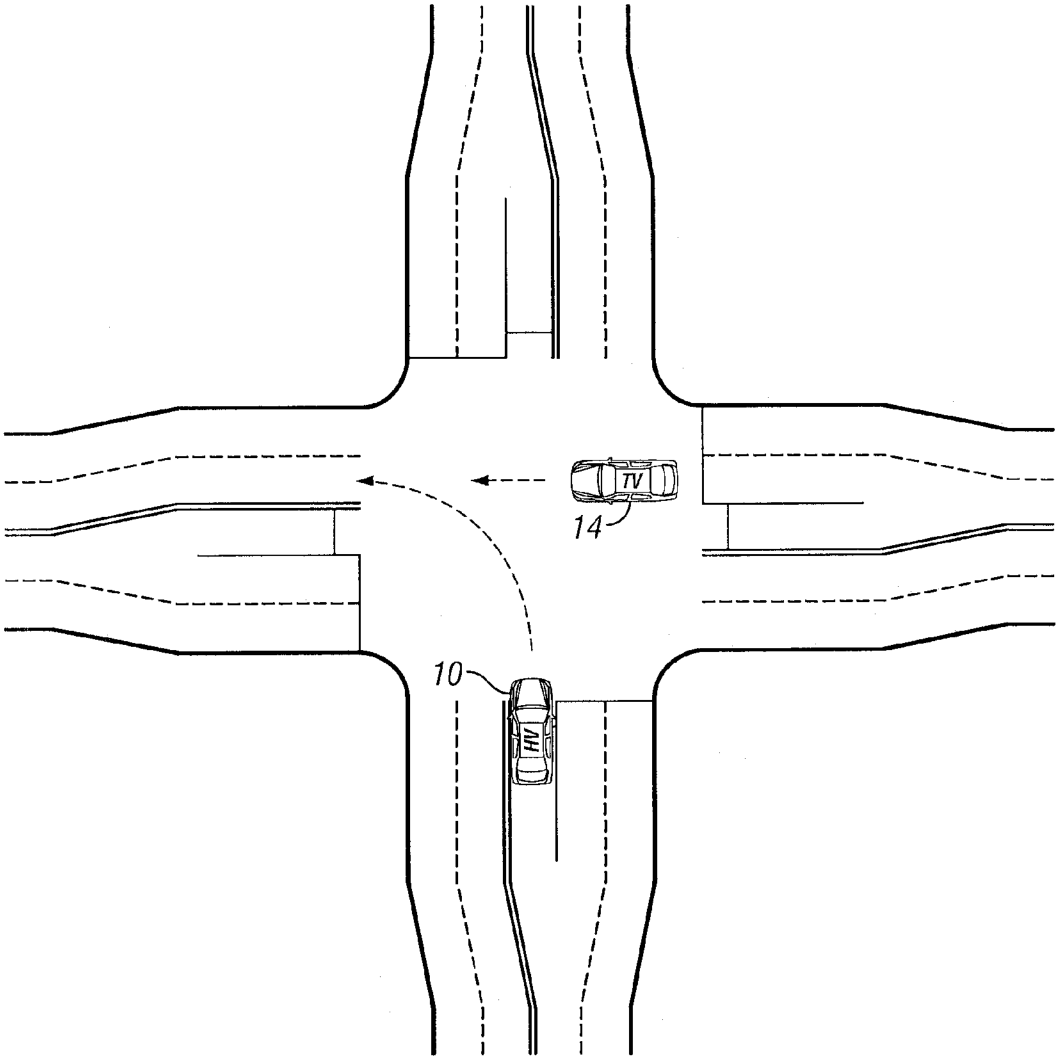

FIG. 14 illustrates Scenario 11 where the host vehicle 10 is intending to turn left through the intersection and the remote vehicle 14 is intending to travel straight through the intersection in a direction from the left of the host vehicle 10 which will intersect the travel path of the host vehicle 10. Therefore, a threat of contact exists between the host vehicle 10 and the remote vehicle 14, and the threat condition is indicated as 1 in Table 6. Similarly, FIG. 15 illustrates Scenario 12 where the host vehicle 10 is intending to turn left through the intersection and the remote vehicle 14 is intending to travel straight through the intersection in a direction from the right of the host vehicle 10 which will intersect the travel path of the host vehicle 10. Therefore, a threat of contact exists between the host vehicle 10 and the remote vehicle 14, and the threat condition is indicated as 1 in Table 6.

Figure 16:
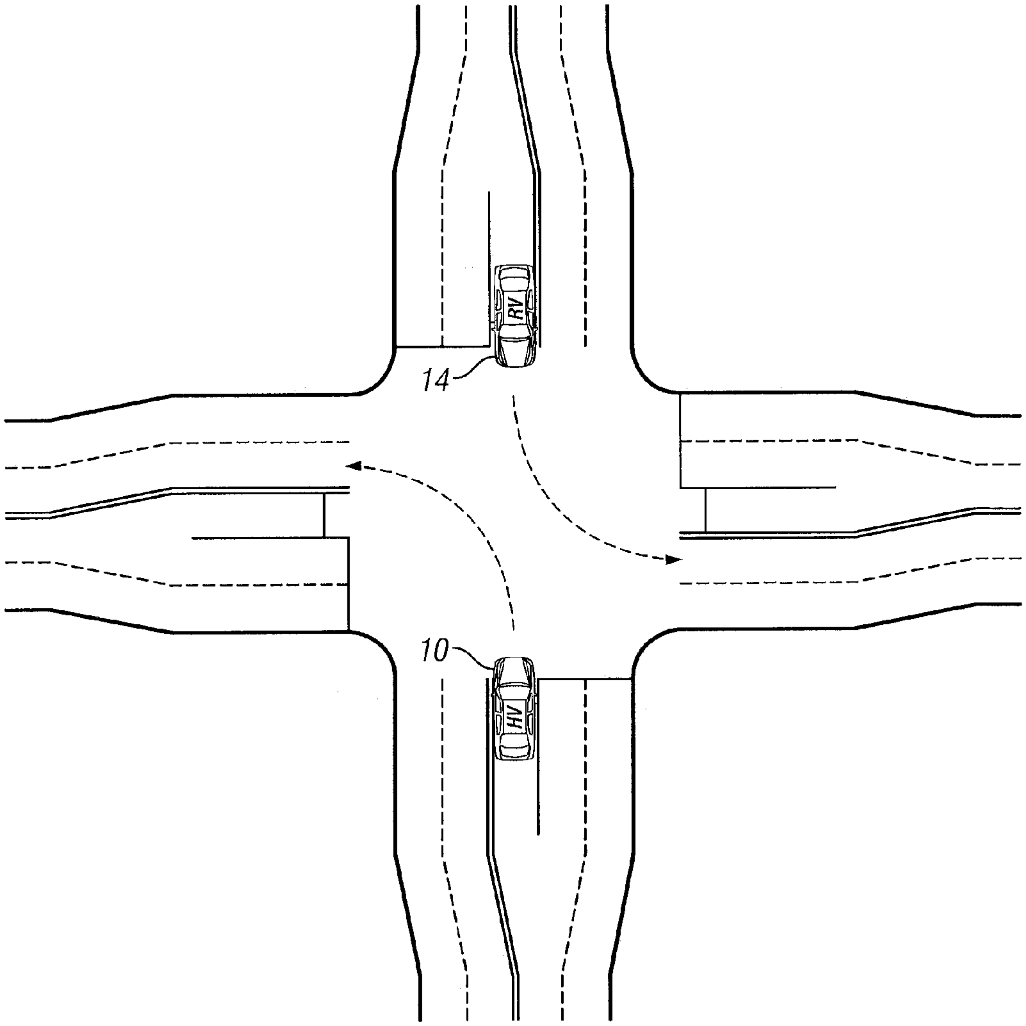
Figure 17:
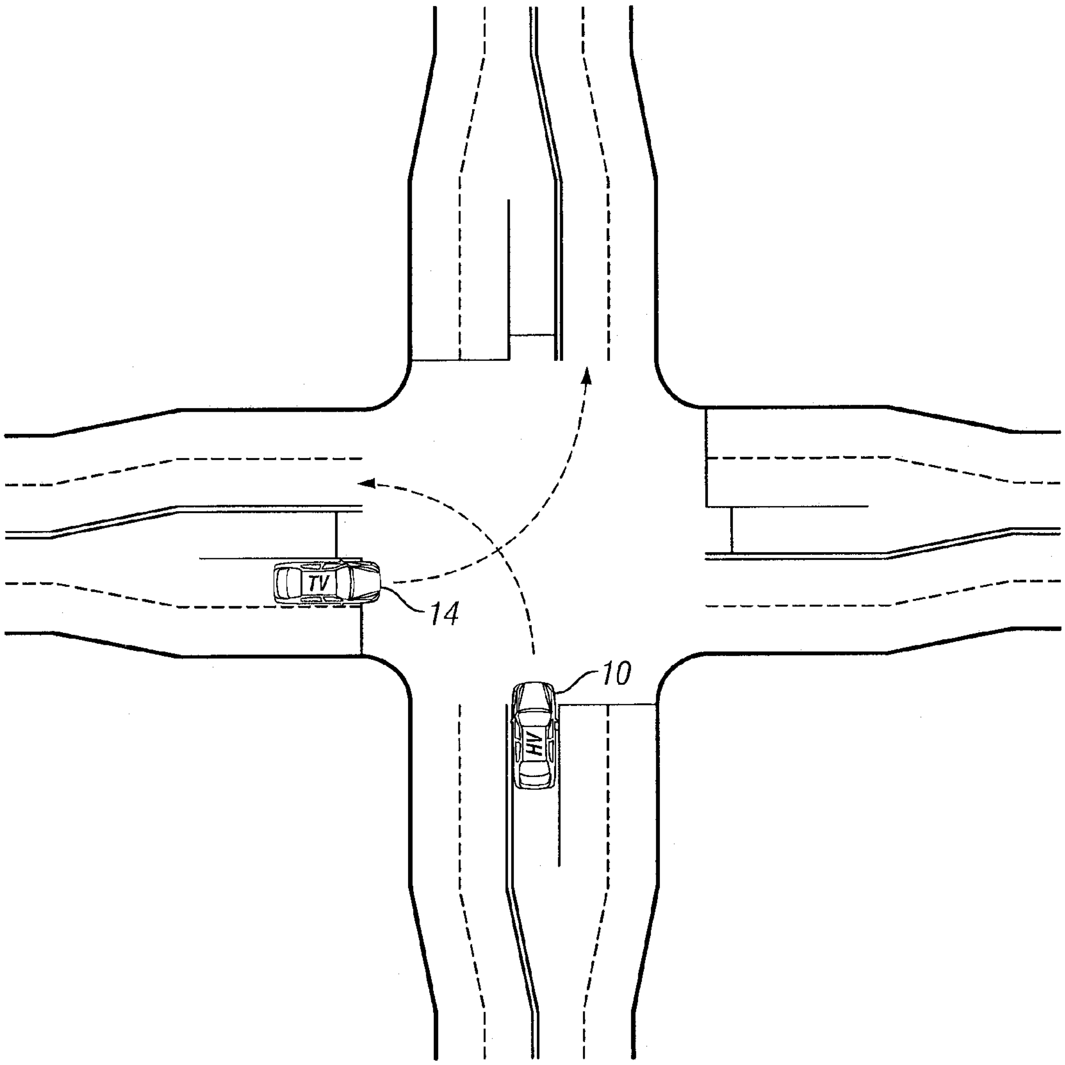
Figure 18:
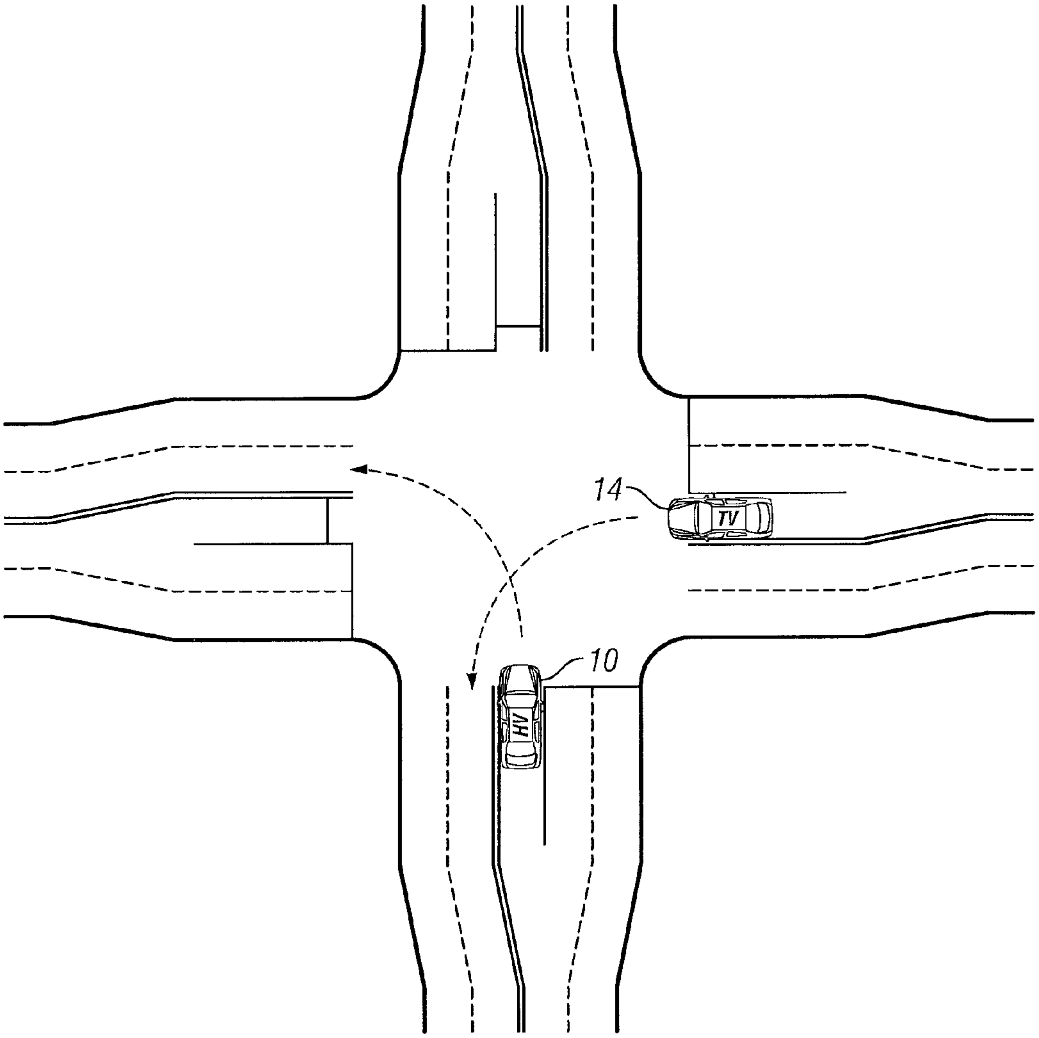

FIG. 16 illustrates Scenario 13 where the host vehicle 10 is intending to turn left through the intersection and the remote vehicle 14 is travelling in a direction opposite to the host vehicle 10 and intending to turn left through the intersection in a direction which will not intersect the travel path of the host vehicle 10. Therefore, no threat of contact exists between the host vehicle 10 and the remote vehicle 14, and the threat condition is indicated as 0 in Table 6. FIG. 17 illustrates Scenario 14 where the host vehicle 10 is intending to turn left through the intersection and the remote vehicle 14 is travelling in a direction from the left of the host vehicle 10 and intending to turn left through the intersection in a direction which will intersect the travel path of the host vehicle 10. Therefore, a threat of contact exists between the host vehicle 10 and the remote vehicle 14, and the threat condition is indicated as 1 in Table 6. FIG. 18 illustrates Scenario 15 where the host vehicle 10 is intending to turn left through the intersection and the remote vehicle 14 is travelling in a direction from the right of the host vehicle 10 and intending to turn left through the intersection in a direction which will intersect the travel path of the host vehicle 10. Therefore, a threat of contact exists between the host vehicle 10 and the remote vehicle 14, and the threat condition is indicated as 1 in Table 6.

Figure 19:
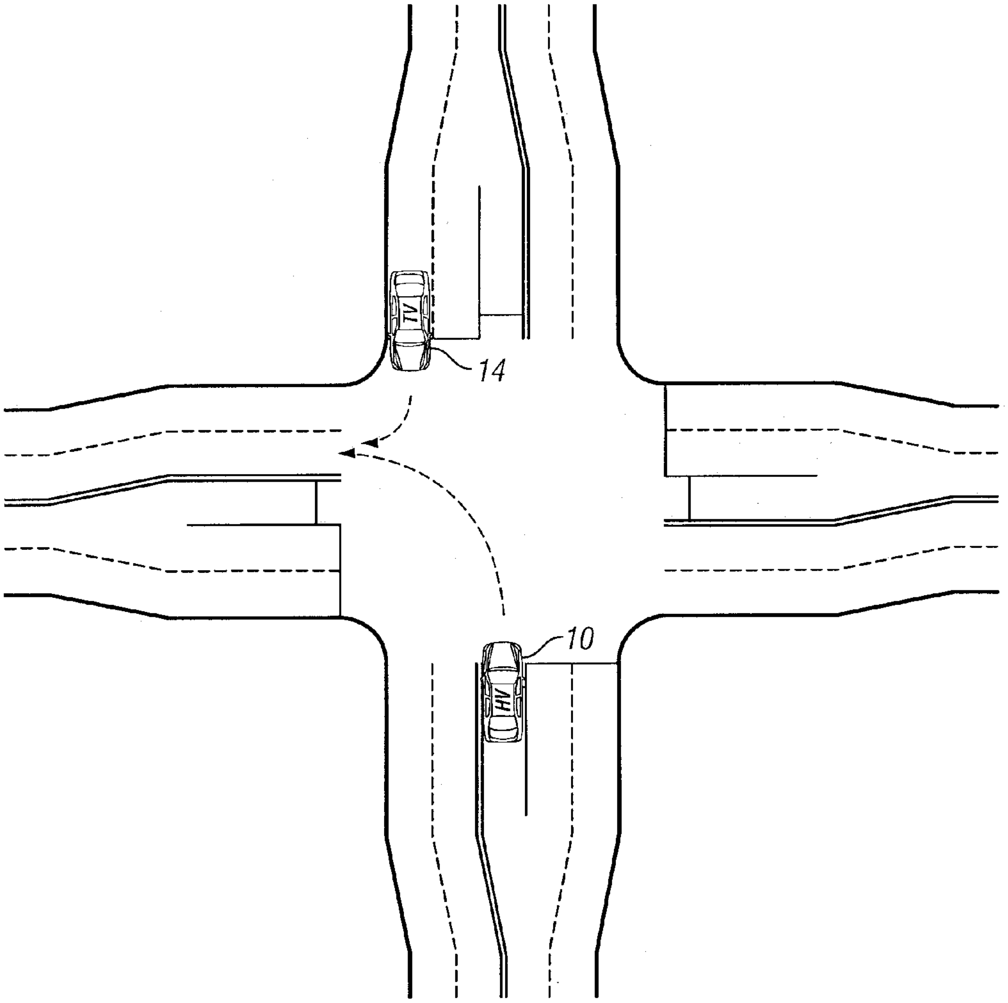
Figure 20:
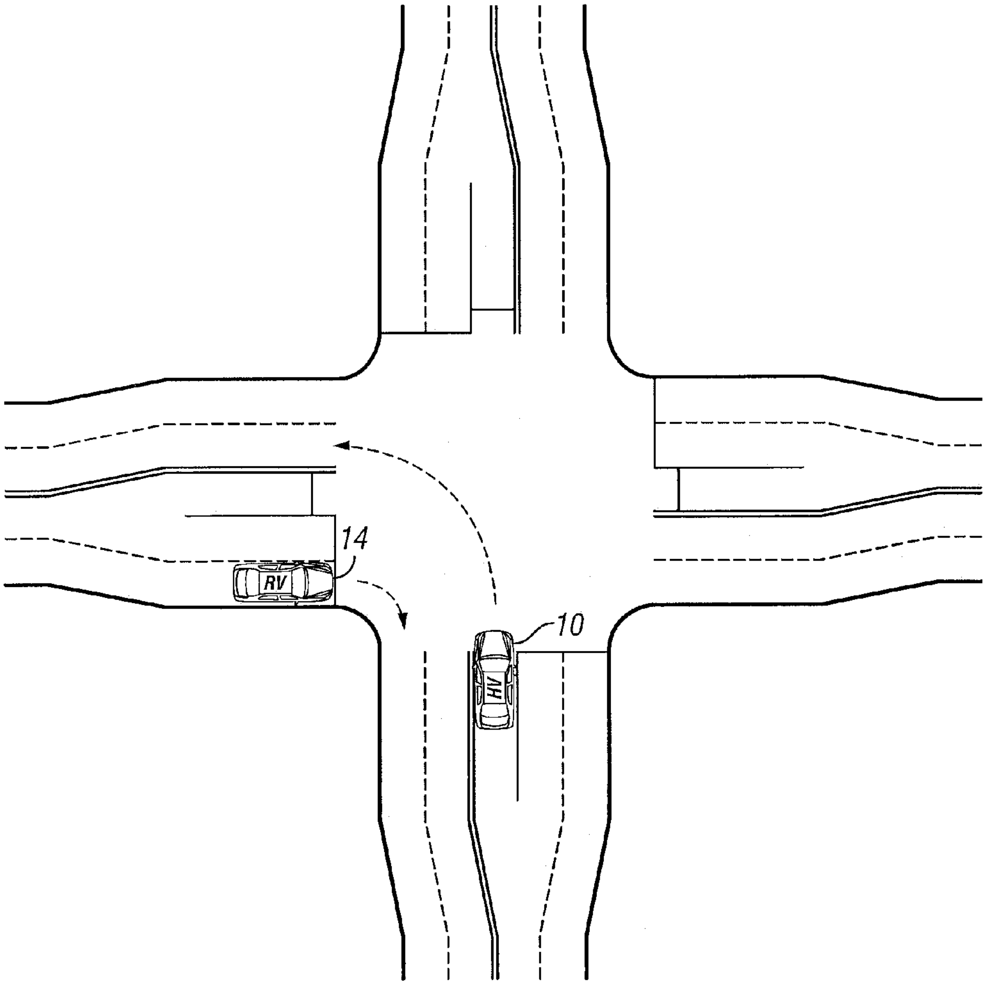
Figure 21:
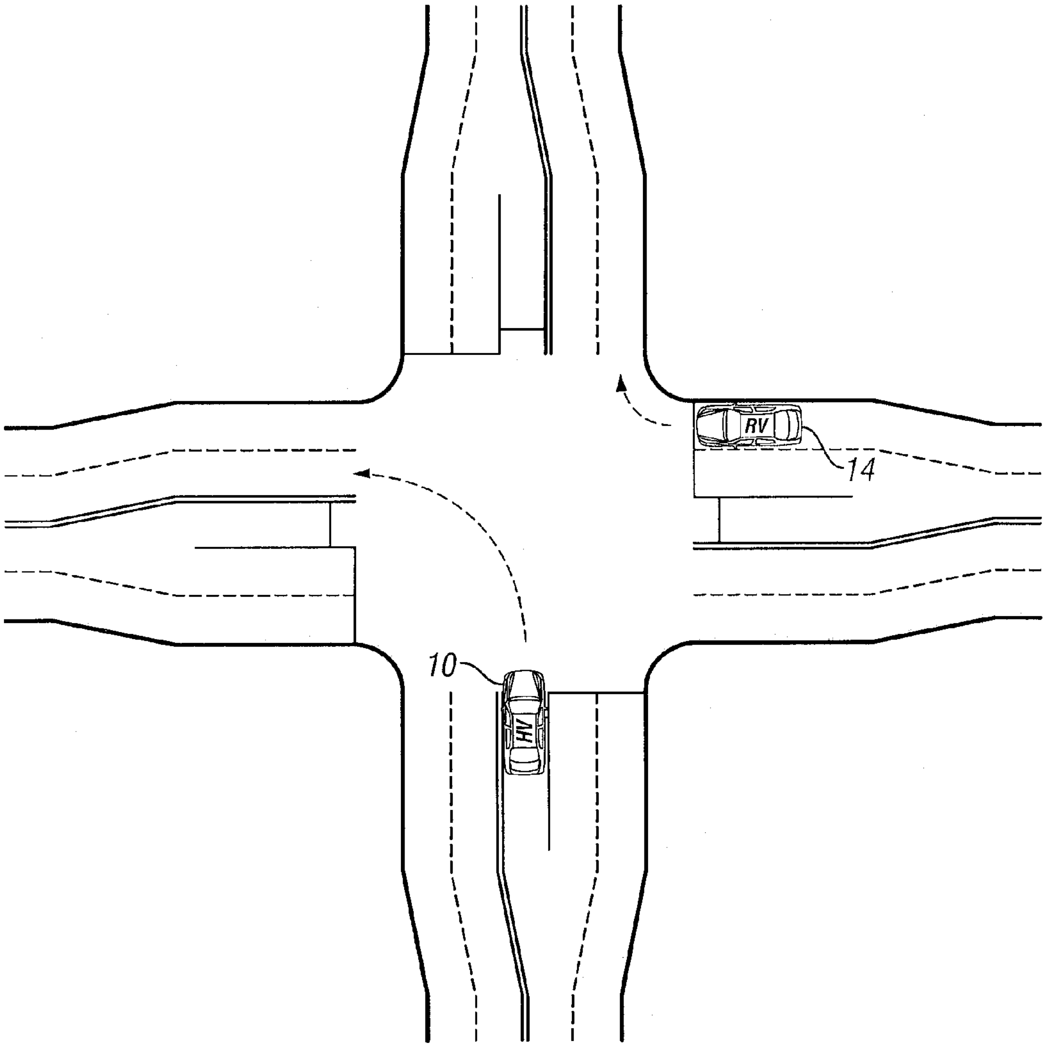

FIG. 19 illustrates Scenario 16 where the host vehicle 10 is intending to turn left through the intersection and the remote vehicle 14 is travelling in a direction opposite to the host vehicle 10 and intending to turn right through the intersection in a direction which will intersect the travel path of the host vehicle 10. Therefore, a threat of contact exists between the host vehicle 10 and the remote vehicle 14, and the threat condition is indicated as 1 in Table 6. FIG. 20 illustrates Scenario 17 where the host vehicle 10 is intending to turn left through the intersection and the remote vehicle 14 is travelling in a direction from the left of the host vehicle 10 and intending to turn right through the intersection in a direction which will not intersect the travel path of the host vehicle 10. Therefore, no threat of contact exists between the host vehicle 10 and the remote vehicle 14, and the threat condition is indicated as 0 in Table 6. FIG. 21 illustrates Scenario 18 where the host vehicle 10 is intending to turn left through the intersection and the remote vehicle 14 is travelling in a direction from the right of the host vehicle 10 and intending to turn right through the intersection in a direction which will not intersect the travel path of the host vehicle 10. Therefore, no threat of contact exists between the host vehicle 10 and the remote vehicle 14, and the threat condition is indicated as 0 in Table 6.

In Table 7, the host vehicle 10 intends to turn right through the intersection, and the different intentions of the remote vehicle 14 are represented by the different codes CDEF as explained in Table 7. The controller 22 therefore determines whether a threat of contact between the host vehicle 10 and remote vehicle 14 exists for each scenario, as represented by a binary 0 for no threat and a binary 1 for a possible threat.

TABLE 7

Host Vehicle Turning Right Use Cases

| Subject Vehicle | Code AB | Remote Vehicle | Code CDEF | Full Code ABCDEF | Threat |
|---|---|---|---|---|---|
| Right turn | 11 | Straight/Opposite | 0000 | 110000 | 0 |
| Right turn | 11 | Straight/Left | 0001 | 110001 | 1 |
| Right turn | 11 | Straight/Right | 0011 | 110011 | 0 |
| Right turn | 11 | Left turn/Opposite | 0100 | 110100 | 1 |
| Right turn | 11 | Left turn/Left | 0101 | 110101 | 0 |
| Right turn | 11 | Left turn/Right | 0111 | 110111 | 0 |
| Right turn | 11 | Right turn/Opposite | 1100 | 111100 | 0 |
| Right turn | 11 | Right turn/Left | 1101 | 111101 | 0 |
| Right turn | 11 | Right turn/Right | 1111 | 111111 | 0 |

Figure 22:
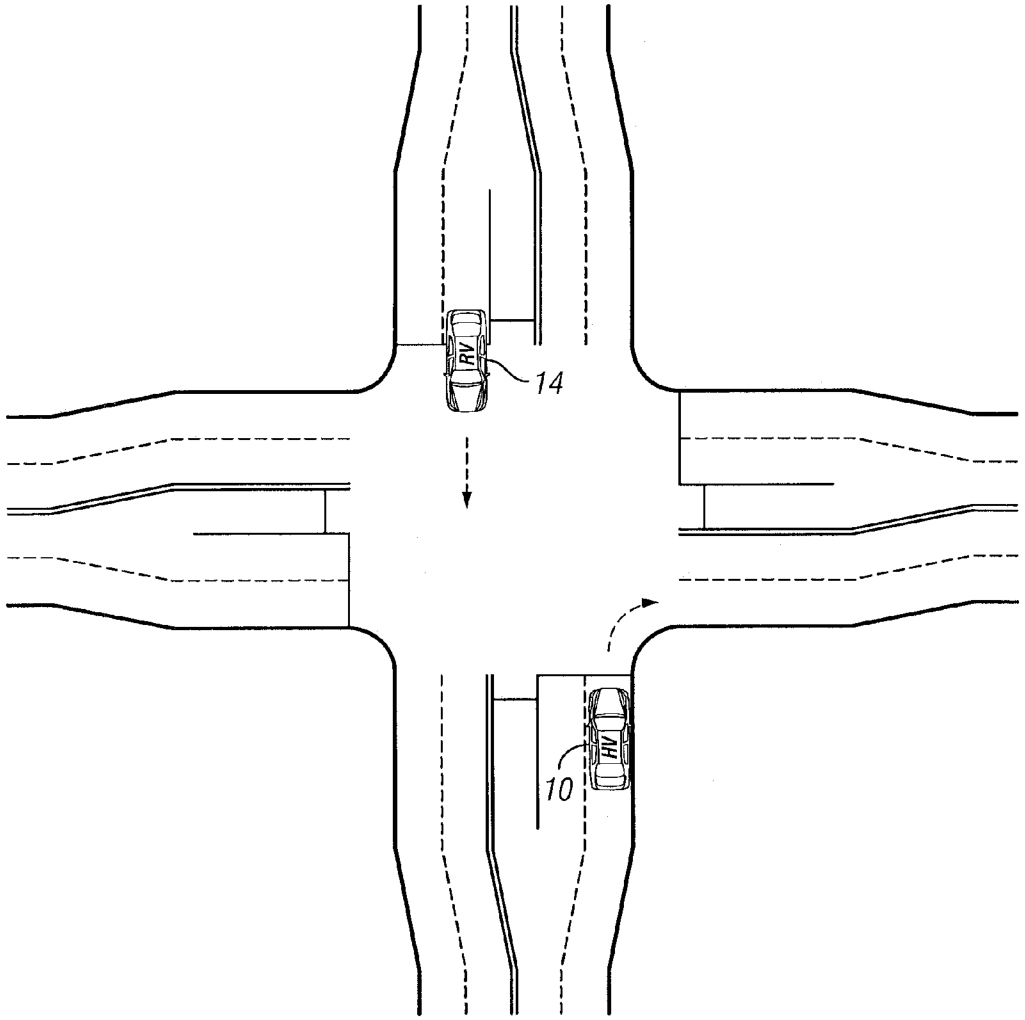

These nine different scenarios are shown graphically in FIGS. 22 through 30. FIG. 22 illustrates Scenario 19 where the host vehicle 10 and remote vehicle 14 are travelling in opposite directions to each other, with the remote vehicle 14 intending to travel straight through the intersection and the host vehicle 10 intending to turn right in the intersection without crossing the path of remote vehicle 14. Therefore, no threat of contact exists between the host vehicle 10 and the remote vehicle 14, and the threat condition is indicated as 0 in Table 7.

Figure 23:
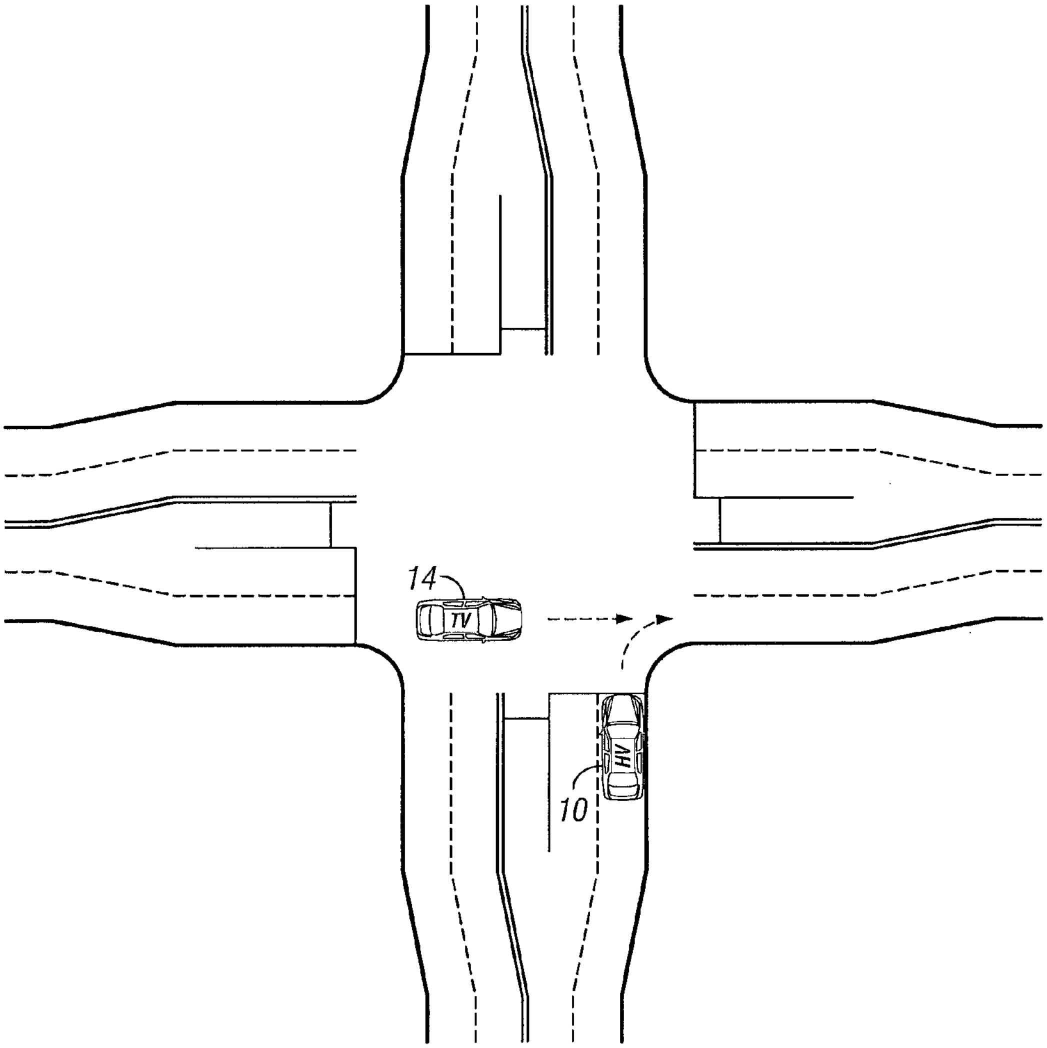
Figure 24:
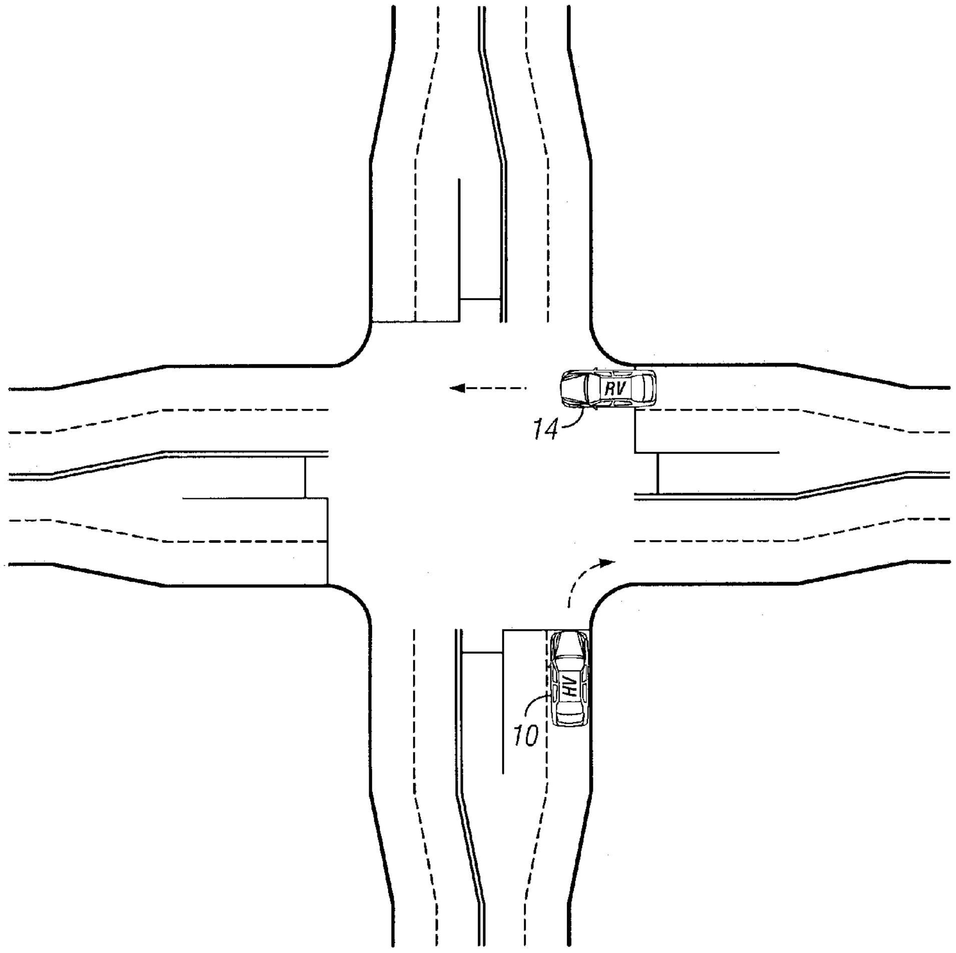

However, FIG. 23 illustrates Scenario 20 where the host vehicle 10 is intending to turn right through the intersection and the remote vehicle 14 is intending to travel straight through the intersection in a direction from the left of the host vehicle 10 which will intersect the travel path of the host vehicle 10. Therefore, a threat of contact exists between the host vehicle 10 and the remote vehicle 14, and the threat condition is indicated as 1 in Table 7. Similarly, FIG. 24 illustrates Scenario 21 where the host vehicle 10 is intending to turn right through the intersection and the remote vehicle 14 is intending to travel straight through the intersection in a direction from the right of the host vehicle 10 which will not intersect the travel path of the host vehicle 10. Therefore, no threat of contact exists between the host vehicle 10 and the remote vehicle 14, and the threat condition is indicated as 0 in Table 7.

Figure 25:
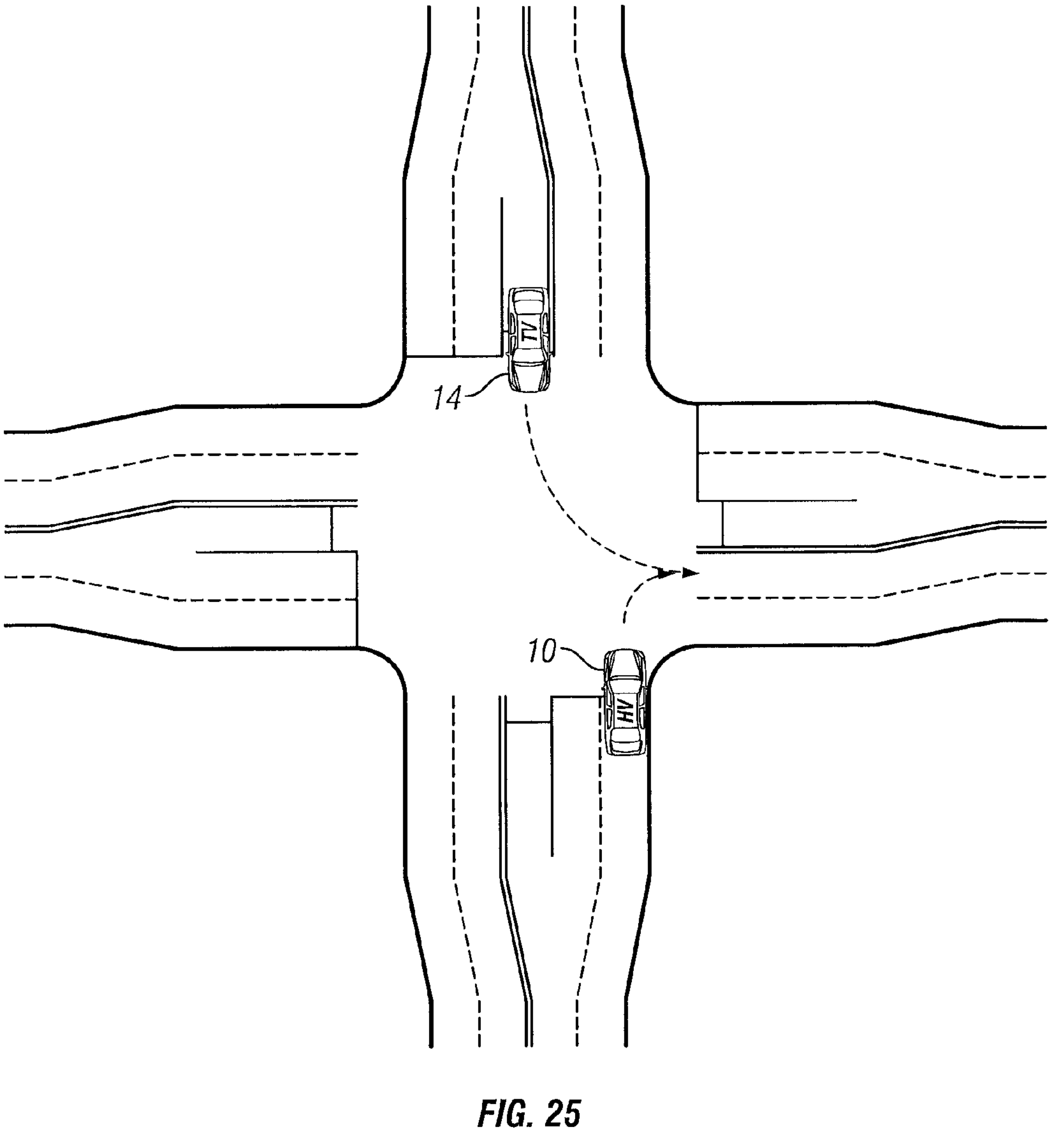
Figure 26:
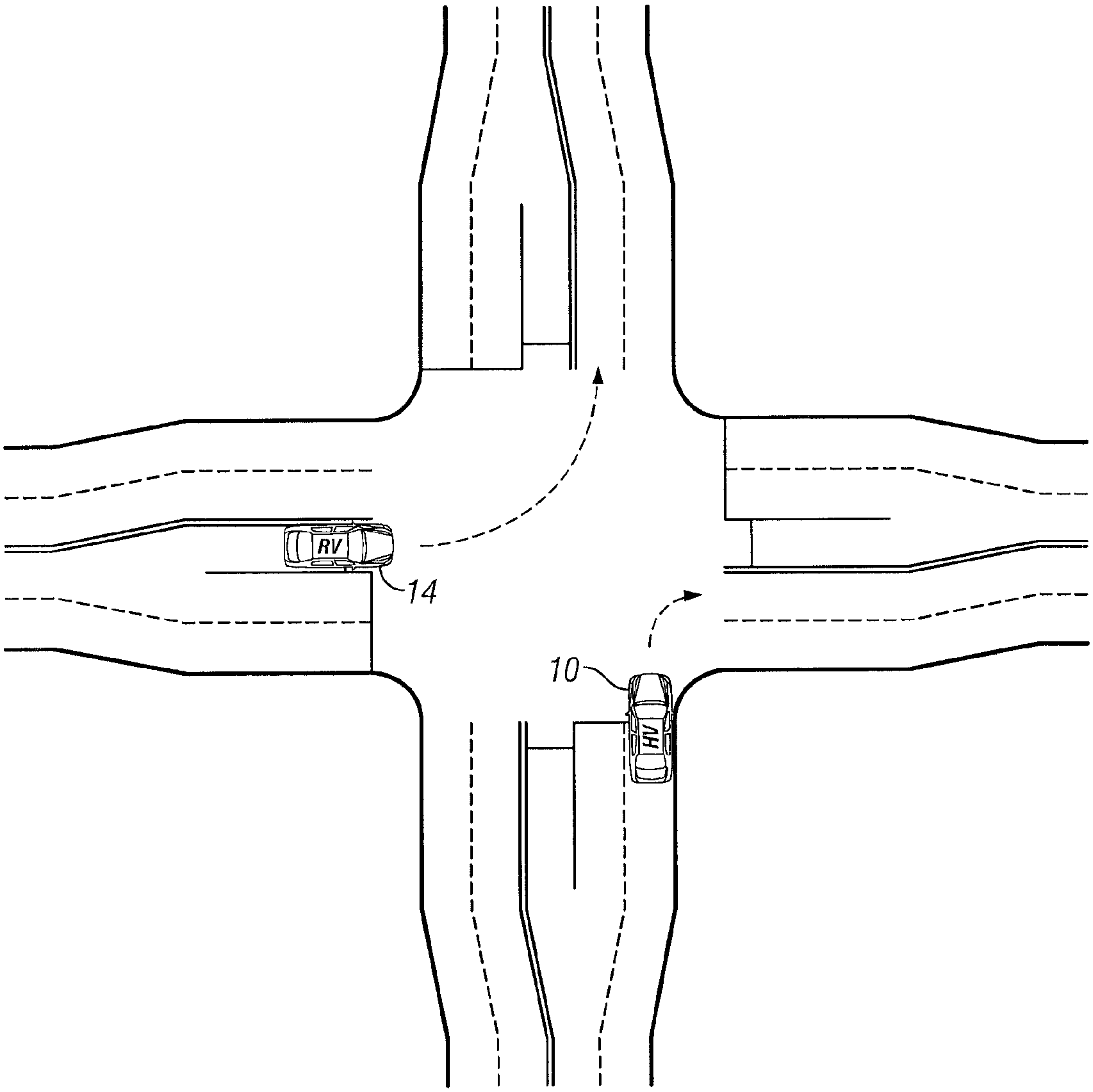
Figure 27:
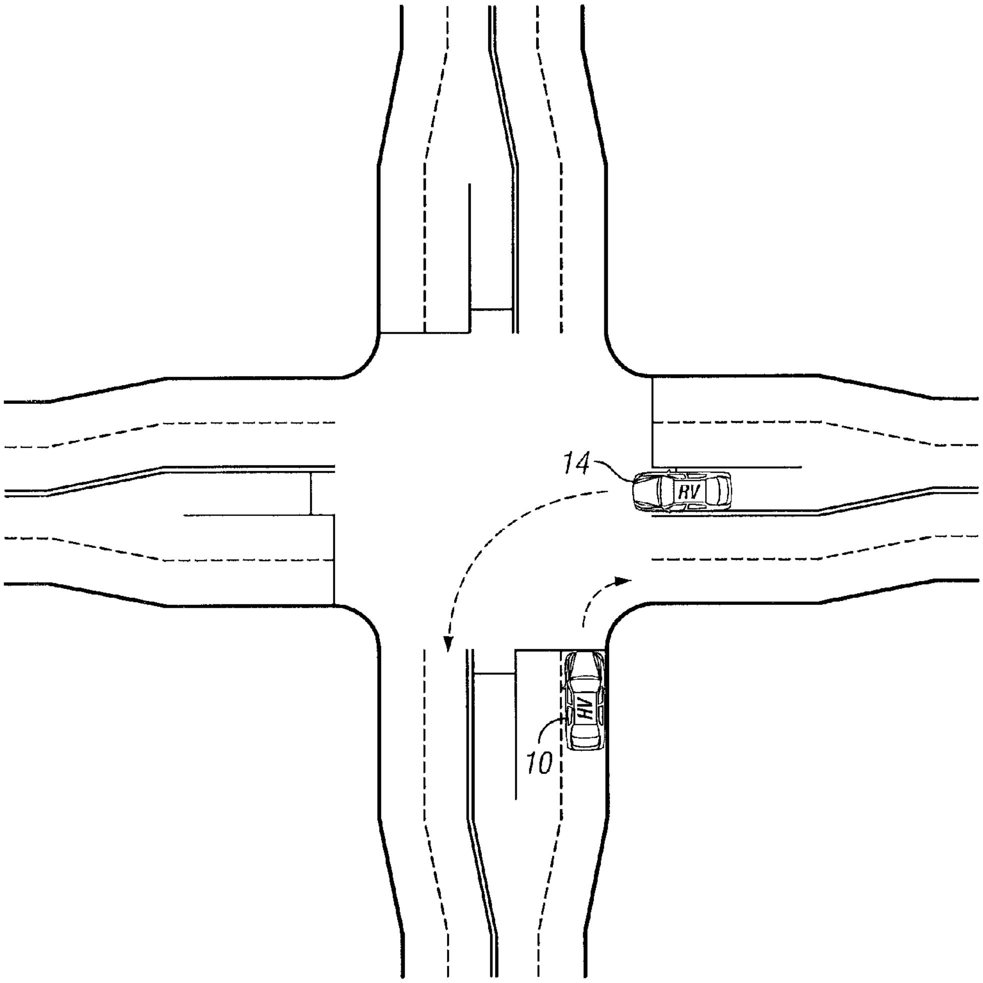

FIG. 25 illustrates Scenario 22 where the host vehicle 10 is intending to turn right through the intersection and the remote vehicle 14 is travelling in a direction opposite to the host vehicle 10 and intending to turn left through the intersection in a direction which will intersect the travel path of the host vehicle 10. Therefore, a threat of contact exists between the host vehicle 10 and the remote vehicle 14, and the threat condition is indicated as 1 in Table 7. FIG. 26 illustrates Scenario 23 where the host vehicle 10 is intending to turn right through the intersection and the remote vehicle 14 is travelling in a direction from the left of the host vehicle 10 and intending to turn left through the intersection in a direction which will not intersect the travel path of the host vehicle 10. Therefore, no threat of contact exists between the host vehicle 10 and the remote vehicle 14, and the threat condition is indicated as 0 in Table 7. FIG. 27 illustrates Scenario 24 where the host vehicle 10 is intending to turn right through the intersection and the remote vehicle 14 is travelling in a direction from the right of the host vehicle 10 and intending to turn left through the intersection in a direction which will not intersect the travel path of the host vehicle 10. Therefore, no threat of contact exists between the host vehicle 10 and the remote vehicle 14, and the threat condition is indicated as 0 in Table 7.

Figure 28:
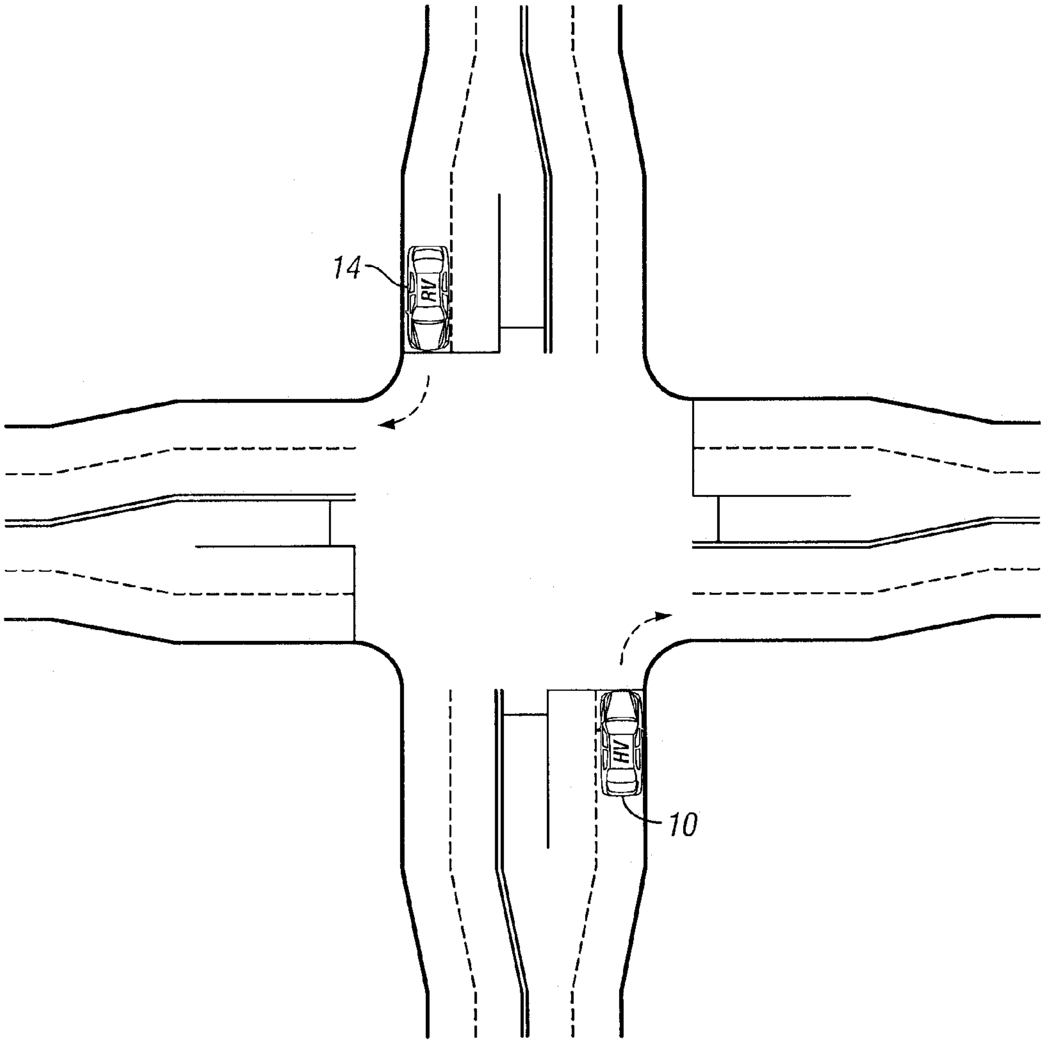
Figure 29:
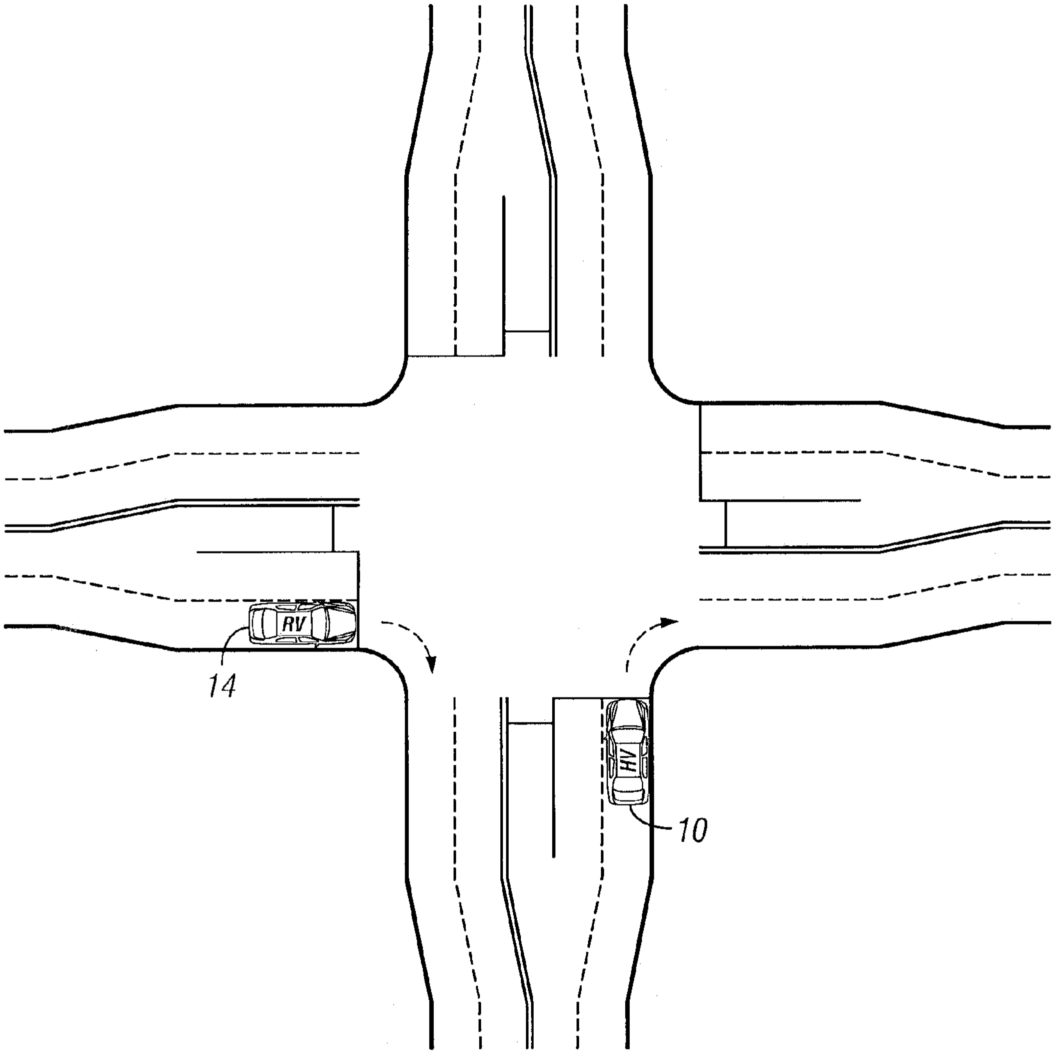
Figure 30:
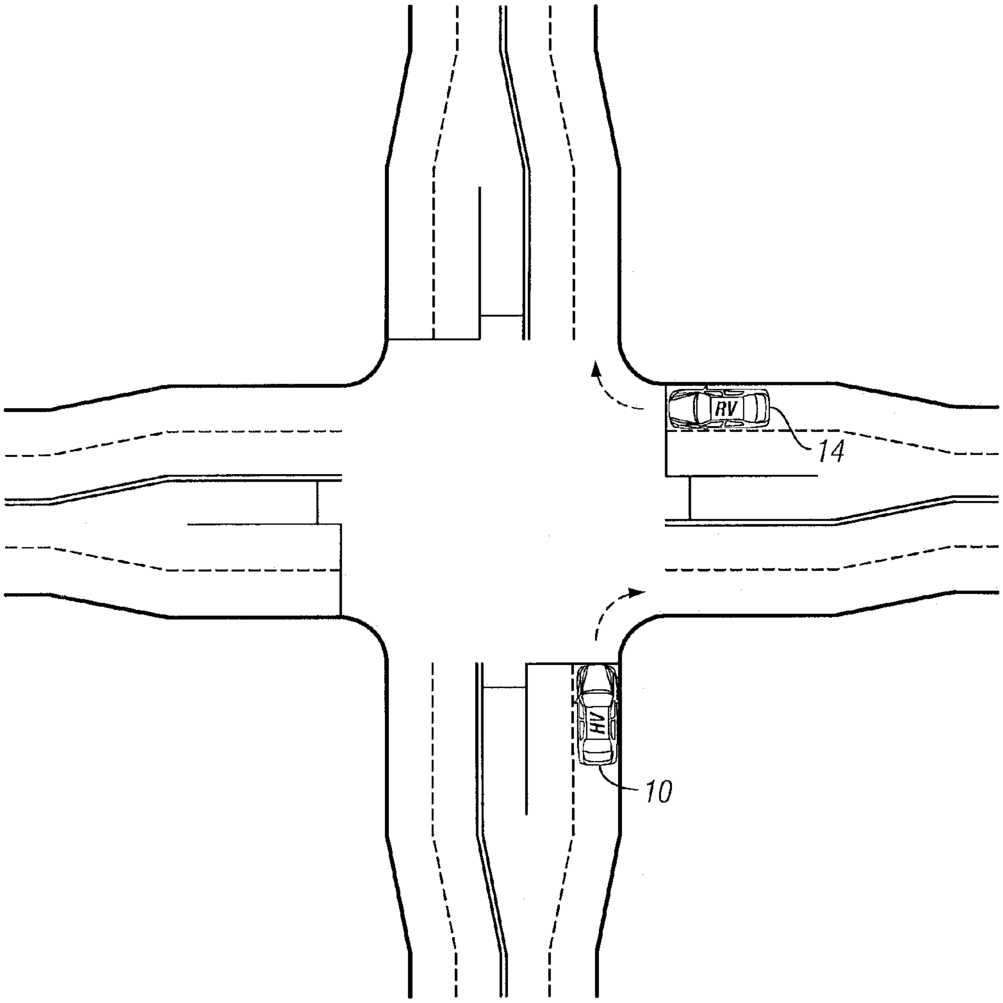

FIG. 28 illustrates Scenario 25 where the host vehicle 10 is intending to turn right through the intersection and the remote vehicle 14 is travelling in a direction opposite to the host vehicle 10 and intending to turn right through the intersection in a direction which will not intersect the travel path of the host vehicle 10. Therefore, no threat of contact exists between the host vehicle 10 and the remote vehicle 14, and the threat condition is indicated as 0 in Table 7. FIG. 29 illustrates Scenario 26 where the host vehicle 10 is intending to turn right through the intersection and the remote vehicle 14 is travelling in a direction from the left of the host vehicle 10 and intending to turn right through the intersection in a direction which will not intersect the travel path of the host vehicle 10. Therefore, no threat of contact exists between the host vehicle 10 and the remote vehicle 14, and the threat condition is indicated as 0 in Table 7. FIG. 30 illustrates Scenario 27 where the host vehicle 10 is intending to turn right through the intersection and the remote vehicle 14 is travelling in a direction from the right of the host vehicle 10 and intending to turn right through the intersection in a direction which will not intersect the travel path of the host vehicle 10. Therefore, no threat of contact exists between the host vehicle 10 and the remote vehicle 14, and the threat condition is indicated as 0 in Table 7.

An example of operations performed by the intersection monitoring system 12 to identify the scenarios shown in FIGS. 4 through 30 as discussed above will now be described. These operations can be performed by the controller 22 in this example.

Figure 31:
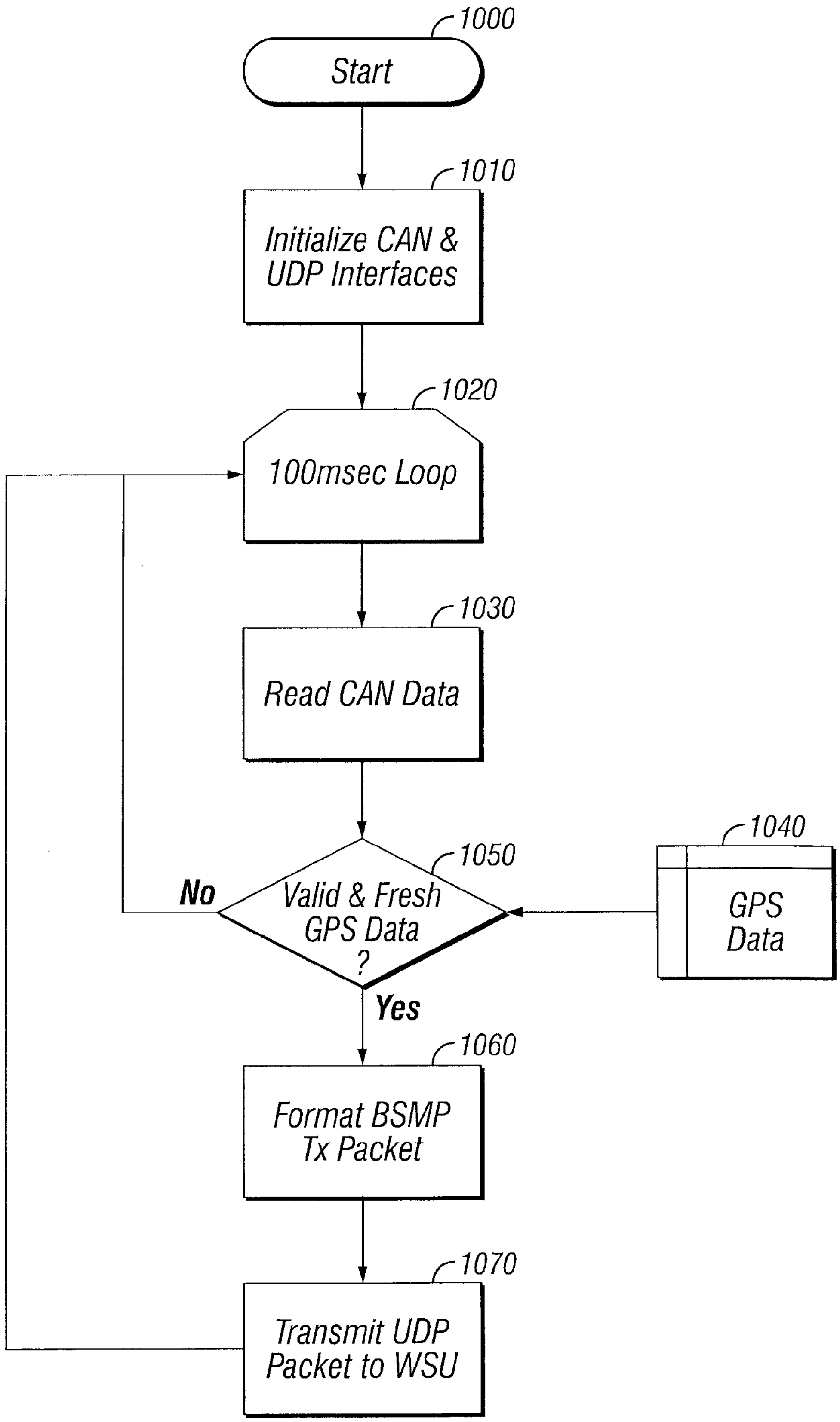
FIG. 31 is a flowchart illustrating exemplary operations that are performed by the intersection monitoring system to transmit information pertaining to the host vehicle.

The flowchart of FIG. 31 illustrates an example of a process for transmitting a BSM that can include information pertaining to a vehicle which is used to identify the scenarios as discussed above. In this example, it is assumed that the controller 22 is in the intersection monitoring system 12 included in the host vehicle 10 so that the host vehicle 10 can transmit a BSM.

When the process begins in step 1000, the controller 22 initializes the CAN and the UDP interfaces discussed above with regard to FIGS. 2 and 3 in step 1010. The process then enters a processing loop beginning in step 1020. As discussed above, the processing loop repeats, for example, every 100 msec so that the controller 22 can collect the data to assemble a packet to transmit a BSM Tx to the communication device 30 (WSU) for transmission. For example, the controller 22 reads the CAN data in step 1030, and receives GPS data in step 1040 as discussed above with regard to FIGS. 2 and 3. The controller 22 then determines in step 1050 whether the GPS data is valid and fresh, for example, the GPS data is non-zero with a fix and is less than 250 msec old. If the GPS data is not valid or fresh, the processing repeats the loop beginning at step 1020. However, if the GPS data is valid and fresh, the processing continues to step 1060 where the BSM Tx packet is formatted as a UDP packet. In step 1070, the UDP packet is then sent to the communication device 30 (WSU) for transmission.

Figure 32:
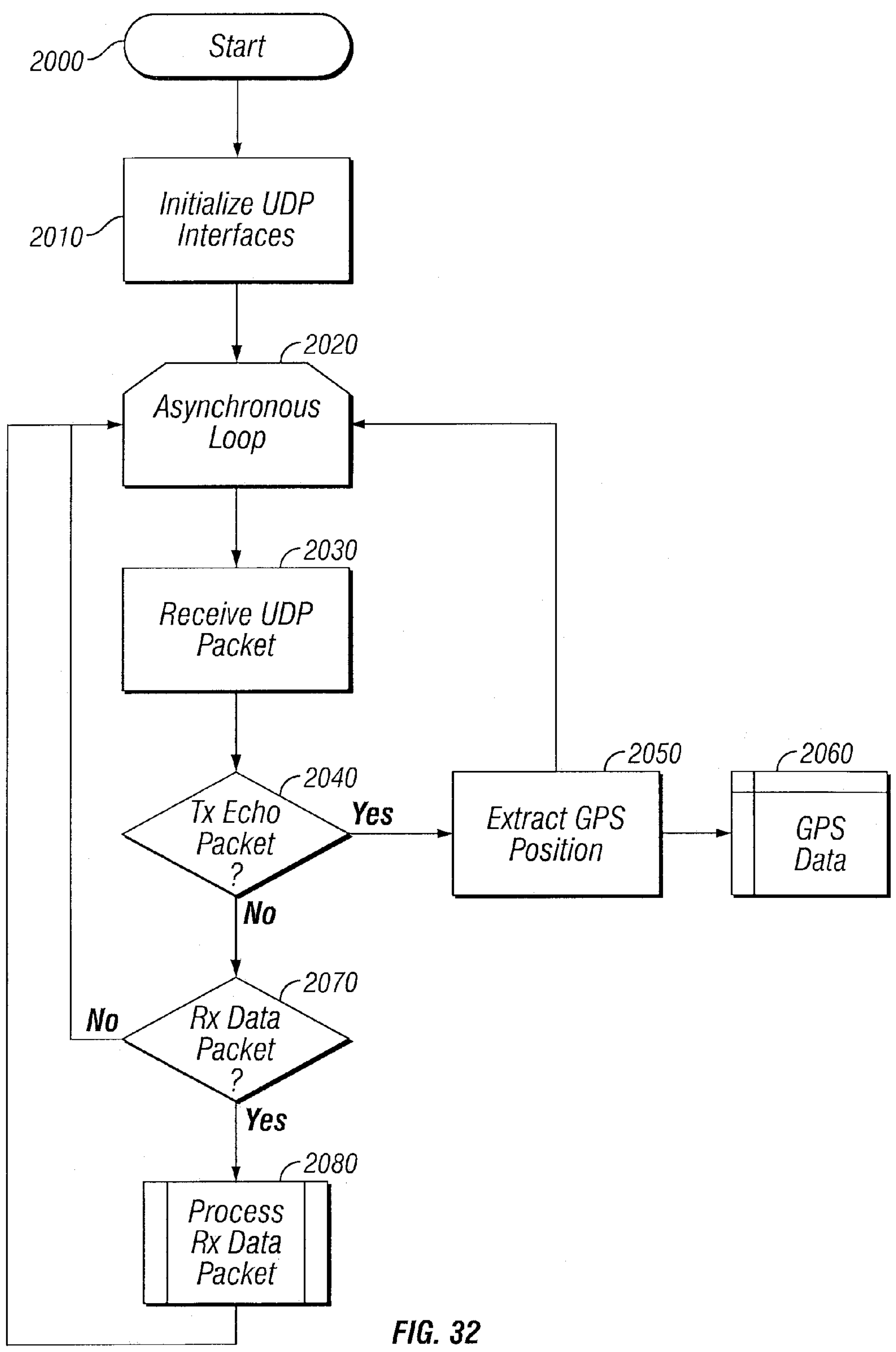
FIG. 32 is a flowchart illustrating exemplary operations that are performed by the intersection monitoring system to receive information pertaining to the remote vehicle.

The flowchart of FIG. 32 illustrates an example of a process for receiving a BSM that can include information pertaining to a vehicle which is used to identify the scenarios as discussed above. In this example, it is assumed that the controller 22 is in the intersection monitoring system 12 included in the host vehicle 10 so that the host vehicle 10 can receive a BSM.

When the process begins in step 2000, the controller 22 initializes the UDP interfaces discussed above with regard to FIGS. 2 and 3 in step 2010. The process then enters a processing loop beginning in step 2020. The controller 22 receives a BSM in the form of a UDP packet in step 2030. The controller 22 then determines in step 2040 whether the UDP packet is a BSM Tx Echo packet. If the UDP packet is a BSM Tx Echo packet, the controller 22 extracts GPS position information in step 2050 and creates GPS position data in step 2060.

However, if the UDP packet is determined to not be a BSM Tx Echo packet in step 2040, the processing continues to step 2070. In step 2070, the processing determines whether the UDP packet is a BSM Rx data packet, that is, a received BSM message. If the UDP packet is determined not to be a BSM Rx data packet in step 2070, the processing repeats beginning at step 2020. However, if the UDP packet is determined to be a BSM Rx data packet in step 2070, the processing continues to step 2080 where the controller processes the BSM Rx data packet as discussed above with regard to FIGS. 2 and 3. In particular, the controller 22 can extract the GPS and BSM information from the data packet to use that information to identify the scenario as discussed above with regard to FIGS. 4 through 30.

Figure 33:
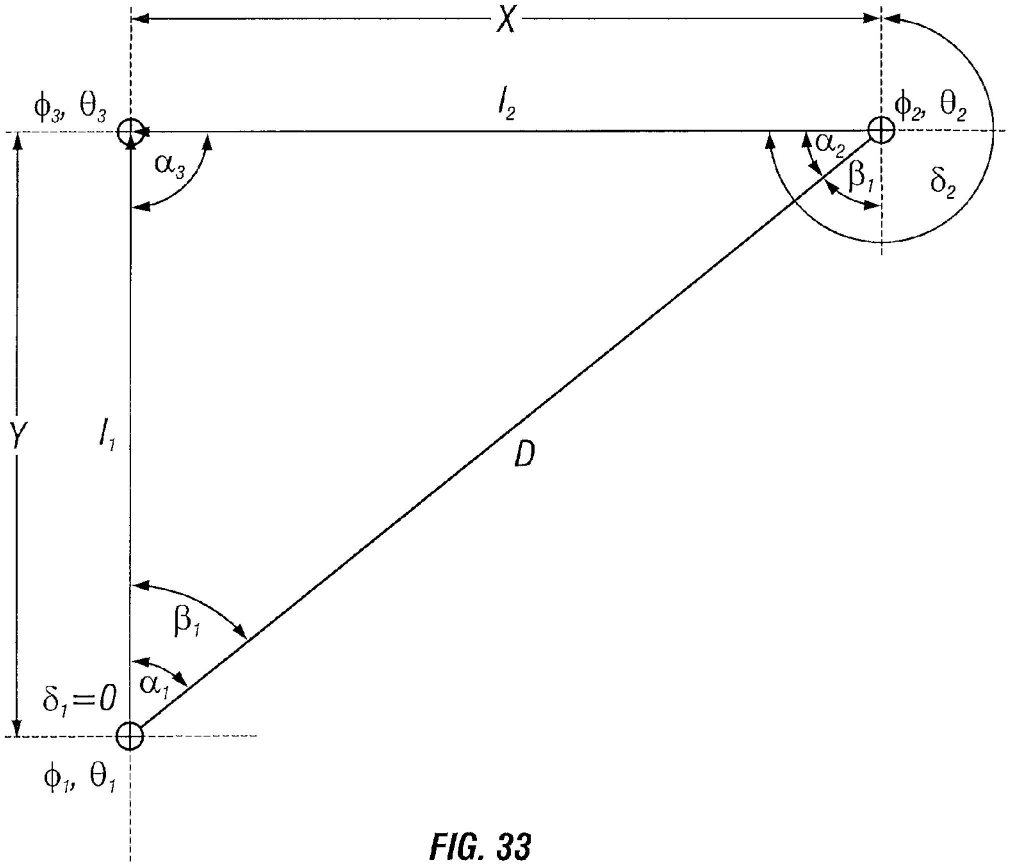
FIG. 33 is a diagram illustrating an example of the relative positions of the host vehicle and the remote vehicle with respect to each other.

FIG. 33 is a diagram illustrating the relationship between the location of the host vehicle 10 and the location of the remote vehicle 14 and the manner in which a point of contact of the host vehicle 10 and the remote vehicle 14 can be calculated based on the respective speed and heading of the host vehicle 10 and the remote vehicle 14. In this example, $\phi_1$ can represent the latitude of the host vehicle 10, $\theta_1$ represents the longitude of the host vehicle 10, $\phi_2$ can represent the latitude of the remote vehicle 14 and $\theta_2$ represents the longitude of the remote vehicle 14. All of the values for the latitude and longitude can be expressed in radians.

Also, $\delta_1$ can represent the heading of the host vehicle 10, $\nu_1$ can represent the speed of the host vehicle 10, $\delta_2$ can represent the heading of the remote vehicle 14, and $\nu_2$ can represent the speed of the remote vehicle 10. As discussed above, the heading and speed information for a vehicle, such as the host vehicle 10 and remote vehicle 14, can be obtained from the BSM that the vehicle transmits. Thus, in this example, the heading and speed of the host vehicle 10 can be obtained from the message BSM Tx transmitted by the host vehicle 10 and the heading and speed of the remote vehicle 14 can be obtained from the message BSM Rx that was transmitted by the remote vehicle 14 and received by the host vehicle 10. For heading, the convention used is as follows: 0 degrees for north, 90 degrees for east, 180 degrees for south, and 270 degrees for west. Also, $l_1$ can represent the travel path of the host vehicle 10, $l_2$ can represent the travel path of the remote vehicle 14 and D represents the relative distance between the host vehicle 10 and the remote vehicle 14. In addition, X represents the east-west distance between two points, Y represents the north-south distance between two points, $\alpha_1$ represents the angle between the travel path $l_1$ and the line representing the relative distance D, $\alpha_2$ represents the angle between the travel path $l_2$ and the line representing the relative distance D, $\alpha_3$ represents the angle between travel path $l_1$ and travel path $l_2$, and angle $\beta_1$ represents the arc cosine of Y divided by D. Furthermore, $\phi_3$ can represent the latitude at which the paths of the host vehicle 10 and the remote vehicle 14 cross, and $\theta_3$ can represent the longitude at which the paths of the host vehicle 10 and the remote vehicle 14 cross.

An example of the process that can be performed by the controller 22 to identify the scenario as discussed above with regard to FIGS. 4 through 30 will now be described with regard to the flowcharts in FIGS. 34A through 38. It should be noted that the information pertaining to the host vehicle 10 and the remote vehicle 14 used in this process can be obtained from the BSMs as discussed above.

Figure 34A:
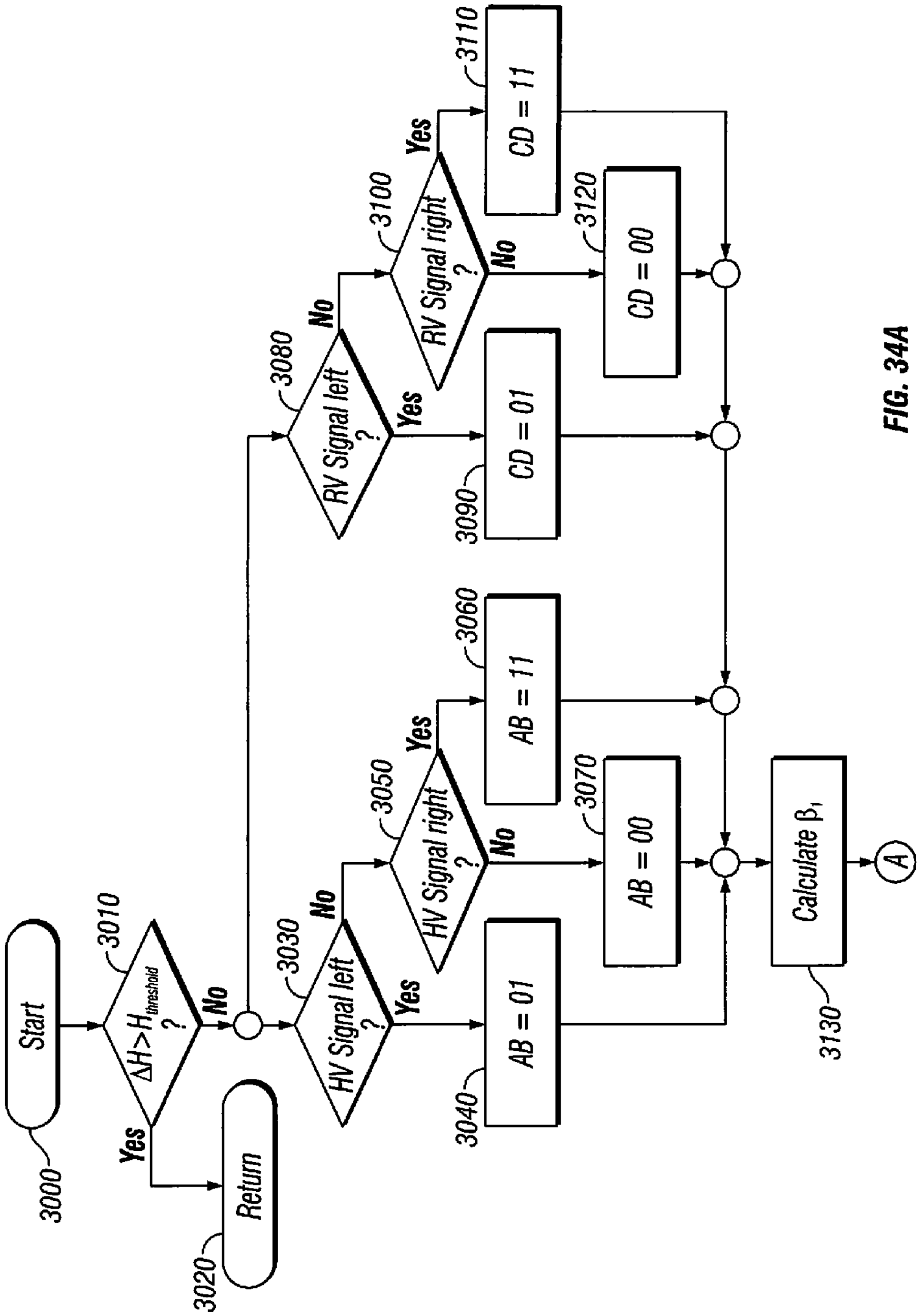
FIGS. 34A and 34B are flowcharts illustrating exemplary operations for determining the intent of the host vehicle and the remote vehicle.
Figure 34B:
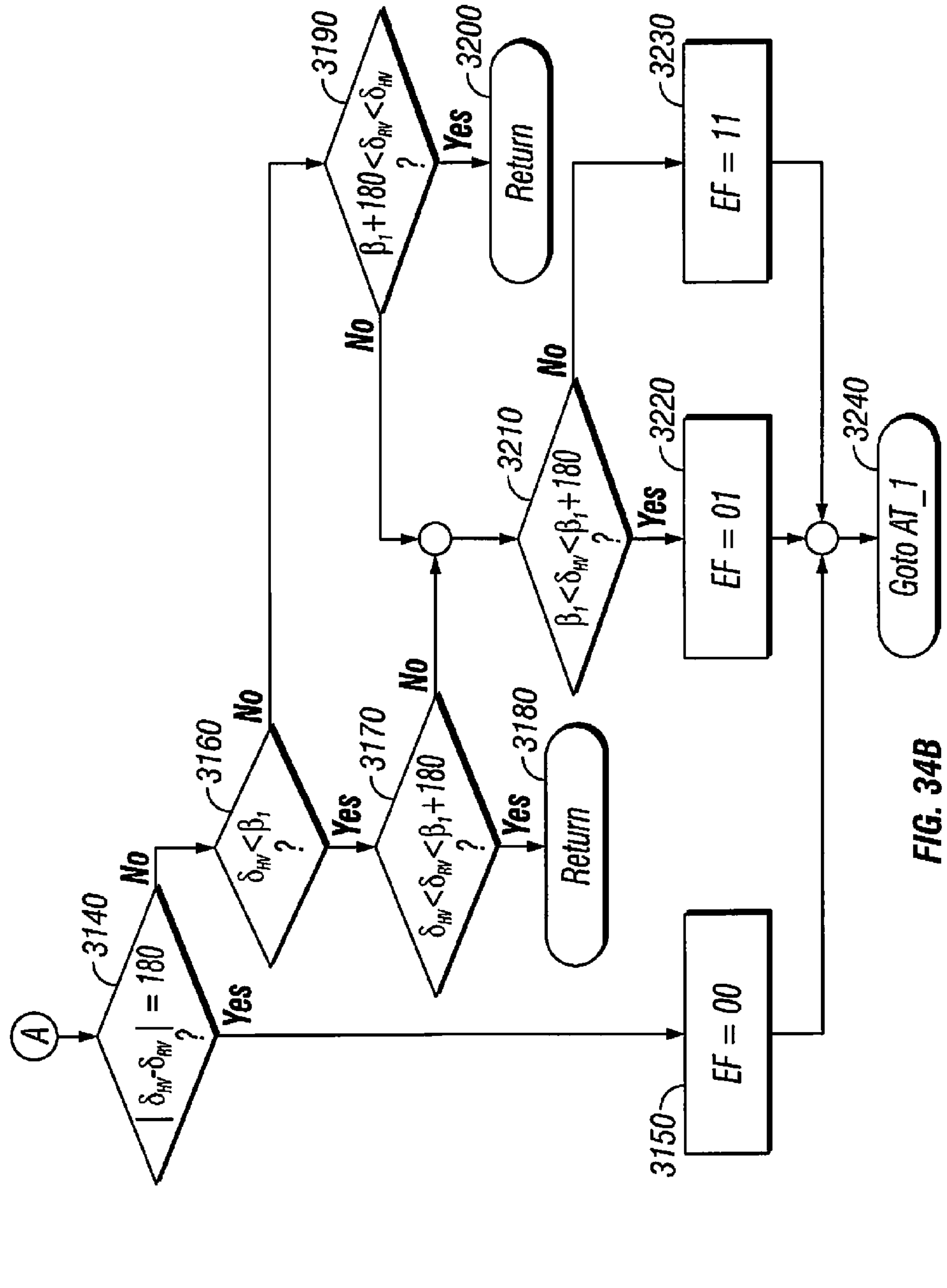

As shown in the flowchart of FIGS. 34A and 34B, when the process begins in step 3000, the controller 22 determines from the location information pertaining to the host vehicle 10 and the remote vehicle 14 whether a difference in elevation ΔH between the host vehicle 10 and the remote vehicle 14 is above a threshold $H_{threshold}$ in step 3010. In other words, $H_{threshold}$ represents the threshold value that determines whether the remote vehicle 14 should be considered to be a possible threat vehicle. In this example, the value of $H_{threshold}$=14 ft.±1 ft. However, the value of $H_{threshold}$ can be any suitable value. Therefore, if the processing determines in step 3010 that the host vehicle 10 and the remote vehicle 14 are at different elevations, the processing determines that the remote vehicle 14 is not a threat to the host vehicle 10 (e.g., the remote vehicle 14 will pass above the host vehicle 10 on an overpass). Hence, the processing can end in step 3020 and return to the beginning in step 3000. Accordingly, the processing refrains from performing a threat mitigation operation as discussed herein.

However, if the difference in elevation ΔH between the host vehicle 10 and the remote vehicle 14 is not above the threshold $H_{threshold}$, the processing continues to determine whether the left or right turn signals of the host vehicle 10 and the remote vehicle 14 (represented at threat vehicle TV) indicate that either of the vehicles 10 or 14 intend to turn left or right. In step 3030, the processing determines whether the left turn signal of the host vehicle 10 is activated. If the left turn signal of the host vehicle 10 is activated, the processing continues to step 3040 where the values of binary code AB discussed above with regard to the truth table in Table 4 are set to 01. However, if the left turn signal of the host vehicle 10 is not activated, the processing continues from step 3030 to step 3050.

In step 3050, the processing determines whether the right turn signal of the host vehicle 10 is activated. If the right turn signal of the host vehicle 10 is activated, the processing continues to step 3060 where the values of binary code AB are set to 11. However, if the right turn signal of the host vehicle 10 is not activated, the processing continues from step 3050 to step 3070 where the values of the binary code AB are set to 00, thus indicating that the host vehicle 10 intends to travel straight without turning.

In step 3080, the processing determines whether the left turn signal of the remote vehicle 14 is activated. If the left turn signal of the remote vehicle 14 is activated, the processing continues to step 3090 where the values of binary code CD discussed above with regard to the truth table in Table 4 are set to 01. However, if the left turn signal of the remote vehicle 14 is not activated, the processing continues from step 3080 to step 3100.

In step 3100, the processing determines whether the right turn signal of the remote vehicle 14 is activated. If the right turn signal of the remote vehicle 14 is activated, the processing continues to step 3110 where the values of binary code CD are set to 11. However, if the right turn signal of the remote vehicle 14 is not activated, the processing continues from step 3100 to step 3120 where the values of the binary code CD are set to 00, thus indicating that the remote vehicle 14 intends to travel straight without turning.

After completing the above processing to determine the values for binary codes AB and CD, the processing continues to step 3130 where the angle $\beta_1$ shown in FIG. 33 is calculated according to the following equation $$\beta_1 = \arccos\left(\frac{Y}{D}\right) = \arccos\left(\frac{(\phi_b - \phi_a)}{\sqrt{(\theta_b - \theta_a)^2\cos^2\phi_a + (\phi_b - \phi_a)^2}}\right)$$

where $\phi_a$ equals $\phi_1$, $\phi_b$ equals $\phi_2$, $\theta_a$ equals $\theta_1$ and $\theta_b$ equals $\theta_2$ discussed above.

The processing then continues to step 3140 where the absolute value of the difference between the heading $\delta_1$ of the host vehicle 10, represented in this flowchart by $\delta_{HV}$, and the heading $\delta_2$ of the remote vehicle 14, represented in this flowchart by $\delta_{RV}$, is calculated. If the absolute value of the difference is equal to 180 degrees, the processing continues to step 3150 where the value of the binary code EF discussed above with regard to the truth table in Table 4 are set to 00. This indicates that the host vehicle 10 and the remote vehicle 14 are travelling toward each other.

However, if the processing determines in step 3140 that the absolute value of the difference is not equal to 180, the processing continues to step 3160. In step 3160, the processing determines whether the heading of the host vehicle is less than the angle $\beta_1$. If the heading of the host vehicle is less than the angle $\beta_1$, the processing determines in step 3170 whether the heading of the host vehicle 10 is less than the heading of the remote vehicle 14 which is less than the angle $\beta_1$+180. If the result of step 3170 is yes, the processing returns at step 3180 to step 3000 because the remote vehicle 14 is determined to not be a threat vehicle to the host vehicle 10.

However, if the heading of the host vehicle is not less than the angle $\beta_1$, the processing proceeds from step 3160 to step 3190 and determines whether the heading of the host vehicle 10 is greater than the heading of the remote vehicle 14 which is greater than the angle $\beta_1$+180. If the result of step 3190 is yes, the processing returns at step 3200 to step 3000 because the remote vehicle 14 is determined to not be a threat vehicle to the host vehicle 10.

However, if the result of either step 3170 or 3190 is no, the processing continues from either of those steps to step 3210. In step 3210, the processing determines whether the heading of the host vehicle 10 is between the angle $\beta_1$ and the value of angle $\beta_1$+180. If the result of step 3210 is yes, the processing continues to step 3220 and sets the value of binary codes EF to 01, indicating that the remote vehicle 14 is coming toward the host vehicle 10 from the left of the host vehicle 10. However, if the result of step 3210 is no, the processing continues to step 3230 and sets the value of binary codes EF to 11, indicating that the remote vehicle 14 is coming toward the host vehicle 10 from the right of the host vehicle 10.

Figure 35:
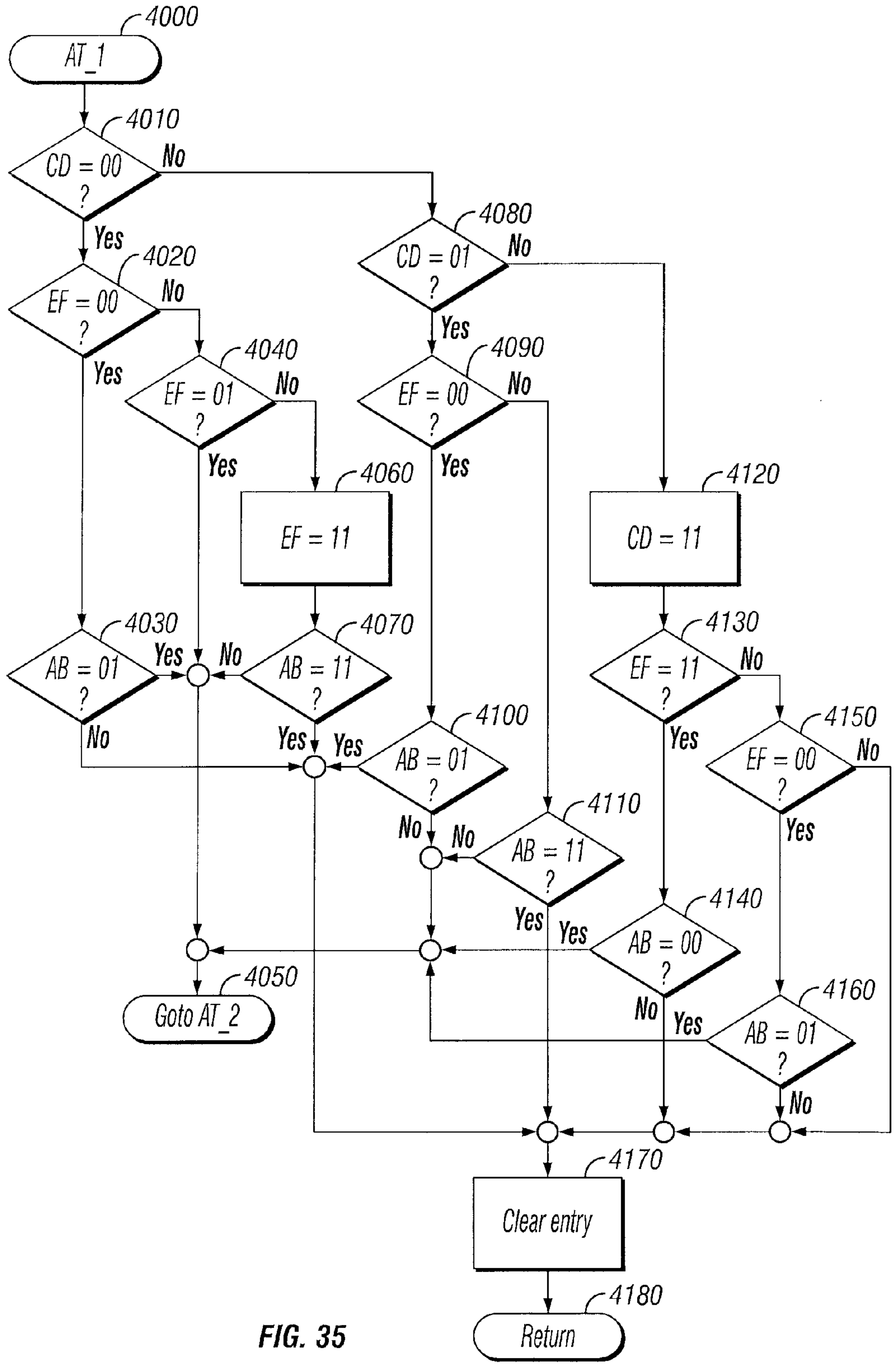
FIGS. 35 and 36 are flowcharts illustrating exemplary operations for determining an intersection scenario based on the host vehicle information and the remote vehicle information.

After completing the above processing in either of steps 3150, 3220 or 3230, the processing continues at step 3240 to the flowchart shown in FIG. 35. In the flowchart shown in FIG. 35, the processing determines the type of scenario that exists as shown in FIGS. 4 through 30 and discussed above.

Beginning in step 4000, the processing determines in step 4010 whether the binary codes CD are equal to 00. If they are, the processing determines in step 4020 whether the binary codes EF are equal to 00. If so, the processing determines in step 4030 whether the binary codes AB are equal to 01. Also, if the processing determines in step 4020 that the binary codes EF are not equal to 00, the processing determines in step 4040 whether the binary codes EF are equal to 01. If the processing determines in step 4030 that the binary codes AB are equal to 01, or the processing determines in step 4040 that the binary codes EF are equal to 01, the processing continues to step 4050 where the processing will proceed to the flowchart shown in FIG. 36 as discussed below.

However, if the processing determines in step 4040 that the binary codes EF are not equal to 01, then the processing concludes in step 4060 that the binary codes EF are equal to 11. After doing so, the processing determines in step 4070 whether the binary codes AB are equal to 11. If not, the processing proceeds to step 4050 and to the flowchart in FIG. 36.

Turning back to step 4010, if the processing determines that the binary codes CD are not equal to 00, the processing continues to step 4080 where the processing determines if the values of CD are equal to 01. If so, the processing continues to step 4090 to determine whether the binary codes EF are equal to 00. If the binary codes EF are equal to 00, the processing determines in step 4100 whether the binary codes AB are equal to 01. However, if the processing determines in step 4090 that the binary codes EF are not equal to 00, the processing determines in step 4110 whether the binary codes AB are equal to 11.

Turning back to step 4080, if the binary codes CD are not equal to 01, the processing concludes in step 4120 that the binary codes CD are equal to 11. The processing continues to step 4130 to determine whether the binary codes EF are equal to 11. If so, the processing determines in step 4140 whether the binary codes AB are equal to 00. However, if it is determined in step 4130 that the binary codes EF are not equal to 11, the processing determines in step 4150 whether the binary bodes EF are equal to 00. If so, the processing determines in step 4160 whether the binary codes AB are equal to 01.

As can be appreciated from the flowchart in FIG. 35, if step 4030 determines that the binary codes AB are not equal to 01, or step 4070 determines that binary codes AB are equal to 11, or step 4110 determines that the binary codes AB are equal to 11, or step 4140 determines that the binary codes AB are not equal to 00, or step 4150 determines that the binary codes EF are not equal to 00, or step 4160 determines that binary codes AB are not equal to 01, the processing continues to step 4170. In step 4170, the processing concludes that none of the scenarios shown in the truth table in Table 4 are met by the processing performed in the flowchart of FIGS. 34A and 34B. Thus, the processing returns at step 4180 to step 3000 and repeats as discussed above. In addition, if step 4030 determines that the binary codes AB are equal to 01, or step 4070 determines that binary codes AB are not equal to 11, or step 4110 determines that the binary codes AB are not equal to 11, or step 4140 determines that the binary codes AB are equal to 00, or step 4160 determines that binary codes AB are equal to 01, the processing continues to step 4050 and to the flowchart in FIG. 36.

Figure 36:
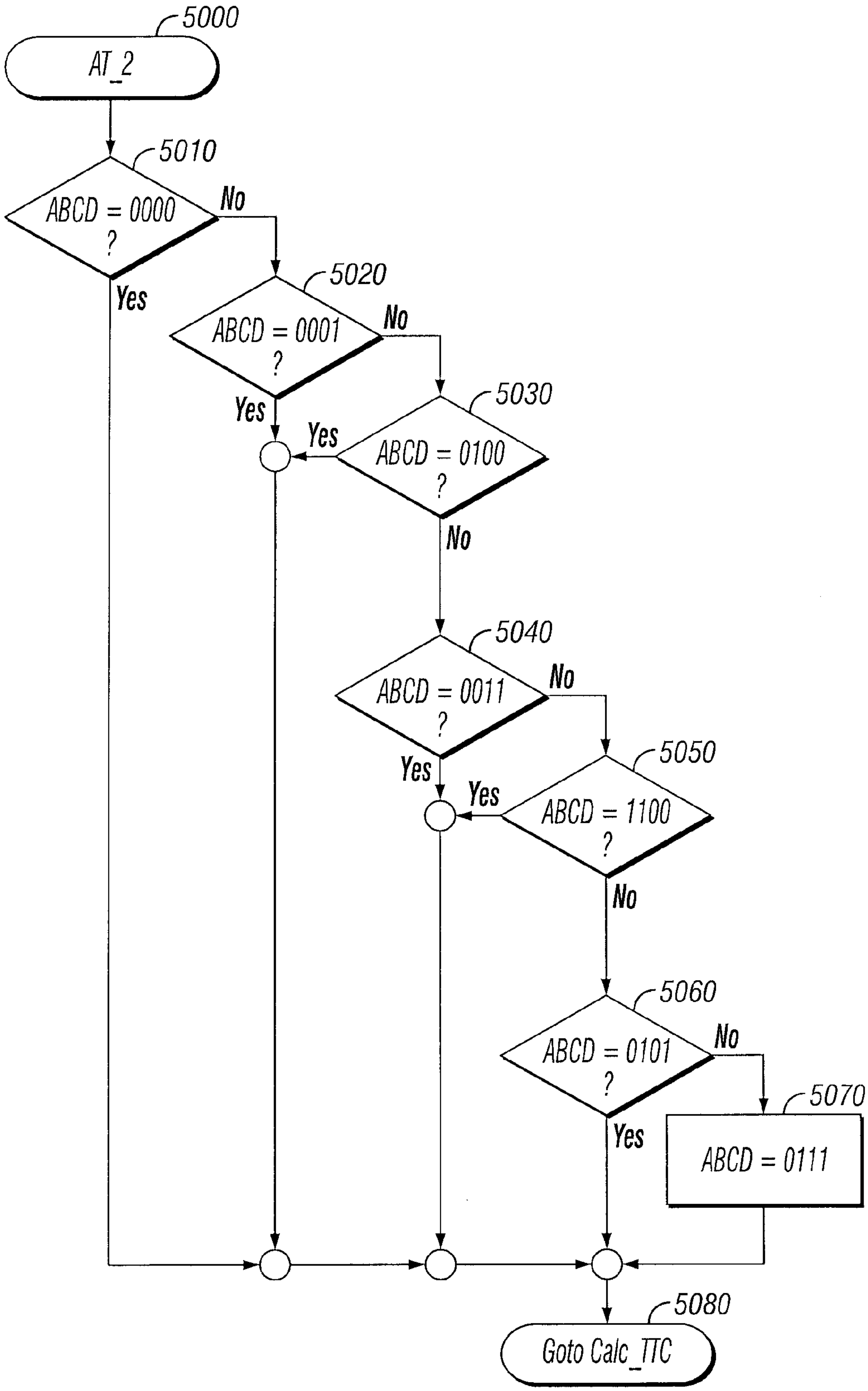

Beginning at step 5000 in the flowchart of FIG. 36, the processing determines in step 5010 whether the binary codes ABCD are equal to 0000. If not, the processing determines in step 5020 whether the binary codes ABCD are equal to 0001. If not, the processing determines in step 5030 whether the binary codes ABCD are equal to 0001. If not, the processing determines in step 5040 whether the binary codes ABCD are equal to 0011. If not, the processing determines in step 5050 whether the binary codes ABCD are equal to 1100. If not, the processing determines in step 5060 whether the binary codes ABCD are equal to 0101. If not, the processing concludes in step 5070 that the binary codes ABCD are equal to 0111. However, if any of the inquiries in steps 5010 through 5060 are yes, or after step 5070, the processing proceeds to step 5080 and continues to the flowchart shown in FIG. 37. Thus, by performing the operations in FIGS. 31, 32 and 34A through 36, the controller 22 selects an intersection scenario from a plurality of intersection scenarios based on the host vehicle information and the remote vehicle information, and monitors a location relationship between the host vehicle 10 and the remote vehicle 14 according to an algorithm that is determined based on the selected intersection scenario. As discussed above, the selecting of the intersection scenario can include determining, based on the remote vehicle intended next maneuver and the host vehicle intended next maneuver, whether the remote vehicle 14 will be moving left in relation to a path of movement of the host vehicle 10 at the intersection, right in relation to the path of movement of the host vehicle 10 at the intersection or across the path of movement of the host vehicle 10 at the intersection. As can be appreciated from the description herein, the location relationship can be a distance between the host vehicle and the remote vehicle. Naturally, the selecting of the intersection scenario includes eliminating some of the plurality of intersection scenarios based on the host vehicle information and the remote vehicle information as demonstrated above.

Figure 37:
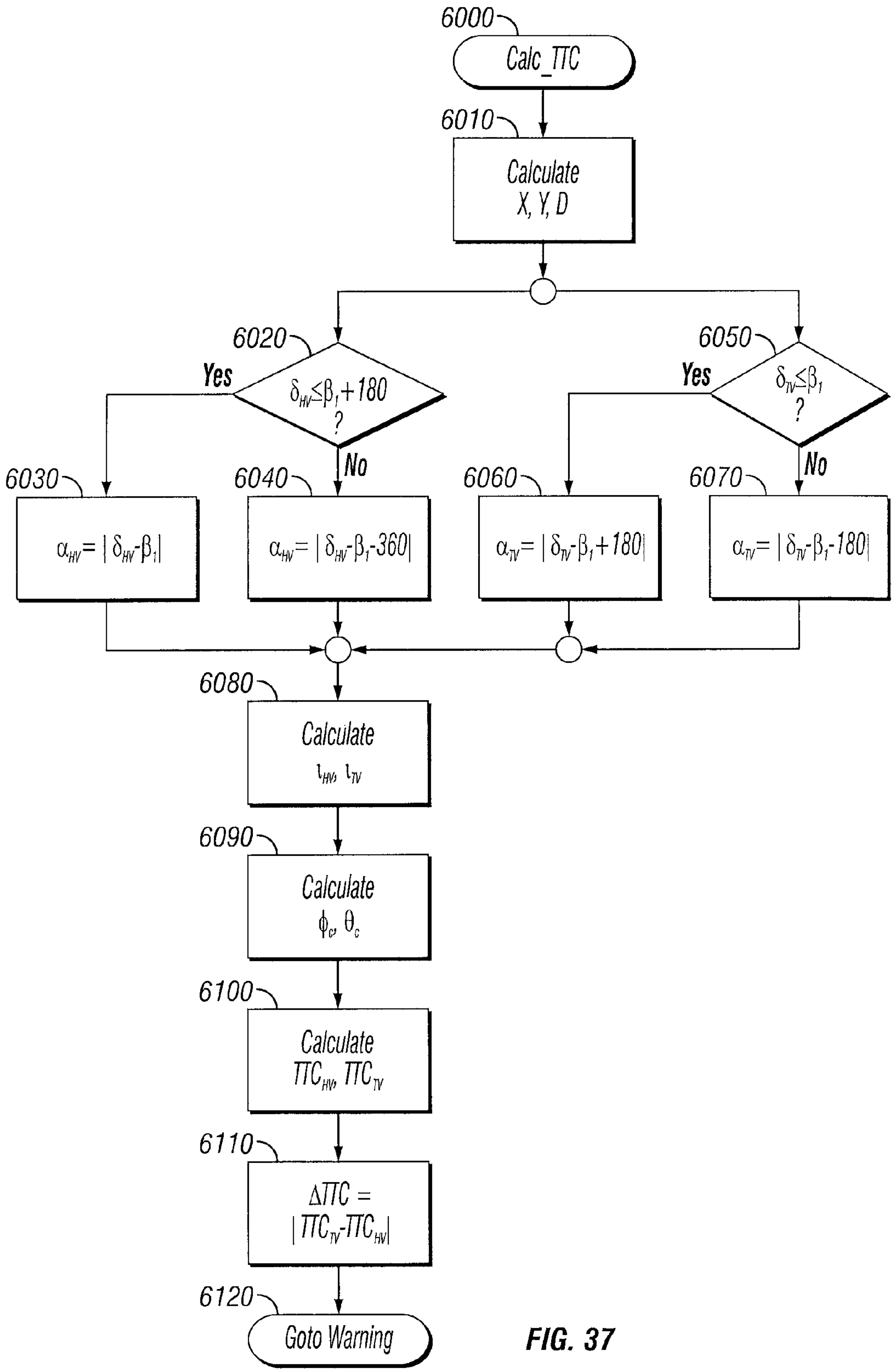
FIG. 37 is a flowchart illustrating exemplary operations for calculating a time to contact between the host vehicle and the remote vehicle.

In the flowchart in FIG. 37, the processing calculates the time to collision (TTC) beginning in step 6000. Thus, the processing determines whether to provide a warning to the host vehicle 10 by evaluating an operating condition of the host vehicle 10 while the possibility of contact exists between the host vehicle 10 and the remote vehicle 14. As will now be discussed, the process determines whether the possibility of contact between the host vehicle 10 and the remote vehicle 14 exists by determining an east-west distance X and a north-south distance Y between the host vehicle 10 and the remote vehicle 14, determining a relative distance between the host vehicle 10 and the remote vehicle 14 based on the east-west distance X and the north-south distance Y, and determining an angle heading between the host vehicle 10 and the remote vehicle 14. That is, the processing in step 6010 calculates the values for X, Y and D as shown in FIG. 33 using the following equations:

$$X = (\theta_2 - \theta_1)\rho = \frac{(\theta_2 - \theta_1)(1 - f)r_e\cos\phi_1}{\sqrt{\sin^2\phi_1 + (1 - f)^2\cos^2\phi_1}}$$

$$Y = (\phi_2 - \phi_1)r = \frac{(\phi_2 - \phi_1)(1 - f)r_e}{\sqrt{\sin^2\phi_1 + (1 - f)^2\cos^2\phi_1}}$$

$$D = (1 - f)r_e\sqrt{\frac{(\theta_2 - \theta_1)^2\cos^2\phi_1 + (\phi_2 - \phi_1)^2}{\sin^2\phi_1 + (1 - f)^2\cos^2\phi_1}}$$

where $r_e$ represents the radius of the earth, which is $r_e$=6,378,137 m, $$f = \frac{1}{298.257223563},$$

$\phi_1$ can represent the latitude of the host vehicle 10, $\theta_1$ can represent the longitude of the host vehicle 10, $\phi_2$ can represent the latitude of the remote vehicle 14, and $\theta_2$ can represent the longitude of the remote vehicle 14 as discussed above.

The processing then continues to step 6020 where the processing determines whether the heading of the host vehicle 10 $\delta_{HV}$ ($\delta_1$ in FIG. 33) is less than or equal to the angle $\beta_1$+180. If so, the processing continues to step 6030 and calculates the angle $\alpha_{HV}$ ($\alpha_1$ in FIG. 33) as indicated. If not, the processing continues to step 6040 and calculates the angle $\alpha_{HV}$ as indicated. In addition, after completing step 6010 as discussed above, the processing determines in step 6050 whether the heading of the remote vehicle 14 $\delta_{TV}$ ($\delta_2$ in FIG. 33) is less than or equal to the angle $\beta_1$. If so, the processing continues to step 6060 and calculates the angle $\alpha_{TV}$ ($\alpha_2$ in FIG. 33) as indicated. If not, the processing continues to step 6070 and calculates the angle $\alpha_{TV}$ as indicated.

After completing any of the steps 6030, 6040, 6060 and 6070, the processing continues to step 6080 and calculates the travel path $l_{HV}$ ($l_1$) of the host vehicle 10 and the travel path $l_{TV}$ ($l_2$) of the remote vehicle 14 according to the following equations $$l_1 = D\frac{\sin\alpha_2}{\sin\alpha_3}$$

$$l_2 = D\frac{\sin\alpha_1}{\sin\alpha_3}$$

The processing at step 6090 then calculates the latitude $\phi_3$ at which the paths of the host vehicle 10 and the remote vehicle 14 cross, and the longitude $\theta_3$ at which the paths of the host vehicle 10 and the remote vehicle 14 cross according to the following equations $$\phi_3 = \frac{(l_1\cos\delta_1)\sqrt{\sin^2\phi_1 + (1-f)^2\cos^2\phi_1}}{(1-f)r_e} + \phi_1$$

$$\theta_3 = \frac{(l_1\sin\delta_1)\sqrt{\sin^2\phi_1 + (1-f)^2\cos^2\phi_1}}{(1-f)r_e\cos\phi_1} + \theta_1$$

where the variables are as discussed above.

Figure 38:
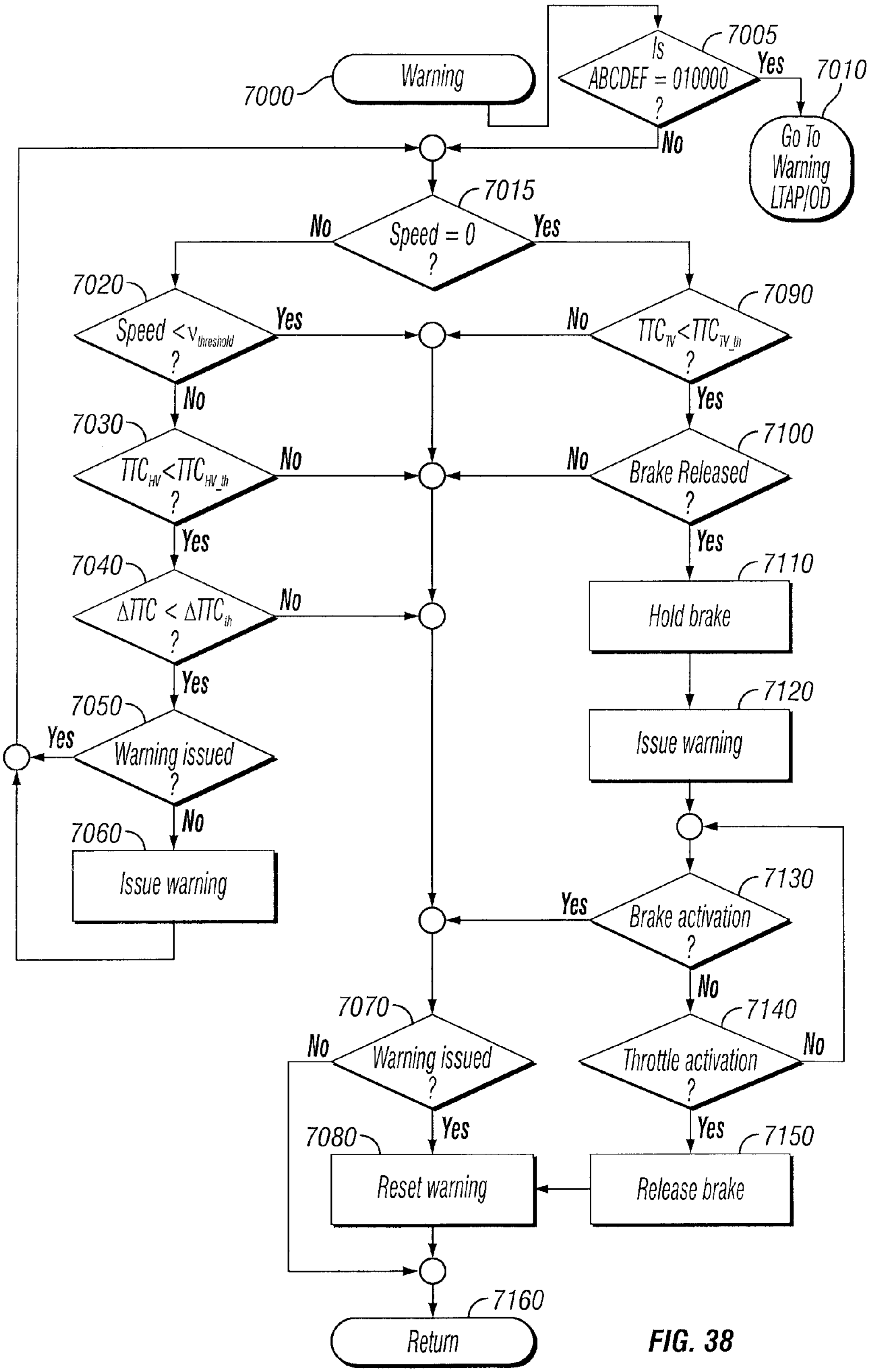
FIG. 38 is a flowchart illustrating exemplary operations for issuing a warning to the host vehicle based on the time to contact determined in FIG. 37.

The processing then continues to step 6100 and calculates the time to collision $TTC_{HV}$ ($TTC_1$) which represents the time until the host vehicle 10 reaches the collision point, and the time to collision $TTC_{TV}$ ($TTC_2$) which represents the time until the remote vehicle 14 reaches the collision point according to the following equations $$TTC_1 = \frac{l_1}{v_1}$$

$$TTC_2 = \frac{l_2}{v_2}$$

where the speed $v_1$ of the host vehicle 10 and the speed $v_2$ of the remote vehicle 14 are included in the respective BSMs transmitted by the host vehicle 10 and the remote vehicle 14. Thus, the monitoring of the location relationship discussed above can include monitoring a time until the host vehicle 10 and the remote vehicle 14 contact each other as the location relationship. In other words, the processing that determines whether the possibility of contact between the host vehicle 10 and the remote vehicle 14 exists includes determining respective times for the host vehicle 10 and the remote vehicle 14 to travel from their respective current locations to a contact location proximate the intersection. The processing then calculates an absolute value of the difference between $TTC_{HV}$ ($TTC_1$) and $TTC_{TV}$ ($TTC_2$) in step 6110, and continues in step 6120 to the process for issuing a warning message as shown in the flowchart of FIG. 38. Accordingly, as can be appreciated from the above, the processing determines whether the possibility of contact between the host vehicle 10 and the remote vehicle 14 exists by calculating a latitude and longitude of a contact location, determining a first time for the host vehicle 10 to travel a first distance from the current location of the host vehicle 10 to the contact location, determining a second time for the remote vehicle 14 to travel a second distance from the current location of the remote vehicle 14 to the contact location, and calculating a difference between the first and second times to determine whether the vehicles 10 and 14 will be at the contact location at the same time. The TTC is calculated to determine the time for warning the driver. For example, approximately 2.5 seconds may be needed to warn the driver to take action, independent of speed. As discussed above, the warning can be an audible warning, a visual warning and a tactile warning at the host vehicle 10 while the process determines that the operating condition of the host vehicle 10 can permit contact between the host vehicle 10 and the remote vehicle 14.

Figure 39:
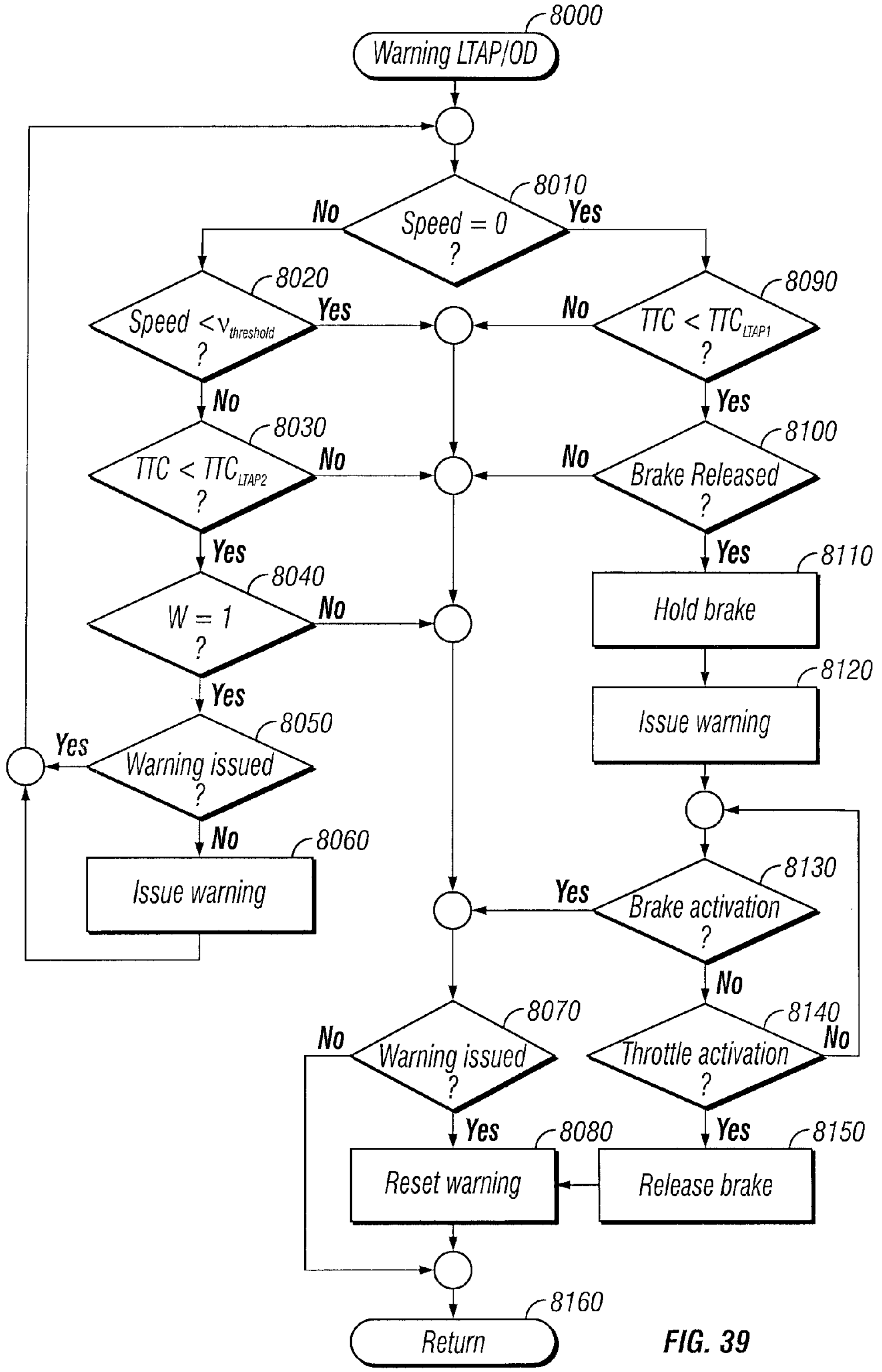
FIG. 39 is a flowchart illustrating exemplary operations for issuing a warning to the host vehicle based on the time to contact determined in FIG. 37 for a host vehicle about to make a left turn with an oncoming remote vehicle travelling straight in an opposite direction as shown in FIG. 13.

As will now be discussed with regard to FIG. 38, the warning process includes two branches, with one branch controlling warning when the host vehicle 10 is initially in motion and the other warning when the vehicle is initially at a stop. Furthermore, as discussed below, the flowchart in FIG. 39 illustrates specific operations that are performed when the full code ABCDEF=010000, indicating that the host vehicle 10 is intending to make a left hand turn and the remote vehicle 14 is travelling straight in the opposite direction, as shown in FIG. 13 and in the first entry in Table 6 above.

For the case when the host vehicle 10 is in motion, the process first checks to see if the speed is above a threshold, $v_{threshold}$. In this example, the value of $v_{threshold}$ can be 5 mph or any other suitable speed. If the speed is not above the threshold, the process exits the loop. If the speed is above the threshold, the process determines if the time for the host vehicle 10 to reach the intersection of the two vehicle paths is less than a threshold, $TTC_{HV\_th}$. In this example, the value of $TTC_{HV\_th}$=2 sec.±2 sec. However, the value of $TTC_{HV\_th}$ can be any suitable value. If the time is not less than the threshold, the process exits the loop. However, if the time is less than the threshold, the process determines if the difference between the times for the host vehicle 10 and the remote vehicle 14 (threat vehicle) to reach the intersection of the two vehicle paths is less than a threshold $\Delta TTC_{th}$. In this example, the value of $\Delta TTC_{th}$=2 sec. 1 sec. However, the value of $\Delta TTC_{th}$ can be any suitable value. If the difference is not less than the threshold, the process exits the loop. If the difference is less than the threshold, the process checks the status of the warning. If the warning has not been issued, the process issues the warning then loops back to the beginning and continues to issue the warning until the threat is no longer present. Once the threat is gone, the process resets the warning and exits the loop.

For the case when the host vehicle 10 is stopped, the application first checks to see if the time for the remote vehicle 14 to reach the intersection of the two vehicle paths is less than a threshold $TTC_{TV\_th}$. In this example, the value of $TTC_{TV\_th}$=2 sec.±2 sec. However, the value of $TTC_{TV\_th}$ can be any suitable value. If the time is not less than the threshold, the process exits the loop. If the time is less than the threshold, the application checks to see if the brakes on the host vehicle are applied. If the brakes are applied, the process exits the loop. If the brakes are not applied, the process maintains brake pressure and issues a warning. The process then continuously checks to see if the brakes have been applied. If the brakes have been applied, the application resets the warning and exits the loop. Thus, the process refrains from providing the warning while the evaluating determines that the operating condition indicates that a brake of the host vehicle 10 is in an engaged condition to retain the host vehicle 10 in a stationary position. If the brakes have not been applied, the process checks to see if the throttle is active. If the throttle is not active, the process loops back to check if the brakes have been applied. However, if the throttle is active, the process releases the brakes, resets the warning and exits the loop.

Accordingly, beginning at step 7000, the process determines in step 7005 whether the full code ABCDEF=010000, indicating that the host vehicle 10 is intending to turn left and the remote vehicle 14 is travelling straight in the opposite direction as shown in FIG. 13. If this is the scenario, the process continues to step 7010 to begin the process Warning LTAP/OD as shown in FIG. 39 and discussed below before the host vehicle 10 begins to execute the left turn. In other words, the process Warning LTAP/OD as shown in FIG. 39 is performed before the driver of the host vehicle 10 begins to steer the steering wheel of the host vehicle 10 to begin executing the left turn, and thus before the trajectory of the host vehicle 10 moves toward the left turn. However, if this is not the scenario and the host vehicle 10 is not intending to execute a left turn, the processing continues to step 7015 to determine whether the speed of the host vehicle 10 is 0. If the speed is not 0, the processing determines in step 7020 if the speed of the host vehicle 10 is less than a threshold $v_{threshold}$. If the speed is not less than the threshold $v_{threshold}$, the processing determines in step 7030 whether the time to collision of the host vehicle 10 is less than a time to collision threshold for the host vehicle. If so, the processing determines in step 7040 whether the value ΔTTC calculated in step 6110 as discussed above is less than a change in the time to collision threshold. If so, the processing determines in step 7050 whether a warning has already been issued. If a warning has already been issued, the processing returns to step 7015 and repeats as discussed above. However, if a warning has not been issued, the processing issues a warning in step 7060 and repeats at step 7015.

Also, if the processing determines in step 7020 that the speed of the host vehicle 10 is not less than a threshold $v_{threshold}$, if the processing determines in step 7030 that the time to collision of the host vehicle 10 is not less than the time to collision threshold for the host vehicle, or the processing in step 7040 determines that the value calculated in step 6110 is not less than the change in the time to collision threshold, the processing continues to step 7070. In step 7070, the processing determines if the warning has been issued. If the warning has not been issued, the processing returns at step 7160 to step 3000 and repeats as discussed above. However, if the warning has been issued, the warning is reset in step 7080 and the processing returns at step 7160 to step 3000 and repeats as discussed above.

Returning to step 7015, if the speed of the host vehicle 10 is determined to be 0, the processing determines in step 7090 whether the time to collision of the remote vehicle 14 is less than a time to collision threshold for the remote vehicle. If so, the processing determines in step 7100 if the brake of the host vehicle 10 has been released. If so, the processing holds the brake in step 7110 and issues a warning in step 7120. This brake hold is characterized as a haptic warning since the driver can override the brake by applying the accelerator, and is not considered active control since it occurs under specific conditions. Thus, the process provides the warning while the evaluating determines that the operating condition indicates that a brake of the host vehicle 10 is in a disengaged condition to enable the host vehicle 10 to move from a stationary position and the possibility of contact exists. In this instance, the warning includes operating the brake to change from the disengaged condition to an engaged condition to retain the host vehicle 10 in a stationary position.

The processing then determines in step 7130 if the brake of the host vehicle 10 has been activated. If the brake has not been activated, the processing determines in step 7140 whether the throttle of the host vehicle 10 has been activated. If the throttle has not been activated, the processing returns to step 7130 and again checks whether the brake has been activated. However, if the throttle has been activated, the processing releases the brake in step 7150 and resets the warning in step 7080. The processing continues to step 7160 and returns to step 3000 as discussed above. In addition, if the processing determines in step 7090 that the time to collision of the remote vehicle 14 is not less than the time to collision threshold for the remote vehicle, or the processing determines in step 7100 that the brake of the host vehicle 10 has not been released, the processing continues to step 7070 and repeats as discussed above.

As can be appreciated from the flowchart in FIG. 38, a determination is made whether to provide a warning for each of the scenarios shown in FIGS. 4 through 30 that may lead to contact between the host vehicle 10 and the remote vehicle 14. For instance, if the brakes of the host vehicle 10 are held and the host vehicle 10 is stopped, no warning needs to be given. However, if the brakes of the host vehicle 10 are released, the host vehicle 10 is stopped, and a remote vehicle 14 (threat vehicle) is approaching, the controller 22 can hold the brakes in a braking state and issue a warning. Also, if the speed of the host vehicle is below threshold where the threat will pass, no warning needs to be issued. Thus, the process refrains from providing the warning while the evaluating determines that the operating condition indicates that a speed of the host vehicle 10 will permit the remote vehicle 14 to pass through the intersection without contacting the host vehicle 10. Furthermore, if the speed of the host vehicle 10 is above a threshold where collision is likely, a warning is issued. Thus, the process provides the warning while the evaluating determines that the operating condition indicates that a speed of the host vehicle 10 can permit the remote vehicle 14 to contact the host vehicle 10. As can also be appreciated from the above, the process performs a threat mitigation operation while a difference between the host vehicle travel time and the remote vehicle travel time is less than a threshold time value. As discussed above, the process can perform a threat mitigation operation by altering a trajectory of the host vehicle 10. The altering of the trajectory of the host vehicle 10 can be performed by operating a steering wheel to change a steering direction of the host vehicle 10, operating a brake, accelerator or both to change the speed of the host vehicle, or in any other suitable manner. The other vehicle components 38 can also include one or more safety devices such as a safety belt, an airbag system, and a horn. Thus, the controller 22 can perform a threat mitigation operation by pretensioning a safety belt, deploying an airbag, operating a horn in the host vehicle, or any of these functions.

As discussed above, if the process determines in step 7005 that the full code ABCDEF=010000, indicating that the host vehicle 10 is intending to turn left and the remote vehicle 14 is travelling straight in the opposite direction as shown in FIG. 13, the process continues to step 7010 to begin the process Warning LTAP/OD as shown in FIG. 39. That is, as can be appreciated from FIG. 13, it is desirable to consider certain factors relating to the operation of the host vehicle 10 when determining at what time to issue a warning in the case where the host vehicle 10 is attempting to make a left turn across the path of a remote vehicle 14 approaching the intersection from the opposite direction. For example, when inputs such as yaw rate, lateral acceleration, steering angle, and so are considered, the driver of the host vehicle 10 is typically already committed to the left turn maneuver before a determination can be made whether a warning is necessary.

An alternative is to monitor the speed and acceleration of the host vehicle 10 to anticipate the driver's action. That is, in addition to signaling a left turn, a driver will typically engage in certain pre-turn driving behaviors with regard to speed and acceleration control prior to initiating the turn. It is during this time that a warning, if needed, would be most effective.

Figure 40:
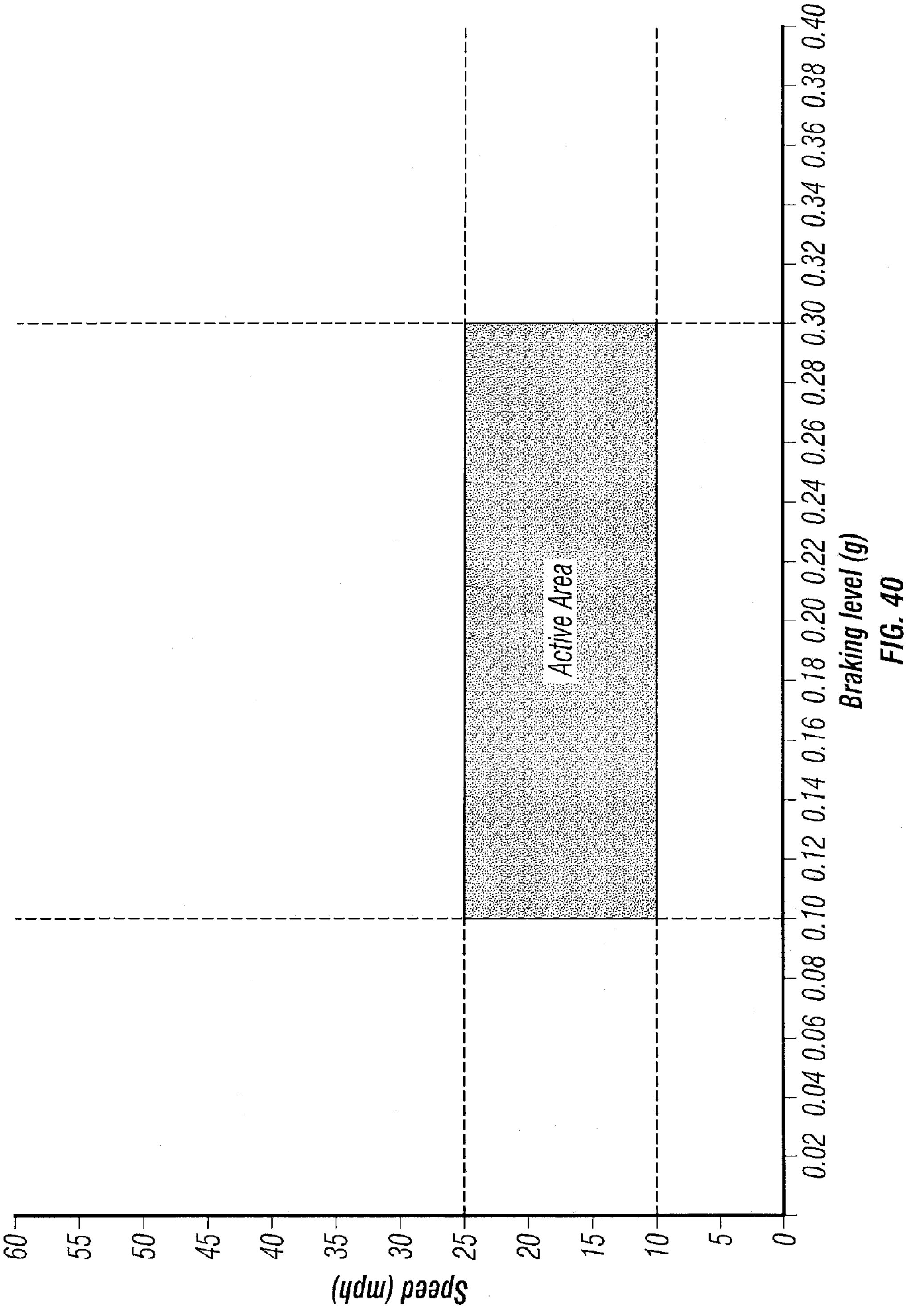
FIG. 40 is a graph illustrating an example of a range of host vehicle speeds and host vehicle braking levels for which a warning is issued in accordance with the process shown in FIG. 39.

Accordingly, as will now be described with reference to FIG. 39, the vehicle intersection monitoring system 12 in this example uses two speed thresholds and two acceleration thresholds to define a set of conditions in which it is likely that the driver of the host vehicle 10 is preparing to make a left turn. That is, a host vehicle 10 traveling below one speed threshold, $v_1$ suggests that the driver intends to stop, but a host vehicle 10 traveling above a second speed threshold, $v_2$ suggests the driver intends to continue driving forward. Also, the driver of the host vehicle 10 braking below one acceleration threshold $a_1$ suggests that the driver intends to continue driving forward, while the driver of the host vehicle 10 braking above a second acceleration threshold $a_2$ suggests that the driver intends to stop. Therefore, as shown, for example, in FIG. 40, the Active Area where the velocity of the host vehicle 10 ranges from $v_1$ to $v_2$ and the acceleration (braking) ranges from $a_1$ to $a_2$ indicates that the likelihood of the driver intending to turn the host vehicle 10 left is high. Again, it should be noted that the operations shown in FIG. 39 are performed before the host vehicle 10 begins to execute the left turn, that is, before the driver begins to turn the steering wheel of the host vehicle 10 to cause the host vehicle 10 to begin executing the left turn. In other words, the operations shown in FIG. 39 are performed before the direction of travel of the host vehicle 10 changes in the direction of the left turn.

In a manner similar to that discussed above, the controller 22 performs the processes discussed above to detect for the presence of a remote vehicle 14. The controller 22 also performs the processes discussed above, such as checking the status of the turn signals, to determine the intention of the driver of the host vehicle 10. As will be appreciated from the following description, many of the operations of the process shown in FIG. 39 are similar to those shown in FIG. 38.

When the Warning LTAP/OD process begins in step 8000 as shown in FIG. 39, the process continues to step 8010 to determine whether the speed of the host vehicle 10 is 0. If the speed is not 0, the processing determines in step 8020 if the speed of the host vehicle 10 is less than a threshold $v_{threshold}$. If the speed is not less than the threshold $v_{threshold}$, the processing determines in step 8030 whether the time to collision of the host vehicle 10 is less than a time to collision threshold for the host vehicle 10.

That is, the processing determines in step 8030 whether the time to contact TTC of the remote vehicle 14 with the host vehicle 10 is less than a predetermined length of time for the remote vehicle 14 to contact the host vehicle 10 as defined by $TTC_{LTAP2}$. The value of $TTC_{LTAP2}$ can be, for example, any time value within a range of 3 seconds to 5 seconds, or any other suitable value. The controller 22 can determine the presence of a remote vehicle 14 based on, for example, signals received from one or more sensors 40 (FIG. 2), or by using messages received from the remote vehicle 14 that are communicated over a vehicle-to-vehicle communication network as discussed above. From this information, the controller 22 can determine the time to contact (TTC) of the remote vehicle 14 with the host vehicle 10 based on the following equation $$TTC = \frac{D}{v_{HV} + v_{RV}}$$

where D represents the instantaneous distance between the host vehicle 10 and the remote vehicle 14 either measured directly by one or more of the sensors 40 or calculated by the controller 22 in accordance with the following equation $$D = (1-f)r_e\sqrt{\frac{(\theta_{RV}-\theta_{HV})^2\cos^2\phi_{HV} + (\phi_{RV}-\phi_{HV})^2}{\sin^2\phi_{HV} + (1-f)^2\cos^2\phi_{HV}}}$$

where f=1/298.257223563 (earth flattening);

$r_e$=6,378,137 m (earth equatorial radius);

$\theta_{HV}$=Host Vehicle (HV) longitude;

$\theta_{RV}$=Remote Vehicle (RV) longitude;

$\phi_{HV}$=Host Vehicle (HV) latitude;

$\phi_{RV}$=Remote Vehicle (RV) latitude;

$v_{HV}$=Host Vehicle (HV) speed; and $v_{RV}$=Remote Vehicle (RV) speed

If the TTC is less than the $TTC_{LTAP2}$, the process continues to step 8040 to determine if a warning variable W is equal to 1, thus indicating that a warning should be issued. The warning can generally be referred to as a threat mitigation operation as described herein.

In step 8040, the vehicle intersection monitoring system 12 uses the two speed thresholds and two acceleration thresholds as mentioned above to determine whether the system should warn the driver of the host vehicle 10 (e.g., perform a threat mitigation operation and/or issue a warning) when the oncoming remote vehicle 14 is within a predetermined length of time away from the host vehicle 10 as defined by $TTC_{LTAP2}$. The value W is determined by the following equation $$W = \frac{1}{16}\left[\left(\frac{v-v_1+\sigma}{|v-v_1|+\sigma}+1\right)\left(\frac{v_2-v+\sigma}{|v_2-v|+\sigma}+1\right)\right]\times \left[\left(\frac{a-a_1+\sigma}{|a-a_1|+\sigma}+1\right)\left(\frac{a_2-a+\sigma}{|a_2-a|+\sigma}+1\right)\right]$$

where $v_1$=the lower speed threshold and thus, if the host vehicle 10 is traveling at a speed less than v1, W=0 because such a speed suggests that the driver is about to stop the host vehicle 10;

$v_2$=the upper speed threshold and thus, if the host vehicle 10 is traveling at a speed greater than v2, W=0 because such a speed suggests that the driver will allow the host vehicle 10 to proceed straight through the intersection or past the oncoming remote vehicle 14;

$a_1$=the upper brake threshold and thus, if the host vehicle 10 is braking at a level greater than a1, W=0 because such a brake level suggests that the driver will cause the host vehicle 10 to come to a stop;

$a_2$=the lower brake threshold and thus, if the host vehicle 10 is braking at a level lower than a1, W=0 because such a brake level suggests that the driver will allow the host vehicle 10 to proceed straight through the intersection or past the oncoming remote vehicle 14;

σ=a constant added to the equation to prevent dividing by 0; and

1/16 is the normalization factor.

If the process determines in step 8040 that the warning variable W is equal to 1, the process determines in step 8050 whether a warning has already been issued. If a warning has already been issued, the processing returns to step 8010 and repeats as discussed above. However, if a warning has not been issued, the process issues a warning in step 8060 and repeats at step 8010.

Also, if the processing determines in step 8020 that the speed of the host vehicle 10 is not less than a threshold $v_{threshold}$, if the processing determines in step 8030 that the TTC is not less than the $TTC_{LTAP}$, or the processing in step 8040 determines that the value W is not equal to 1 (e.g., W=0), the processing continues to step 8070. In step 8070, the processing determines if the warning has been issued. If the warning has not been issued, the processing returns at step 8160 to step 3000 (FIG. 34) and repeats as discussed above. However, if the warning has been issued, the warning is reset in step 8080 and the processing returns at step 8160 to step 3000 and repeats as discussed above.

Returning to step 8010, if the speed of the host vehicle 10 is determined to be 0, the processing determines in step 8090 whether the time to contact TTC of the remote vehicle 14 with the host vehicle 10 is less than a predetermined length of time for the remote vehicle 14 to contact the host vehicle 10 as defined by $TTC_{LTAP1}$. The value of $TTC_{LTAP1}$ can be, for example, any time value within a range of 3 seconds to 5 seconds, or any other suitable value. If TTC is less than $TTC_{LTAP1}$, the processing determines in step 8100 if the brake of the host vehicle 10 has been released. If so, the processing holds the brake in step 8110 and issues a warning in step 8120. As discussed above with regard to FIG. 38, this brake hold is characterized as a haptic warning since the driver can override the brake by applying the accelerator, and is not considered active control since it occurs under specific conditions. Thus, the process provides the warning while the evaluating determines that the operating condition indicates that a brake of the host vehicle 10 is in a disengaged condition to enable the host vehicle 10 to move from a stationary position and the possibility of contact exists. In this instance, the warning includes operating the brake to change from the disengaged condition to an engaged condition to retain the host vehicle 10 in a stationary position.

The processing then determines in step 8130 if the brake of the host vehicle 10 has been activated. If the brake has not been activated, the processing determines in step 8140 whether the throttle of the host vehicle 10 has been activated. If the throttle has not been activated, the processing returns to step 8130 and again checks whether the brake has been activated. However, if the throttle has been activated, the processing releases the brake in step 8150 and resets the warning in step 8080. The processing continues to step 8160 and returns to step 3000 (FIG. 34) as discussed above. In addition, if the processing determines in step 8090 that the time to contact TTC of the remote vehicle 14 with the host vehicle 10 is less than a predetermined length of time away from the host vehicle 10 as defined by $TTC_{LTAP1}$, or the processing determines in step 8100 that the brake of the host vehicle 10 has not been released, the processing continues to step 8070 and repeats as discussed above.

In addition, as with the operations described in the flowchart of FIG. 38, the process shown in FIG. 39 can also perform a threat mitigation operation by altering a trajectory of the host vehicle 10. The altering of the trajectory of the host vehicle 10 can be performed by operating a steering wheel to change a steering direction of the host vehicle 10, operating a brake, accelerator or both to change the speed of the host vehicle, or in any other suitable manner. The other vehicle components 38 can also include one or more safety devices such as a safety belt, an airbag system, and a horn. Thus, the controller 22 can perform a threat mitigation operation by pretensioning a safety belt, deploying an airbag, operating a horn in the host vehicle, or any of these functions.

The following Tables 8 through 16 summarize the different types of warning conditions that may arise depending on the type of scenario as shown in FIGS. 4 through 30 depending on the state of the host vehicle (HV) 10 and the remote vehicle 14 (threat vehicle TV).

TABLE 8

Initial conditions for Straight Crossing Path Scenarios

| HV | TV | HV Response |
|---|---|---|
| Stopped with brakes applied | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Stopped with brakes released | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | Hold brakes, issue warning |
| Creeping forward ($0 < v_{HV} < v_{threshold}$) | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Approaching at speed ($v_{HV} > v_{threshold}$) | Stopped with brakes applied | No warning |
| | Stopped with brakes released | No warning |
| | Creeping forward ($0 < v_{TV} < v_{threshold}$) | Issue warning |
| | Approaching at speed ($v_{TV} > v_{threshold}$) | Issue warning |

For the scenarios when the host vehicle 10 is travelling straight and the remote vehicle 14 is travelling in an opposite direction to the host vehicle 10 and making a left turn across the path of the host vehicle 10, there are a total of 16 possible combinations with three that could produce a warning in the HV.

TABLE 9

HV Travelling Straight and TV in Opposite Direction Turning Left

| HV | TV | HV Response |
|---|---|---|
| Stopped with brakes applied | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Stopped with brakes released | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | Hold brakes, issue warning |
| Creeping forward ($0 < v_{HV} < v_{threshold}$) | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Approaching at speed ($v_{HV} > v_{threshold}$) | Stopped with brakes applied | No warning |
| | Stopped with brakes released | No warning |
| | Creeping forward ($0 < v_{TV} < v_{threshold}$) | Issue warning |
| | Approaching at speed ($v_{TV} > v_{threshold}$) | Issue warning |

For the scenarios when the host vehicle 10 is travelling straight and the remote vehicle 14 is travelling in a lateral direction to the host vehicle 10 and making a left turn across the path of the host vehicle 10, there are a total of 16 possible combinations with three that could produce a warning in the HV.

TABLE 10

HV Travelling Straight and TV in Lateral Direction Turning Left

| HV | TV | HV Response |
|---|---|---|
| Stopped with brakes applied | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Stopped with brakes released | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | Hold brakes, issue warning |
| Creeping forward ($0 < v_{HV} < v_{threshold}$) | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Approaching at speed ($v_{HV} > v_{threshold}$) | Stopped with brakes applied | No warning |
| | Stopped with brakes released | No warning |
| | Creeping forward ($0 < v_{TV} < v_{threshold}$) | Issue warning |
| | Approaching at speed ($v_{TV} > v_{threshold}$) | Issue warning |

For the scenarios when the host vehicle 10 is travelling straight and the remote vehicle 14 is approaching the intersection from a cross street and making a left turn into the path of the host vehicle 10, there are a total of 16 possible combinations with three that could produce a warning in the HV.

TABLE 11

HV Travelling Straight and TV Turning Left from Cross Street

| HV | TV | HV Response |
|---|---|---|
| Stopped with brakes applied | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Stopped with brakes released | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | Hold brakes, issue warning |
| Creeping forward ($0 < v_{HV} < v_{threshold}$) | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Approaching at speed ($v_{HV} > v_{threshold}$) | Stopped with brakes applied | No warning |
| | Stopped with brakes released | No warning |
| | Creeping forward ($0 < v_{TV} < v_{threshold}$) | Issue warning |
| | Approaching at speed ($v_{TV} > v_{threshold}$) | Issue warning |

For the scenarios when the host vehicle 10 is travelling straight and the remote vehicle 14 is approaching the intersection from a cross street and making a right turn into the path of the host vehicle 10, there are a total of 16 possible combinations with three that could produce a warning in the HV.

TABLE 12

HV Travelling Straight and TV Turning Right from Cross Street

| HV | TV | HV Response |
|---|---|---|
| Stopped with brakes applied | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Stopped with brakes released | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | Hold brakes, issue warning |
| Creeping forward ($0 < v_{HV} < v_{threshold}$) | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Approaching at speed ($v_{HV} > v_{threshold}$) | Stopped with brakes applied | No warning |
| | Stopped with brakes released | No warning |
| | Creeping forward ($0 < v_{TV} < v_{threshold}$) | Issue warning |
| | Approaching at speed ($v_{TV} > v_{threshold}$) | Issue warning |

For the scenarios when the host vehicle 10 is turning left and the remote vehicle 14 is travelling straight in an opposite direction of the host vehicle 10, there are a total of 16 possible combinations with three that could produce a warning in the HV.

TABLE 13

HV Turning Left and TV Travelling Straight

| HV | TV | HV Response |
|---|---|---|
| Stopped with brakes applied | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Stopped with brakes released | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | Hold brakes, issue warning |
| Creeping forward ($0 < v_{HV} < v_{threshold}$) | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Approaching at speed ($v_{HV} > v_{threshold}$) | Stopped with brakes applied | No warning |
| | Stopped with brakes released | No warning |
| | Creeping forward ($0 < v_{TV} < v_{threshold}$) | Issue warning |
| | Approaching at speed ($v_{TV} > v_{threshold}$) | Issue warning |

For the scenarios when the host vehicle 10 is turning left and the remote vehicle 14 is travelling straight from a cross street, there are a total of 16 possible combinations with three that could produce a warning in the HV.

TABLE 14

HV Turning Left and TV Travelling Straight from Cross Street

| HV | TV | HV Response |
|---|---|---|
| Stopped with brakes applied | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Stopped with brakes released | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | Hold brakes, issue warning |
| Creeping forward | Stopped with brakes applied | No warning |
| | Stopped with brakes released | No warning |

TABLE 14-continued

HV Turning Left and TV Travelling Straight from Cross Street

| HV | TV | HV Response |
|---|---|---|
| (0 < $v_{HV}$ < $v_{threshold}$) | Creeping forward (0 < $v_{TV}$ < $v_{threshold}$) | No warning |
| | Approaching at speed ($v_{TV}$ > $v_{threshold}$) | No warning |
| Approaching at speed ($v_{HV}$ > $v_{threshold}$) | Stopped with brakes applied | No warning |
| | Stopped with brakes released | No warning |
| | Creeping forward (0 < $v_{TV}$ < $v_{threshold}$) | Issue warning |
| | Approaching at speed ($v_{TV}$ > $v_{threshold}$) | Issue warning |

For the scenarios when the host vehicle 10 is turning left and the remote vehicle 14 is travelling straight from a cross street so that the host vehicle 10 is turning into the path of the remote vehicle 14, there are a total of 16 possible combinations with three that could produce a warning in the HV.

TABLE 15

HV Turning Left and TV Travelling Straight from Cross Street

| HV | TV | HV Response |
|---|---|---|
| Stopped with brakes applied | Stopped with brakes applied | No warning |
| | Stopped with brakes released | No warning |
| | Creeping forward (0 < $v_{TV}$ < $v_{threshold}$) | No warning |
| | Approaching at speed ($v_{TV}$ > $v_{threshold}$) | No warning |
| Stopped with brakes released | Stopped with brakes applied | No warning |
| | Stopped with brakes released | No warning |
| | Creeping forward (0 < $v_{TV}$ < $v_{threshold}$) | No warning |
| | Approaching at speed ($v_{TV}$ > $v_{threshold}$) | Hold brakes, issue warning |
| Creeping forward (0 < $v_{HV}$ < $v_{threshold}$) | Stopped with brakes applied | No warning |
| | Stopped with brakes released | No warning |
| | Creeping forward (0 < $v_{TV}$ < $v_{threshold}$) | No warning |
| | Approaching at speed ($v_{TV}$ > $v_{threshold}$) | No warning |
| Approaching at speed ($v_{HV}$ > $v_{threshold}$) | Stopped with brakes applied | No warning |
| | Stopped with brakes released | No warning |
| | Creeping forward (0 < $v_{TV}$ < $v_{threshold}$) | Issue warning |
| | Approaching at speed ($v_{TV}$ > $v_{threshold}$) | Issue warning |

For the scenarios when the host vehicle 10 is turning right and the remote vehicle 14 is travelling straight from a cross street so that the host vehicle 10 is turning into the path of the remote vehicle 14, there are a total of 16 possible combinations with three that could produce a warning in the HV.

TABLE 16

HV Turning Right and TV Travelling Straight from Cross Street

| HV | TV | HV Response |
|---|---|---|
| Stopped with brakes applied | Stopped with brakes applied | No warning |
| | Stopped with brakes released | No warning |
| | Creeping forward (0 < $v_{TV}$ < $v_{threshold}$) | No warning |
| | Approaching at speed ($v_{TV}$ > $v_{threshold}$) | No warning |
| Stopped with brakes released | Stopped with brakes applied | No warning |
| | Stopped with brakes released | No warning |
| | Creeping forward (0 < $v_{TV}$ < $v_{threshold}$) | No warning |
| | Approaching at speed ($v_{TV}$ > $v_{threshold}$) | Hold brakes, issue warning |
| Creeping forward (0 < $v_{HV}$ < $v_{threshold}$) | Stopped with brakes applied | No warning |
| | Stopped with brakes released | No warning |
| | Creeping forward (0 < $v_{TV}$ < $v_{threshold}$) | No warning |
| | Approaching at speed ($v_{TV}$ > $v_{threshold}$) | No warning |
| Approaching at speed ($v_{HV}$ > $v_{threshold}$) | Stopped with brakes applied | No warning |
| | Stopped with brakes released | No warning |
| | Creeping forward (0 < $v_{TV}$ < $v_{threshold}$) | Issue warning |
| | Approaching at speed ($v_{TV}$ > $v_{threshold}$) | Issue warning |

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle turn monitoring method comprising:

determining with a controller an intent for a host vehicle to execute a left turn before the host vehicle begins to execute the left turn;

monitoring with the controller a location relationship between the host vehicle and a remote vehicle before the host vehicle begins to execute the left turn, the location relationship including a straight line between the host vehicle location and the remote vehicle location, and an angle between the host vehicle heading and the straight line based on a fixed coordinate system and a preselected angle direction;

evaluating with the controller a travelling condition of the host vehicle before the host vehicle begins to execute the left turn; and determining with the controller whether to perform a threat mitigation operation before the host vehicle begins to execute the left turn based on the location relationship and the travelling condition.

2. The vehicle turn monitoring method according to claim 1, wherein the evaluating of the travelling condition includes determining a speed of the host vehicle before the host vehicle begins to execute the left turn.

3. The vehicle turn monitoring method according to claim 2, wherein the determining of the speed includes determining whether the host vehicle is moving, and while the host vehicle is moving determining whether the speed of the host vehicle is between two speed thresholds.

4. The vehicle turn monitoring method according to claim 1, wherein the evaluating of the travelling condition includes monitoring an acceleration of the host vehicle before the host vehicle begins to execute the left turn.

5. The vehicle turn monitoring method according to claim 4, wherein the monitoring of the acceleration includes determining whether the host vehicle is moving, and while the host vehicle is moving determining whether the acceleration of the host vehicle is between two acceleration thresholds.

6. The vehicle turn monitoring method according to claim 1, wherein the monitoring of the location relationship includes determining a time to contact between the host vehicle and a remote vehicle.

7. The vehicle turn monitoring method according to claim 6, wherein the monitoring of the location relationship includes determining whether the time to contact is below a contact threshold time.

8. The vehicle turn monitoring method according to claim 1, wherein the evaluating of the travelling condition includes determining a speed of the host vehicle and monitoring an acceleration of the host vehicle.

9. The vehicle turn monitoring method according to claim 8, wherein the determining whether to perform the threat mitigation operation determines to perform the threat mitigation operation while the location relationship indicates a time of contact between the host vehicle and the remote vehicle that is below a threshold contact time, and the speed of the host vehicle and the acceleration of the host vehicle are within respective threshold ranges.

10. The vehicle turn monitoring method according to claim 1, wherein the determining of the intent includes determining the intent for the host vehicle to execute the left turn based on a condition of a turn signal of the host vehicle.

11. The vehicle turn monitoring method according to claim 1, wherein the monitoring of the location relationship includes monitoring respective locations of the host vehicle and a remote vehicle in relation to an intersection.

12. The vehicle turn monitoring method according to claim 1, further comprising performing the threat mitigation operation upon the determining of whether to perform a threat mitigation operation determines to perform the threat mitigation operation.

13. The vehicle turn monitoring method according to claim 12, wherein the performing of the threat mitigation operation includes providing a warning at the host vehicle.

14. The vehicle turn monitoring method according to claim 12, wherein the performing of the threat mitigation operation includes altering a speed of the host vehicle.

15. A vehicle turn monitoring system comprising:

a location monitor configured to monitor a location of a host vehicle;

a sensor configured to sense a travelling condition of the host vehicle; and a controller configured to determine an intent for a host vehicle to execute a left turn before the host vehicle begins to execute the left turn, monitor a location relationship between the host vehicle and a remote vehicle based on the location of the host vehicle as determined by the location monitor before the host vehicle begins to execute the left turn, the location relationship including a straight line between the host vehicle location and the remote vehicle location, and an angle between the host vehicle heading and the straight line based on a fixed coordinate system and a preselected angle direction, evaluate the travelling condition of the host vehicle as sensed by the sensor before the host vehicle begins to execute the left turn, and determine whether to perform a threat mitigation operation before the host vehicle begins to execute the left turn based on the location relationship and the travelling condition.

16. The vehicle turn monitoring system according to claim 15, wherein the controller is configured to evaluate the travelling condition of the host vehicle by determining whether the host vehicle is moving, and while the host vehicle is moving determining whether a speed of the host vehicle is between two speed thresholds.

17. The vehicle turn monitoring system according to claim 15, wherein the controller is configured to evaluate the travelling condition of the host vehicle by determining whether the host vehicle is moving, and while the host vehicle is moving determining whether an acceleration of the host vehicle is between two acceleration thresholds.

18. The vehicle turn monitoring system according to claim 15, wherein the controller is configured to determine to perform the threat mitigation operation while the location relationship indicates a time of contact between the host vehicle and the remote vehicle that is below a threshold contact time, and a speed of the host vehicle and an acceleration of the host vehicle are within respective threshold ranges before the host vehicle begins to execute the left turn.

19. The vehicle turn monitoring system according to claim 15, wherein the controller is configured to determine the intent for the host vehicle to execute the left turn based on a condition of a turn signal of the host vehicle.

20. The vehicle turn monitoring system according to claim 15, wherein the controller is configured, upon determining to perform the threat mitigation operation, to control at least one of a warning device to issue a warning at the host vehicle and a vehicle speed control device to change a speed of the host vehicle.

* * * * *